(12) United States Patent
Franca-Neto

(10) Patent No.: US 11,494,620 B2
(45) Date of Patent: Nov. 8, 2022

(54) SYSTOLIC NEURAL NETWORK ENGINE CAPABLE OF BACKPROPAGATION

(71) Applicant: Western Digital Technologies, Inc., San Jose, CA (US)

(72) Inventor: Luiz M. Franca-Neto, Sunnyvale, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 1028 days.

(21) Appl. No.: 15/981,664

(22) Filed: May 16, 2018

(65) Prior Publication Data

US 2019/0244105 A1    Aug. 8, 2019

Related U.S. Application Data

(60) Provisional application No. 62/628,076, filed on Feb. 8, 2018, provisional application No. 62/627,957, filed on Feb. 8, 2018.

(51) Int. Cl.
*G06N 3/063* (2006.01)
*G06N 3/08* (2006.01)
(Continued)

(52) U.S. Cl.
CPC ......... *G06N 3/063* (2013.01); *G06F 15/8046* (2013.01); *G06N 3/04* (2013.01);
(Continued)

(58) Field of Classification Search
CPC ........ G06N 3/063; G06N 3/04; G06N 3/0481; G06N 3/08; G06N 3/084; G06N 5/046; G06F 15/8046
See application file for complete search history.

(56) References Cited

U.S. PATENT DOCUMENTS 5,091,864 A * 2/1992 Baji .................. G06N 3/063
706/42
5,138,695 A    8/1992 Means et al.
(Continued)

FOREIGN PATENT DOCUMENTS

AU    197131902 A    2/1973
BE    771045 A    12/1971
(Continued)

OTHER PUBLICATIONS

Girones et al., "Systolic Implementation of a Pipelined On-Line Backpropagation", Sep. 1999, https://ieeexplore.ieee.org/document/758891 (Year: 1999).*
(Continued)

*Primary Examiner* — Kamran Afshar
*Assistant Examiner* — Ryan C Vaughn
(74) *Attorney, Agent, or Firm* — Barry IP Law, P.C.

(57) ABSTRACT

A method of computer processing is disclosed comprising receiving a data packet at a processing node of a neural network, performing a calculation of the data packet at the processing node to create a processed data packet, attaching a tag to the processed data packet, transmitting the processed data packet from the processing node to a receiving node during a systolic pulse, receiving the processed data packet at the receiving node, performing a clockwise convolution on the processed data packet and a counter clockwise convolution on the processed data packet, performing an adding function and backpropagating results of the performed sigmoid function to each of the processing nodes that originally processed the data packet.

20 Claims, 33 Drawing Sheets

(51) Int. Cl.
*G06N 3/04* (2006.01)
*G06F 15/80* (2006.01)
*G06N 5/04* (2006.01)

(52) U.S. Cl.
CPC .............. *G06N 3/0481* (2013.01); *G06N 3/08* (2013.01); *G06N 3/084* (2013.01); *G06N 5/046* (2013.01)

(56) References Cited

U.S. PATENT DOCUMENTS

| | | | |
|---|---|---|---|
| 5,226,092 A * | 7/1993 | Chen | G06N 3/063 382/157 |
| 5,243,688 A | 9/1993 | Pechanek et al. | |
| 5,337,395 A * | 8/1994 | Vassiliadis | G06N 3/04 706/42 |
| 5,509,106 A * | 4/1996 | Pechanek | G06N 3/063 706/41 |
| 5,519,811 A | 5/1996 | Yoneda et al. | |
| 5,627,943 A | 5/1997 | Yoneda et al. | |
| 5,659,781 A | 8/1997 | Larson | |
| 5,799,134 A | 8/1998 | Chiueh et al. | |
| 5,812,993 A | 9/1998 | Ginosar et al. | |
| 7,085,749 B2 | 8/2006 | Matsugu | |
| 7,437,339 B2 | 10/2008 | Matsugu | |
| 7,489,834 B2 | 2/2009 | Kloth | |
| 7,564,996 B2 | 7/2009 | Kloth | |
| 7,743,004 B2 | 6/2010 | Matsugu | |
| 8,392,683 B1 | 3/2013 | Confalonier | |
| 8,724,624 B2 | 5/2014 | Bazlamacci et al. | |
| 8,824,603 B1 | 9/2014 | Ge et al. | |
| 9,665,799 B1 | 5/2017 | Munteanu et al. | |
| 9,697,463 B2 | 7/2017 | Ross et al. | |
| 9,710,748 B2 * | 7/2017 | Ross | G06N 3/08 |
| 9,721,203 B1 | 8/2017 | Young et al. | |
| 9,747,548 B2 | 8/2017 | Ross et al. | |
| 9,805,303 B2 | 10/2017 | Ross et al. | |
| 9,928,460 B1 | 3/2018 | Nowatzyk et al. | |
| 9,959,500 B1 | 5/2018 | Torng et al. | |
| 10,019,668 B1 | 7/2018 | Woo | |
| 10,043,095 B2 | 8/2018 | Yang et al. | |
| 10,074,051 B2 | 9/2018 | Thorson et al. | |
| 10,083,171 B1 | 9/2018 | Yang et al. | |
| 10,083,395 B2 | 9/2018 | Young | |
| 10,102,453 B1 | 10/2018 | Yang et al. | |
| 10,459,849 B1 | 10/2019 | Shorb et al. | |
| 10,521,488 B1 | 12/2019 | Ross et al. | |
| 10,790,828 B1 | 9/2020 | Gunter et al. | |
| 10,817,802 B2 | 10/2020 | Bruestle et al. | |
| 2003/0004907 A1 | 1/2003 | Matsugu | |
| 2004/0156546 A1 | 8/2004 | Kloth | |
| 2004/0156547 A1 | 8/2004 | Kloth | |
| 2007/0011120 A1 | 1/2007 | Matsugu | |
| 2008/0270335 A1 | 10/2008 | Matsugu | |
| 2011/0029471 A1 | 2/2011 | Chakradhar et al. | |
| 2012/0257506 A1 | 10/2012 | Bazlamacci et al. | |
| 2014/0270494 A1 | 9/2014 | Sawhney et al. | |
| 2014/0289445 A1 | 9/2014 | Savich | |
| 2015/0006444 A1 | 1/2015 | Tamatsu et al. | |
| 2015/0112911 A1 | 4/2015 | Jackson et al. | |
| 2015/0170021 A1 | 6/2015 | Lupon et al. | |
| 2015/0178246 A1 | 6/2015 | Abellanas et al. | |
| 2016/0142731 A1 | 5/2016 | Nakagami et al. | |
| 2016/0342889 A1 | 11/2016 | Thorson et al. | |
| 2016/0342893 A1 | 11/2016 | Ross et al. | |
| 2017/0103313 A1 | 4/2017 | Ross et al. | |
| 2017/0103314 A1 | 4/2017 | Ross | |
| 2017/0103318 A1 | 4/2017 | Ross et al. | |
| 2017/0147942 A1 | 5/2017 | Gao et al. | |
| 2018/0005115 A1 | 1/2018 | Gokmen et al. | |
| 2018/0032835 A1 | 2/2018 | Shirahata | |
| 2018/0075350 A1 | 3/2018 | Gokmen | |
| 2018/0101743 A1 | 4/2018 | Yang et al. | |
| 2018/0101747 A1 | 4/2018 | Yang et al. | |
| 2018/0101748 A1 | 4/2018 | Yang et al. | |
| 2018/0107921 A1 | 4/2018 | Ross et al. | |
| 2018/0129936 A1 | 5/2018 | Young et al. | |
| 2018/0157465 A1 | 6/2018 | Bittner et al. | |
| 2018/0157940 A1 | 6/2018 | Yang et al. | |
| 2018/0165577 A1 | 6/2018 | Young et al. | |
| 2018/0173441 A1 | 6/2018 | Cargnini et al. | |
| 2018/0174031 A1 | 6/2018 | Yang et al. | |
| 2018/0189595 A1 | 7/2018 | Yang et al. | |
| 2018/0189642 A1 | 7/2018 | Boesch et al. | |
| 2018/0189648 A1 | 7/2018 | Sengupta et al. | |
| 2018/0247113 A1 | 8/2018 | Yang et al. | |
| 2018/0268234 A1 | 9/2018 | Yang et al. | |
| 2018/0285005 A1 | 10/2018 | Torng et al. | |
| 2018/0285006 A1 | 10/2018 | Torng et al. | |
| 2018/0285713 A1 | 10/2018 | Torng et al. | |
| 2018/0285714 A1 | 10/2018 | Torng et al. | |
| 2018/0285720 A1 | 10/2018 | Torng et al. | |
| 2018/0285722 A1 | 10/2018 | Torng et al. | |
| 2018/0285723 A1 * | 10/2018 | Torng | G06N 3/063 |
| 2018/0307438 A1 | 10/2018 | Huang et al. | |
| 2018/0307980 A1 | 10/2018 | Barik et al. | |
| 2018/0309050 A1 | 10/2018 | Torng et al. | |
| 2018/0314671 A1 | 11/2018 | Zhang et al. | |
| 2018/0336164 A1 | 11/2018 | Phelps et al. | |
| 2019/0042918 A1 | 2/2019 | Meyer et al. | |
| 2019/0043203 A1 | 2/2019 | Fleishman et al. | |
| 2019/0073259 A1 | 3/2019 | Qin et al. | |
| 2019/0114499 A1 | 4/2019 | Delaye et al. | |
| 2019/0114548 A1 | 4/2019 | Wu et al. | |
| 2019/0121889 A1 | 4/2019 | Gold et al. | |
| 2019/0156187 A1 | 5/2019 | Dasari et al. | |
| 2019/0179795 A1 | 6/2019 | Huang et al. | |
| 2019/0236049 A1 | 8/2019 | Vantrease et al. | |
| 2019/0317901 A1 | 10/2019 | Kachare et al. | |
| 2020/0127685 A1 | 4/2020 | Chen et al. | |
| 2020/0293866 A1 | 9/2020 | Guo | |
| 2020/0327367 A1 | 10/2020 | Ma et al. | |
| 2020/0387798 A1 | 12/2020 | Hewage et al. | |

FOREIGN PATENT DOCUMENTS

| | | |
|---|---|---|
| CA | 930619 A1 | 7/1973 |
| DE | 2139302 C3 | 10/1978 |
| EP | 3373210 A1 | 9/2018 |
| FR | 2104032 A5 | 4/1972 |
| GB | 1316899 A | 5/1973 |
| IL | 37434 A | 1/1974 |
| KR | 197900473 B1 | 5/1979 |
| SE | 361090 B | 10/1973 |
| WO | WO 2017/006512 | 1/2017 |
| WO | 2019075267 A1 | 4/2019 |

OTHER PUBLICATIONS

Chi et al., "PRIME: A Novel Processing-in-memory Architecture for Neural Network", Jun. 2016 https://dl.acm.org/doi/10.1145/3007787.3001140 (Year: 2016).*

Girones et al., "Systolic Implementation of a Pipelined On-Line Backpropagation," in Proc. Seventh Int'l. Conf. Microelectronics for Neural, Fuzzy, and Bio-Inspired Sys. 387-94 (1999). (Year: 1999).*

Chi et al., "PRIME: A Novel Processing-in-Memory Architecture for Neural Network Computation in ReRAM-Based Main Memory," in 2016 ACM/IEEE Ann. Int'l Symp. Computer Architecture 27-39 (2016). (Year: 2016).*

Ogunmolu et al.; "Nonlinear Systems Identification Using Deep Dynamic Neural Networks"; Oct. 2016; available at: https://www.researchgate.net/publication/308896333_Nonlinear_Systems_Identification_Using_Deep_Dynamic_Neural_Networks.

International Search Report, re PCT Application No. PCT/US2018/066593, dated Mar. 29, 2019.

International Search Report, re PCT Application No. PCT/US2018/066917, dated Mar. 29, 2019.

Sudipta, Mahapatra et al., Mapping of Neural Network Models onto Systolic Arrays In: Journal of Parallel and Distributed Computing, vol. 60, Issue 6, Jun. 2000, pp. 677-689.

(56) References Cited

OTHER PUBLICATIONS

Written Opinion from International Application No. PCT/US2018/066593, dated Mar. 29, 2019, 8 pages.
Written Opinion from International Application No. PCT/US2018/066917, dated Mar. 29, 2019, 8 pages.
Chen et al., "Eyeriss: A Spatial Architecture for Energy-Efficient Dataflow for Convolutional Neural Networks", 2016, 2016 ACM/IEEE 43rd Annual International Symposium on Computer Architecture (ISCA), pp. 367-379, doi: 10.1109/ISCA.2016.40. (Year 2016).
Gokmen et al., "Training Deep Convolutional Neural Networks with Resistive Cross-Point Devices", Oct. 10, 2017, Front. Neurosci. 11 :538. doi: 10.3389/fnins.2017.00538 (Year: 2017).
James E. Smith, "Decoupled Access/Execute Computer Architectures", Apr. 1982, SIGARCH Comput. Archit. News 10, 3 (Apr. 1982), 112-119. DOI:https://doi.org/10.1145/1067649.801719(Year: 1982).
Jones et al., "Learning in Linear Systolic Neural Network Engines: Analysis and Implementation", Jul. 1994, IEEE Transactions on Neural Networks, vol. 5, No. 4, p. 584-593(Year: 1994).
Norman P. Jouppi, Cliff Young, Nishant Patil, David Patterson, et al., "In-Datacenter Performance Analysis of a Tensor Processing Unit", Jun. 24-28, 2017, In Proceedings of ISCA'17, 12 pages. (Year: 2017).
Chung, J.H., et al., "Exploiting the inherent parallelisms of back-propagation neural networks to design a systolic array", Proceedings of the International Joint Conference on Neural Networks, vol. 3 of 3, pp. 2204-2209 (Nov. 18, 1991).
Kung, S.Y., and Hwang, J.N., "A unified systolic architecture for artificial neural networks", Journal of Parallel and Distributed Computing, vol. 6, No. 2, pp. 358-387 (Apr. 1, 1989).
Pending U.S. Appl. No. 15/981,624, filed May 16, 2018, entitled "Systolic Neural Network Engine Capable of Forward Propagation", Luiz M. Franca-Neto.
Pending U.S. Appl. No. 15/981,679, filed May 16, 2018, entitled "Systolic Neural Network Engine With Crossover Connection Optimization", Luiz M. Franca-Neto.
Pending U.S. Appl. No. 15/981,711, filed May 16, 2018, entitled "Convolution Engines for Systolic Neural Network Processor", Luiz M. Franca-Neto.
Pending U.S. Appl. No. 15/981,719, filed May 16, 2018, entitled "Systolic Neural Network Processor With Feedback Control", Franca-Neto et al.
Pending U.S. Appl. No. 15/981,735, filed May 16, 2018, entitled "Multi-Core Systolic Processor System for Neural Networkprocessing", Luiz M. Franca-Neto.
Pending U.S. Appl. No. 16/233,876, filed Dec. 27, 2018, entitled "Configurable Neural Network Engine of Tensor Arrays Andmemory Cells", Luiz M. Franca-Neto.
Pending U.S. Appl. No. 16/233,968, filed Dec. 27, 2018, entitled "Reconfigurable Systolic Neural Network Engine", Luiz M. Franca-Neto.
Pending U.S. Appl. No. 16/234,166, filed Dec. 27, 2018, entitled "Adjusting Enhancement Coefficients for Neural Network Engine", Luiz M. Franca-Neto.
Pending U.S. Appl. No. 16/234,184, filed Dec. 27, 2018, entitled "Configurable Neural Network Engine for Convolutional Filter Sizes", Luiz M. Franca-Neto.
Pending U.S. Appl. No. 16/363,744, filed Mar. 25, 2019, entitled "Enhanced Storage Device Memory Architecture for Machine Learning", Luiz M. Franca-Neto.
Pending U.S. Appl. No. 16/363,661, filed Mar. 25, 2019, entitled "Enhanced Memory Device Architecture for Machine Learning", Luiz M. Franca-Neto.
Du et al.; "A Reconfigurab20180165577le Streaming Deep Convolutional Neural Network Accelerator for Internet of Things"; in IEEE Transactions on Circuits and Systems I: Regular Papers, vol. 65, No. 1, pp. 198-208; Jan. 2018; available at: https://ieeexplore.IEEE.org/document/8011462.
Lu et al.; "FlexFlow: A Flexible Dataflow Accelerator Architecture for Convolutional Neural Networks"; 2017 IEEE International Symposium on High Performance Computer Architecture (HPCA); 2017; pp. 553-564; available at: https://ieeexplore.ieee.org/document/7920855.
Qi et al.; "FPGA design of a multicore neuromorphic processing system"; NAECON 2014; IEEE National Aerospace and Electronics Conference; 2014; pp. 255-258; available at: https://ieeexplore.ieee.org/abstract/document/7045812.
Shafiee et al.; "ISAAC: A Convolutional Neural Network Accelerator with in-Situ Analog Arithmetic in Crossbars"; In Proceedings of the 43rd ICSA; pp. 14-26; IEEE press Year: 2016; available at: https://ieeexplore.ieee.org/document/7551379.
Parhami et al.; "Periodically Regular Chordal Rings"; IEEE Transactions on Parallel and Distributed Systems; vol. 10, No. 6; Jun. 1999; available at: https://ieeexplore.ieee.org/document/774913.

\* cited by examiner $$\delta_1^l = acc\big|_1^l \cdot g'(z_1^l)$$

$$acc\big|_1^l = acc\big|_1^l + w_{11}^{[l+1]} \cdot \delta_1^{[l+1]}\big|_1^l$$

$$acc\big|_1^l = acc\big|_1^l + w_{12}^{[l+1]} \cdot \delta_2^{[l+1]}\big|_1^l$$

$$acc\big|_1^l = w_{13}^{[l+1]} \cdot \delta_3^{[l+1]}\big|_1^l$$

$$y_{out\_1,2}[k] = y_{out\_1,2}[k-1] + yi_{n\_1,2}[k]$$

SYSTOLIC NEURAL NETWORK ENGINE CAPABLE OF BACKPROPAGATION

CROSS REFERENCE TO RELATED APPLICATIONS

This application claims the benefit under 35 U.S.C. § 119(e) of both U.S. Patent Application No. 62/628,076, filed Feb. 8, 2018, and U.S. Patent Application No. 62/627,957, filed Feb. 8, 2018, the disclosures of which are hereby incorporated by reference herein in their entirety.

TECHNICAL FIELD

The systems and methods disclosed herein are directed to computer processors, and, more particularly, to a systolic machine learning processor capable of forward propagation and backpropagation.

BACKGROUND

Computer learning models can process large volumes of data. For example, a model may be implemented as an artificial neural network. Artificial neural networks are artificial in the sense that they are computational entities, inspired by biological neural networks but modified for implementation by computing devices. Artificial neural networks are able to change their structure during a process referred to as training, during which the network is exposed to pairs of input data and the expected output and tunes its internal parameters to be able to predict the expected output when provided with the corresponding input. Once trained, a neural network can be used for inference, that is, provided with new input data in order to predict the corresponding output.

The parameters of a neural network can be set in a process referred to as training. For example, a neural network can be trained using training data that include input data and the correct or preferred output of the model for the corresponding input data. Sets of individual input vectors ("mini-batches") may be processed at the same time by using an input matrix instead of a single input vector, which may speed up training. The neural network can repeatedly process the input data, and the parameters (e.g., the weight matrices) of the neural network can be modified in what amounts to a trial-and-error process until the model produces (or "converges" on) the correct or preferred output. The modification of weight values may be performed through a process referred to as "backpropagation." Backpropagation includes determining the difference between the expected model output and the obtained model output, and then determining how to modify the values of some or all parameters of the model to reduce the difference between the expected model output and the obtained model output.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
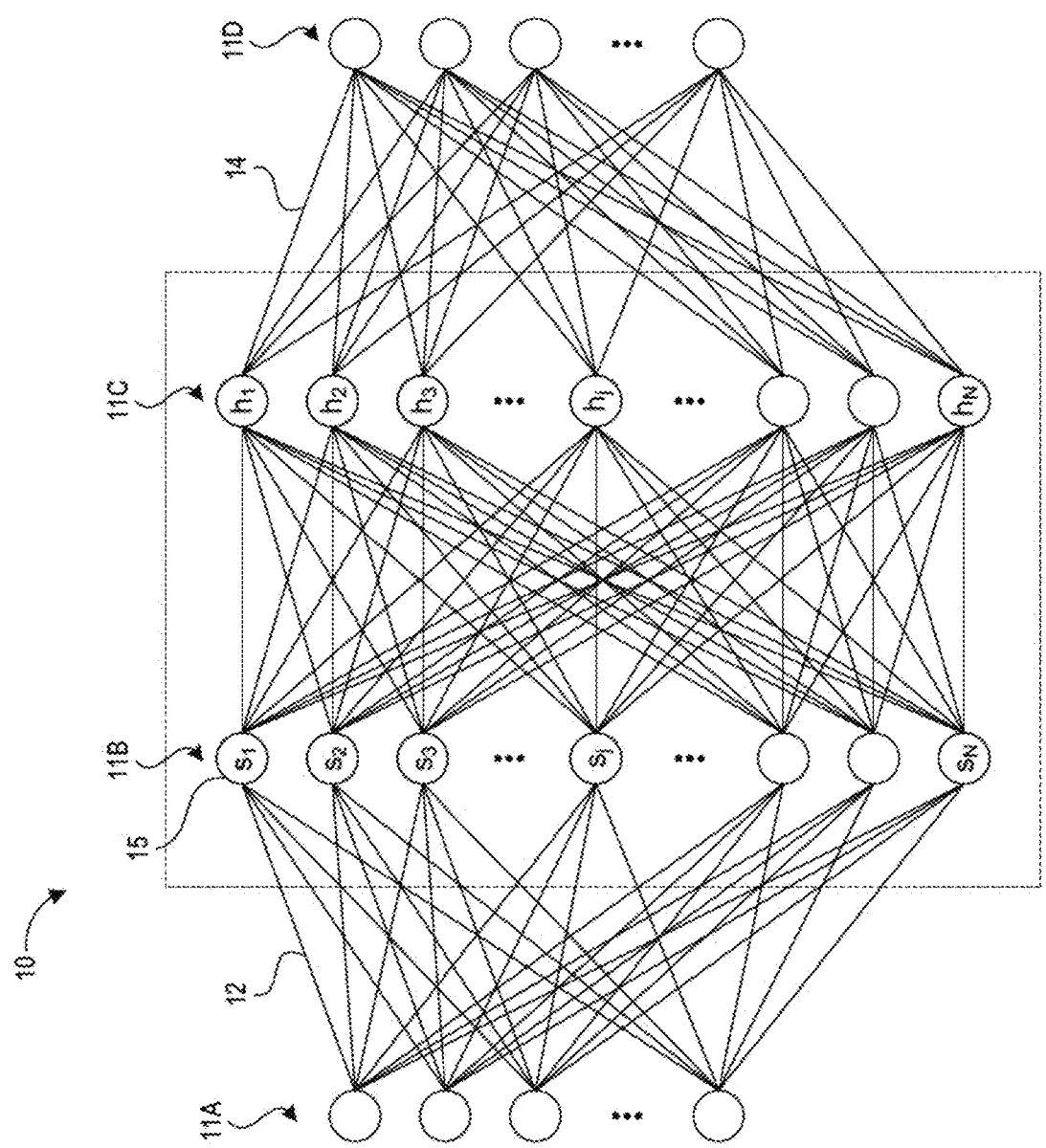
FIG. 1 is a schematic diagram of an artificial neural network according to some embodiments.

The systems, methods, and devices of this disclosure each have several innovative aspects, no single one of which is solely responsible for the all of the desirable attributes disclosed herein.

Some embodiments include a device for performing computations of a neural network comprising at least a first layer and a second layer, the device comprising: a first processing unit configured to perform computations of a first node of the first layer of the neural network, the first processing unit including: a first input systolic element, first processing circuitry configured to receive data from the first input systolic element and perform processing according to the first node to generate a first activation output; and a first output systolic element configured to receive the first activation output from the first processing circuitry; and a second processing unit configured to perform computations of a second node of the second layer of the neural network, wherein the second processing unit includes a second input systolic element, wherein the first output systolic element is further configured to systolically pulse the first activation output to the second input systolic element.

The device of any of the preceding paragraphs can further comprise a third processing unit configured to perform computations of a third node of the first layer of the neural network, the third processing unit including a second output systolic element, wherein the first output systolic element systolically pulses the first activation output to the second input systolic element during a first systolic pulse, and wherein the first output systolic element is further configured to systolically pulse the first activation output to the second output systolic element during the first systolic pulse.

In the device of any of the preceding paragraphs, the second output systolic element can be further configured to systolically pulse a second activation output to the first output systolic element during the first systolic pulse.

The device of any of the preceding paragraphs can further comprise a third processing unit configured to perform computations of a third node of the second layer of the neural network, the third processing unit including a third input systolic element, wherein the second output systolic element is configured to systolically pulse the first activation output to the third input systolic element.

The device of any of the preceding paragraphs can further comprise a first arrangement of a first plurality of processing units including the first processing unit, wherein at least a subset of the first plurality of processing units is configured to perform computations of a corresponding number of nodes of the first layer of the neural network; a second arrangement of a second plurality of processing units including the second processing unit, wherein at least a subset of the second plurality of processing units is configured to perform computations of a corresponding number of nodes of the second layer of the neural network; and a crossover connection between an output systolic element of one of the first plurality of processing units and an input systolic element of one of the second plurality of processing units.

The device of any of the preceding paragraphs can further include a systolic processor chip, wherein the first and second processing units comprise circuitry embedded in the systolic processor chip.

In the device of any of the preceding paragraphs, the first output systolic element can be further configured to tag the first activation output with an identifier, wherein the identifier identifies that the first activation output was computed by the first processing unit.

In the device of any of the preceding paragraphs, the first activation output systolically pulsed to the second input systolic element can include the tag.

In the device of any of the preceding paragraphs, the second processing unit can include second processing circuitry configured to receive the first activation output and perform processing according to the second node to generate a second activation output, wherein the second processing unit uses the tag to identify a weight to use for processing the first activation output.

In the device of any of the preceding paragraphs, identifying the weight can include using the tag to identify a mapping between the first activation output and the weight.

Some embodiments include a method for performing computations of a neural network comprising at least a first layer and a second layer, the method comprising: assigning a first data processing unit (DPU) to perform computations of a first node of the first layer of the neural network; assigning a second DPU to perform computations of a second node the second layer of the neural network; performing computations of the first node of the first layer using the first DPU to generate a first activation output; transmitting the first activation output to a first output systolic element of the first DPU; systolically pulsing the first activation output from the first output systolic element to a first input systolic element of the second DPU during a first systolic pulse; and performing computations of the second node of the second layer by using the second DPU to process at least the first activation output, wherein the method is performed by at least one processor.

In the method of any of the preceding paragraphs, the method can further comprise systolically pulsing the first activation output through a plurality of input systolic elements of a corresponding plurality of DPUs assigned to perform computations of the second layer.

In the method of any of the preceding paragraphs, the method can further comprise systolically pulsing the first activation output to an output systolic element of a first additional DPU assigned to perform computations of the first layer; and systolically pulsing the first activation output from the output systolic element of the first additional DPU over a crossover connection to an input systolic element of a second additional DPU assigned to perform computations of the second layer.

In the method of any of the preceding paragraphs, the computations of the second node can include a multiplication of the first activation output pulsed to the second input systolic element with a weight.

In the method of any of the preceding paragraphs, the weight can be stored locally at the second node.

In the method of any of the preceding paragraphs, the weight can be retrieved from a memory external to the second node.

In the method of any of the preceding paragraphs, the multiplication can be performed by a feedback convolution engine, the method further comprising feeding the multiplied first activation output back into the feedback convolution engine during processing of another activation output.

In the method of any of the preceding paragraphs, the method can further comprise identifying the weight from among a plurality of weights based on information indicative of an origin address of the first activation output.

Some embodiments include a non-transitory computer-readable medium storing computer-executable instructions that, when executed by a processor, cause the processor to perform operations comprising: performing, using a first processing unit, computations of a first node of a neural network to generate a first activation output, the first node included in a first layer of the neural network; systolically pulsing the first activation output from the first processing unit to a second processing unit assigned to perform computations of a second node of the neural network, the second node included in a second layer of the neural network; and performing computations of the second node by using the second processing unit to process at least the first activation output to generate a second activation output.

In the operation of any of the preceding paragraphs, the operations can further comprise, by the first processing unit, tagging the first activation output with an origin address identifying its origin as the first processing unit.

In the operation of any of the preceding paragraphs, the operations can further comprise, by the second processing unit, identifying a weight with which to multiply the first activation output based on the origin address.

Some embodiments include a device for performing computations of a neural network comprising at least first, second, and third layers, the device comprising: a first systolic processing chip including at least: a first arrangement of first processing units, wherein at least a subset of the first processing units are assigned to perform computations of corresponding nodes of the first layer of the neural network, and a second arrangement of second processing units, wherein at least a subset of the second processing units are assigned to perform computations of corresponding nodes of the second layer of the neural network, and wherein the first arrangement of first processing units is configured to systolically pulse data to the second arrangement of second processing units.

In the device of any of the preceding paragraphs, systolically pulsing the first activation output to the second input systolic element can include forward propagating the first activation output to the second input systolic element.

In the device of any of the preceding paragraphs, systolically pulsing the first activation output to the second input systolic element can include using a linear shift register.

Some embodiments include a device for performing training of a neural network via backward propagation, the device comprising: a memory configured to store input values and corresponding expected output values; at least one additional memory configured to store weights corresponding to connections between nodes of the neural network; and a plurality of processing units that perform computations according to particular nodes of the neural network; wherein the plurality of processing nodes are configured to perform computations for forward propagation of the input values through layers of the neural network to generate predicted output values by at least, for particular processing units of the plurality of processing units: receiving input data; processing the input data using one or more of the weights to generate an activation output; and generating output data including the activation output and a tag identifying the particular processing unit; wherein the plurality of processing nodes are configured to perform computations for backward propagation of differences between the expected output values and corresponding ones of the predicted outputs at least partly based on the tags of the particular processing units, wherein the backward propagation updates the weights.

In the device of any of the preceding paragraphs, the device can include a systolic processor chip, wherein the plurality of processing units comprise circuitry embedded in the systolic processor chip.

In the device of any of the preceding paragraphs, particular subsets of the plurality of processing units can form particular arrangements of a systolic array, wherein particular arrangements of the systolic array are assigned to particular layers of the neural network.

In the device of any of the preceding paragraphs, a first arrangement of first processing units of the systolic array can be configured to systolically pulse values output by the first processing units to a second arrangement of the systolic array during the forward propagation.

In the device of any of the preceding paragraphs, the first processing units can be configured to accumulate partial derivatives based on values received from the second arrangement during the backward propagation.

In the device of any of the preceding paragraphs, the systolic processor chip can be configured to: systolically pulse data in a first direction through the plurality of processing units during the forward propagation, and systolically pulse data in a second direction through the plurality of processing units during the backward propagation, wherein the second direction is opposite the first direction.

In the device of any of the preceding paragraphs, systolically pulsing data in the second direction can include using a linear shift register.

In the device of any of the preceding paragraphs, the at least one additional memory storing weights can comprise a plurality of local memories within corresponding processing units.

In the device of any of the preceding paragraphs, the at least one additional memory storing weights can be disposed external to the plurality of processing units, wherein the plurality of processing units can be configured to fetch identified ones of the weights from the at least one additional memory.

In the device of any of the preceding paragraphs, a particular processing unit of the plurality of processing nodes can include an input systolic element configured to receive the input data, processing circuitry can be configured to perform processing on the received input data to generate the activation output, and an output systolic element can be configured to systolically output the activation output.

In the device of any of the preceding paragraphs, the plurality of processing nodes can be arranged in a plurality of arrangements, wherein each of the plurality of arrangements can be configured to perform computations of a corresponding layer of the neural network.

In the device of any of the preceding paragraphs, a particular arrangement of the plurality of arrangements can include a first subset of the plurality of processing nodes, wherein, during the backward propagation, the first subset of plurality of processing nodes can be configured to compute partial derivatives based at least partly on the tags, wherein a weighted sum of the partial derivatives can be accumulated as the data are propagated backwards through the particular arrangement.

Some embodiments include a method for training of a neural network via an array of systolic processing units, the method comprising: accessing input values and corresponding expected output values for the neural network; computing, by the array of systolic processing units, a forward propagation of the input values through layers of the neural network to generate predicted output values, wherein performing the forward propagation includes: computing particular activation output values using particular systolic processing units using at least some weights of the neural network; and generating tagging information representing which of the systolic processing units computed which particular activation output value; computing, by the array of systolic processing units, a backward propagation of differences between the expected output values and corresponding ones of the predicted output values, wherein computing the backward propagation is based at least partly on the tagging information; and updating the weights based on the backward propagation.

In the method of any of the preceding paragraphs, the systolic processing units can be arranged in arrangements, the method can further comprise assigning particular arrangements to particular layers of the neural network.

In the method of any of the preceding paragraphs, computing the forward propagation can further comprise systolically pulsing activation outputs of a first arrangement of the arrangements to a second arrangement of the arrangements.

In the method of any of the preceding paragraphs, computing the backward propagation can further comprise systolically pulsing deviation outputs of the second arrangement to the first arrangement.

In the method of any of the preceding paragraphs, computing the backward propagation can further comprise, by particular systolic processing units of the first arrangement, computing partial derivatives based at least partly on the tagging information.

In the method of any of the preceding paragraphs, the method can further comprise accumulating a weighted sum of the partial derivatives as data are propagated backwards through the first arrangement.

In the method of any of the preceding paragraphs, generating the tagging information can comprise, by a first processing unit of the systolic processing units, tagging an activation value output from the first processing unit with an address of the first processing unit.

In the method of any of the preceding paragraphs, performing the forward propagation can comprise, by a second processing unit of the systolic processing units, identifying one of the weights to use for processing the activation value based on the address of the first processing unit.

In the method of any of the preceding paragraphs, performing the backward propagation can comprise updating the one of the weights based on the address of the first processing unit.

In the method of any of the preceding paragraphs, performing the backward propagation can include using gradient descent.

In the method of any of the preceding paragraphs, using gradient descent can include calculating the gradient of an error function with respect to one or more of the weights.

In the method of any of the preceding paragraphs, updating the weights can include reducing future errors of the neural network during forward propagation.

In the method of any of the preceding paragraphs, the second direction can be a direction towards the input of the neural network.

In the method of any of the preceding paragraphs, performing backward propagation can include using a transpose matrix of the weights used in forward propagation.

In the method of any of the preceding paragraphs, the tag can be used to identify a mapping between a weight and an address identifying the particular processing unit.

Some embodiments include a device performing computations of a neural network comprising at least first, second, and third layers, the device comprising: an array of processing units including at least: a first arrangement of first processing units, and a last arrangement of second processing units, wherein data are systolically pulsed from arrangement to arrangement of the array; a controller configured to assign the first and second processing units to perform computations of particular nodes of the at least first, second, and third layers of the neural network; and a memory configured to store activation output values received from the last arrangement; wherein: the controller is configured to assign at least a first subset of the first processing units of the first arrangement to perform computations of particular nodes of the first layer of the neural network, and to assign at least a subset of the second processing units of the last arrangement to perform computations of particular nodes of the second layer of the neural network on the first activation output values; the first subset of the first processing units are configured to process inputs into the neural network to generate first activation output values that are systolically pulsed through the array; the subset of the second processing units of the last arrangement are configured to process received data to generate second activation output values and send the second activation output values to the memory; the controller is further configured to re-assign at least a second subset of the first processing units of the first arrangement to perform computations of particular nodes of the third layer of the neural network; and the second subset of the first processing units are configured to receive the second activation output values from the memory and process the second activation output values according to the computations of the particular nodes of the third layer of the neural network.

In the device of any of the preceding paragraphs, the first and second subsets of the first processing units can include one or more processing units also included in the second subset of the first processing units.

In the device of any of the preceding paragraphs, one of the first and second subsets of the first processing units can include one or more processing units not included in the other of the first and second subsets of the first processing units.

In the device of any of the preceding paragraphs, the neural network can comprise a number of layers between the first and second layers, wherein the array can comprise a number of arrangements between the first and last arrangements, and wherein the number of layers can equal the number of arrangements.

In the device of any of the preceding paragraphs, the device can include a systolic processor chip, and wherein each of the first and last arrangements of processing units can comprise circuitry embedded in the systolic processor chip.

In the device of any of the preceding paragraphs, the computations of a particular processing unit of the first subset of the first processing units can include a multiplication of input data with a weight.

In the device of any of the preceding paragraphs, the weight can be stored locally at the particular processing unit of the first processing units.

In the device of any of the preceding paragraphs, the weight can be retrieved from a memory external to the particular processing unit of the first subset of the first processing units.

In the device of any of the preceding paragraphs, the controller can be further configured to maintain assignment of the second subset of the first arrangement of processing units to perform the computations of the particular nodes of the third layer of the neural network during a first stage of back propagation.

In the device of any of the preceding paragraphs, the controller can be configured to re-assign the first subset of the first arrangement of processing units to perform the computations of the particular nodes of the first layer of the neural network during a second stage of the back propagation.

Some embodiments include a method for performing computations of a neural network comprising at least first, second, and third layers, via an array of processing units including at least a first arrangement of first processing units and a last arrangement of second processing units, the method comprising: assigning at least a first subset of the first processing units of the first arrangement to the first layer of the neural network; assigning at least a subset of the second processing units of the last arrangement to the second layer of the neural network; receiving input data for the neural network; performing computations of particular nodes of the first layer of the neural network values by using the first subset of the first processing units to process the input data to generate first activation output values; performing computations of particular nodes of the second layer of the neural network using the second subset of the second processing units to generate second activation output values; sending the second activation output values to a memory; re-assigning at least a second subset of the first processing units of the first arrangement to the third layer of the neural network; accessing, by the second subset of the first processing units, the second activation output values from the memory; and performing computations of particular nodes of the third layer of the neural network using the second subset of the first processing units.

In the method of any of the preceding paragraphs, the re-assigning can comprise assigning one or more processing units of the first subset to the third layer of the neural network.

In the method of any of the preceding paragraphs, the re-assigning can comprise assigning one or more processing units not in the first subset to the third layer of the neural network.

In the method of any of the preceding paragraphs, the neural network can comprise a number of layers between the first and second layers, wherein the array can comprise a number of arrangements between the first and last arrangements, and wherein the number of layers can equal the number of arrangements, and the method can further comprise assigning the number of arrangements to corresponding ones of the number of layers.

In the method of any of the preceding paragraphs, the method can further comprise: systolically pulsing the first activation outputs from the first arrangement to an adjacent arrangement of the number of arrangements; at each of the number of arrangements, generating an additional set of activation outputs and pulsing the additional set of activation outputs to a next adjacent arrangement; and at the last arrangement, receiving the additional set of activation outputs systolically pulsed from one of the number of arrangements adjacent to the last arrangement.

Some embodiments include a non-transitory computer-readable medium storing computer-executable instructions that, when executed by at least one processor, cause the at least one processor to perform operations comprising: identifying a neural network for processing by an array of processing units, the neural network including at least first, second, and third layers, and the array including at least a first arrangement of first processing units and a last arrangement of second processing units; assigning at least a first subset of the first processing units of the first arrangement to the first layer of the neural network; assigning at least a subset of the second processing units of the last arrangement to the second layer of the neural network; providing input data for processing by the first subset of the first processing units; storing activation output values received from the last arrangement to a memory; re-assigning at least a second subset of the first processing units of the first arrangement to the third layer of the neural network; and providing the activation output values from the memory to the second subset of the first processing units.

In the operation of any of the preceding paragraphs, the operations can further comprise assigning at least one processing unit of the first arrangement to both the first subset of the first processing units and the second subset of the first processing units.

In the operation of any of the preceding paragraphs, the operations can further comprise assigning at least one processing unit of the first arrangement to one of the first and second subsets of the first processing units and not the other of the first and second subsets of the first processing units.

In the operation of any of the preceding paragraphs, the neural network can comprises a number of layers between the first and second layers, wherein the array comprises a number of arrangements between the first and last arrangements, and the operations can further comprise assigning each of the number of arrangements to a corresponding one of the number of layers.

Some embodiments include a computer-implemented method, comprising: determining that a number of layers of a neural network exceeds a number of arrangements of processing units of a systolic processing chip; for a first set of forward propagations through a first portion of the neural network, assigning a first arrangement of the number of arrangements to perform computations according to a first layer of the neural network; providing an input for the neural network to the first arrangement to initiate the first set of forward propagations; storing an output from the systolic processing chip in a memory; for a second set of forward propagations through a second portion of the neural network, assigning the first arrangement to perform computations according to a different layer of the neural network; and providing the output to the first arrangement to initiate the second set of forward propagations.

In the method of any of the preceding paragraphs, the method can further comprise: determining that each of the number of layers of the neural network has been processed by the systolic processing chip; and storing an additional output of the systolic processing chip in the memory as an output of the neural network.

In the method of any of the preceding paragraphs, the method can further comprise: for a first set of back propagations, assigning the first arrangement to back propagate first received values according to the different layer of the neural network; and for a second set of back propagations, assigning the first arrangement to back propagate second received values according to the first layer of the neural network.

Some embodiments include a device for performing computations of a neural network comprising a number of layers, the device comprising: a controller configured to: determine that a number of layers of the neural network exceeds a number of arrangements of processing units of a systolic processing chip; for a first set of forward propagations through a first portion of the neural network, assign a first arrangement of the number of arrangements to perform computations according to a first layer of the neural network; provide an input for the neural network to the first arrangement to initiate the first set of forward propagations; store an output from the systolic processing chip in a memory; for a second set of forward propagations through a second portion of the neural network, assign the first arrangement to perform computations according to a different layer of the neural network; and provide the output to the first arrangement to initiate the second set of forward propagations.

In the device of any of the preceding paragraphs, the controller can be further configured to: determine that each of the number of layers of the neural network has been processed by the systolic processing chip; and store an additional output of the systolic processing chip in the memory as an output of the neural network.

In the device of any of the preceding paragraphs, the controller can be further configured to: for a first set of back propagations, assign the first arrangement to back propagate first received values according to the different layer of the neural network; and for a second set of back propagations, assign the first arrangement to back propagate second received values according to the first layer of the neural network.

In the device of any of the preceding paragraphs, the controller can include at least one of an ARM processor or a RISC-V processor.

In the device of any of the preceding paragraphs, the controller can be configured to assign at least a third subset of the first processing units of the first arrangement to perform back propagation.

In the device of any of the preceding paragraphs, the controller can control the first arrangement to perform back propagation by, at each processing unit, receiving a deviation input from a previous processing unit of the first arrangement and transmitting a deviation output to a next processing unit of the first arrangement.

Some embodiments include a device for systolically processing data according to a neural network, the device comprising: a first arrangement of first processing units including at least first, second, third, and fourth processing units, wherein the first and second processing units are connected to systolically pulse data to one another, wherein the third and fourth processing units are connected to systolically pulse data to one another; a second arrangement of second processing units including at least fifth, sixth, seventh, and eighth processing units, wherein the fifth and sixth processing units are connected to systolically pulse data to one another, and wherein the seventh and eighth processing units are connected to systolically pulse data to one another; a first interconnect between the second and seventh processing units, wherein the second processing unit is configured to systolically pulse data to the seventh processing unit along the first interconnect; and a second interconnect between the third and sixth processing units, wherein the third processing unit is configured to systolically pulse data to the sixth processing unit along the second interconnect.

In the device of any of the preceding paragraphs, the first and second interconnects can form a first pair of interconnects, wherein a number of pairs of interconnects can connect the first arrangement of first processing units to the second arrangement of second processing units.

In the device of any of the preceding paragraphs, each of the first and second processing units can include a number of convolution engines equal to the number of pairs of interconnects.

In the device of any of the preceding paragraphs, the device can further comprise a second pair of interconnects, the second pair of interconnects including a third interconnect between an uppermost processing unit in the first arrangement and an uppermost processing unit in the second arrangement and a fourth interconnect between a lowermost processing unit in the first arrangement and a lowermost processing unit in the second arrangement.

In the device of any of the preceding paragraphs, at each systolic pulse, each of the first and second processing units can be configured to systolically pulse two pieces of data, each to a different one of the first and second processing units.

In the device of any of the preceding paragraphs, the device can further include a systolic processor chip, wherein the first and second arrangements of first and second processing units can comprise circuitry embedded in the systolic processor chip.

In the device of any of the preceding paragraphs, the second processing unit can include an output systolic element configured to tag an activation output generated by the second processing unit with an identifier, wherein the identifier indicates an address for the second processing unit.

In the device of any of the preceding paragraphs, the activation output including the tag can be systolically pulsed to an input systolic element of the seventh processing unit.

In the device of any of the preceding paragraphs, the seventh processing unit can be configured to: receive the activation output and perform processing to generate an additional activation output, and use the identifier to identify a weight to use for processing the activation output.

In the device of any of the preceding paragraphs, the weight can be stored locally at the seventh processing unit.

In the device of any of the preceding paragraphs, the weight can be retrieved from a memory external to the seventh processing unit.

In the device of any of the preceding paragraphs, at least a subset of the first processing units can be assigned to perform computations of a first layer of the neural network, wherein at least a subset of the second processing units are assigned to perform computations of a second layer of the neural network.

In the device of any of the preceding paragraphs, the first processing unit can include an input systolic element configured to receive data, a first processing circuit configured to perform processing of the received data to generate a first activation output, a first output systolic element, and a data tagger configured to tag the first activation output with an address of the first processing unit.

Some embodiments include a method for systolically processing data according to a neural network comprising at least a first layer and a second layer, the method comprising: during a first systolic clock cycle, performing a first set of systolic pulses of data through at least first, second, third, and fourth processing units arranged along a first arrangement and at least fifth, sixth, seventh, and eighth processing units arranged along a second arrangement, the first set of systolic pulses including: systolically pulsing data from the first processing unit of the first arrangement to the second processing unit of the first arrangement; systolically pulsing data from the third processing unit of the first arrangement to the fourth processing unit of the first arrangement; systolically pulsing data from the fifth processing unit of the second arrangement to the sixth processing unit of the second arrangement; systolically pulsing data from the seventh processing unit of the second arrangement to an eighth processing unit of the second arrangement; and systolically pulsing data from the second processing unit of the first arrangement to the seventh processing unit of the second arrangement; wherein the second processing unit is configured to systolically pulse data to the seventh processing unit along a first interconnect between the first and second arrangements, and wherein the third processing unit is configured to systolically pulse data to the sixth processing unit along a second interconnect between the first and second arrangements.

In the method of any of the preceding paragraphs, the method can further comprise, during the first systolic clock cycle, performing a second set of systolic pulses including: systolically pulsing data from the second processing unit of the first arrangement to the first processing unit of the first arrangement; systolically pulsing data from the third processing unit of the first arrangement to the sixth processing unit of the second arrangement; systolically pulsing data from the fourth processing unit of the first arrangement to the third processing unit of the first arrangement; systolically pulsing data from the sixth processing unit of the second arrangement to the fifth processing unit of the second arrangement; and systolically pulsing data from the eighth processing unit of the second arrangement to the seventh processing unit of the second arrangement.

In the method of any of the preceding paragraphs, the first set of systolic pulses can travel in a first direction through the first and second arrangements, wherein the second set of systolic pulses travel in a second direction through the first and second arrangements, wherein the first direction is opposite to the second direction.

In the method of any of the preceding paragraphs, the method can further comprise, during a second systolic clock cycle, performing a second set of systolic pulses including: systolically pulsing, from the second processing unit of the first arrangement to the seventh processing unit of the second arrangement, the data received from the first processing unit during the first systolic clock cycle; and systolically pulsing, from the third processing unit of the first arrangement to the sixth processing unit of the second arrangement, the data received from the fourth processing unit during the first systolic clock cycle.

In the method of any of the preceding paragraphs, the method can further comprise, via the seventh processing unit during the second systolic clock cycle, processing the data received from the second processing unit during the first systolic clock cycle, the processing performed according to computations of a node of the second layer of the neural network.

In the method of any of the preceding paragraphs, the method can further comprise, via the seventh processing unit during a third systolic clock cycle, processing the data received from the second processing unit during the second systolic clock cycle, the processing performed according to computations of the node of the second layer of the neural network.

In the method of any of the preceding paragraphs, the method can further comprise using a tag of the data received from the second processing unit to identify a weight to use for processing the data received from the second processing unit, the tag identifying that the data originated at the second processing unit.

In the method of any of the preceding paragraphs, the first interconnect and an additional connection with an adjacent processing unit of the second arrangement can allow the sixth processing unit to receive two data packets from two different sources.

Some embodiments include a device for performing computations of a neural network comprising at least a first layer and a second layer, the device comprising: a first processing unit configured to perform computations of a first node of the first layer of the neural network to generate a first output; a second processing unit configured to perform computations of a second node of the first layer of the neural network to generate a second output; and a third processing unit configured to perform computations of a third node of the second layer of the neural network, wherein the third processing unit includes: an input systolic element configured to receive, during a first systolic pulse clock cycle, the first output of the first processing unit and the second output of the second processing unit; a first convolutional engine configured to perform a first convolution on the first output to generate a first processed value; a second convolutional engine configured to perform a second convolution on the second output to generate a second processed value; and addition circuitry configured to receive and add the first and second processed values.

In the device of any of the preceding paragraphs, the device can further include a systolic processor chip, wherein the first, second, and third processing units comprise circuitry embedded in the systolic processor chip.

In the device of any of the preceding paragraphs, the systolic processor chip can comprise an array of processing units, wherein the first and second processing units form a portion of a first arrangement of the array, and wherein the third processing unit forms a portion of a second arrangement of the array.

In the device of any of the preceding paragraphs, the first convolutional engine can be further configured to perform the first convolution at least partly by multiplying the first output by a first weight; and the second convolutional engine is further configured to perform the second convolution at least partly by multiplying the second output by a second weight.

In the device of any of the preceding paragraphs, the third processing unit can be further configured to identify the first and second weights, from a dataset including a plurality of weights of the neural network, at least partly by: identifying a first tag attached to the first output; looking up the first weight in the dataset based on the first tag; identifying a second tag attached to the second output; and looking up the second weight in the dataset based on the second tag.

In the device of any of the preceding paragraphs, the first processing unit can comprise circuitry configured to attach the first tag to the first output, wherein the second processing unit comprises circuitry configured to attach the second tag to the second output.

In the device of any of the preceding paragraphs, the third processing unit can comprise a memory, the device further comprising a controller configured to assign the third processing unit to the third node and to store the first weight in the memory.

In the device of any of the preceding paragraphs, the third processing unit can further comprise: an input systolic element configured to receive data via systolic pulses and provide the data to the first and second convolutional engines; activation circuitry configured to perform an activation function on an output of the addition circuitry to generate an activation output; and an output systolic element configured to output the activation output via at least one systolic pulse.

In the device of any of the preceding paragraphs, the device can further comprise: a fourth processing unit configured to perform computations of a fourth node of the first layer of the neural network to generate a third output; and a fifth processing unit configured to perform computations of a fifth node of the first layer of the neural network to generate a fourth output, wherein the input systolic element of the third processing unit is further configured to receive the third and fourth outputs during a second systolic pulse clock cycle.

In the device of any of the preceding paragraphs, the first convolutional engine can be further configured to perform a third convolution on the third output to generate a third processed value; and the second convolutional engine is further configured to perform a fourth convolution on the fourth output to generate a fourth processed value.

In the device of any of the preceding paragraphs, the third processing unit can be further configured to feed the first output back into the first convolutional engine for the third convolution, and to feed the second output back into the second convolutional engine for the fourth convolution.

Some embodiments include a method for performing computations of a neural network comprising at least a first layer and a second layer, the method comprising: performing, by a first processing unit, computations of a first node of the first layer of the neural network to generate a first output; performing, by a second processing unit, computations of a second node of the first layer of the neural network to generate a second output; performing, by a third processing unit, computations of a third node of the second layer of the neural network, wherein performing computations of the third node includes: receiving the first and second outputs during a first systolic pulse clock cycle; using a first convolutional engine of the third processing unit to perform the first convolution on the first output to generate a first processed value; using a second convolutional engine of the third processing unit to perform a second convolution on the second output to generate a second processed value; and summing the first and second processed values.

In the method of any of the preceding paragraphs, the method can further comprise: performing the first convolution at least partly by multiplying the first output by a first weight; and performing the second convolution at least partly by multiplying the second output by a second weight.

In the method of any of the preceding paragraphs, the method can further comprise: identifying a first tag attached to the first output; identifying a second tag attached to the second output; looking up the first weight in a dataset based on the first tag, wherein the dataset includes a plurality of weights of the neural network; and looking up the second weight in the dataset based on the second tag.

In the method of any of the preceding paragraphs, the method can further comprise tagging the first output with the first tag by an output systolic element of the first processing unit, wherein the tag is indicative of an address for the first processing unit.

In the method of any of the preceding paragraphs, the method can further comprise systolically pulsing the first output with the first tag to an input systolic element of the third processing unit.

In the method of any of the preceding paragraphs, the method can further comprise: performing, by a fourth processing unit, computations of a fourth node of the first layer of the neural network to generate a third output; performing, by a fifth processing unit, computations of a fifth node of the first layer of the neural network to generate a fourth output; and receiving the third and fourth outputs during at the third processing unit during a second systolic pulse clock cycle.

In the method of any of the preceding paragraphs, the method can further comprise: performing, via the first convolutional engine, a third convolution on the third output to generate a third processed value; and performing, via the second convolutional engine, a fourth convolution on the fourth output to generate a fourth processed value.

In the method of any of the preceding paragraphs, the method can further comprise summing the third and fourth processed values with the first and second processed values.

In the method of any of the preceding paragraphs, the method can further comprise: feeding the first output back into the first convolutional engine for the third convolution; and feeding the second output back into the second convolutional engine for the fourth convolution.

In the method of any of the preceding paragraphs, feeding the output of the first convolution engine back into the first convolution engine can be performed incrementally based on a systolic pulse.

Some embodiments include a device for performing computations of a neural network comprising at least first, second, and third layers, the device comprising: a first systolic processing chip including at least: a first arrangement of first processing units, and a second arrangement of second processing units, wherein the first arrangement of first processing units is configured to systolically pulse data to the second arrangement of second processing units; a second systolic processing chip including at least a third arrangement of third processing units, wherein the second systolic processing chip is configured to receive data output from the second arrangement of first systolic processing chip and provide the data to the third arrangement of processing units; and at least one controller configured to: assign at least a subset of the first processing units of the first arrangement to perform computations of particular nodes of the first layer of the neural network, assign at least a subset of the second processing units of the second arrangement to perform computations of particular nodes of the second layer of the neural network, and assign at least a subset of the third processing units of the third arrangement to perform computations of particular nodes of the third layer of the neural network.

In the device of any of the preceding paragraphs, each of the first and second arrangements of processing units comprise circuitry that can be embedded in the first systolic processing chip.

In the device of any of the preceding paragraphs, the subset of the first processing units can be configured to:

process input values of the neural network to generate first activation output values; and systolically pulse the first activation output values to at least the subset of the second processing units; the subset of the second processing units is configured to process the first activation output values to generate second activation output values; and the at least one controller is further configured to transmit the second activation output values to the third arrangement of third processing units.

In the device of any of the preceding paragraphs, the first systolic processing chip can be configured to systolically pulse the second activation output values through the second arrangement of second processing units to a memory.

In the device of any of the preceding paragraphs, the at least one controller can be further configured to retrieve the second activation outputs from the memory and provide the second activation outputs to the second systolic processing chip.

In the device of any of the preceding paragraphs, the computations of a particular one of the second processing units can include multiplication of an activation output received from one of the subset of the first processing units with corresponding weights.

In some embodiments, one or more of the corresponding weights can be stored locally at the one of the subset of the second processing units.

In the device of any of the preceding paragraphs, one or more of the corresponding weights can be retrieved from a memory external to the one of the subset of the second processing units.

In the device of any of the preceding paragraphs, the at least one controller can be further configured to: initially configure the first and second systolic processing chips to perform forward propagation according to the neural network, and subsequently configure the first and second systolic processing chips to back propagate deviations from expected outputs.

In the device of any of the preceding paragraphs, the at least one controller can be further configured to update weights of the neural network based on the back propagation.

Some embodiments include a method for performing computations of a neural network comprising at least first, second, and third layers, the method comprising: assigning at least a subset of first processing units of a first arrangement of a first systolic processing chip to the first layer of the neural network; assigning at least a subset of second processing units of a second arrangement of the first systolic processing chip to the second layer of the neural network; assigning at least a subset of third processing units of a third arrangement of a second systolic processing chip to the third layer of the neural network; receiving input data of the neural network; processing the input data using the subset of the first processing units to generate first activation output values; systolically pulsing the first activation output values to the subset of the second processing units; processing the first activation output values using the subset of the second processing units to generate second activation output values; and processing the second activation output values using the subset of the third processing units of the second systolic processing chip.

In the method of any of the preceding paragraphs, the method can further comprise systolically pulsing the second activation output values through the second processing units of the second arrangement to a memory.

In the method of any of the preceding paragraphs, the method can further comprise: retrieving the second activation outputs from the memory; and providing the second activation outputs to the second systolic processing chip.

In the method of any of the preceding paragraphs, processing the first activation output values can comprise, via one of the subset of second processing units, multiplying at least one of the first activation output values with a weight.

In the method of any of the preceding paragraphs, the method can further comprise retrieving the weight from a local memory of the one of the subset of second processing units.

In the method of any of the preceding paragraphs, the method can further comprise retrieving the weight from a memory external to the one of the subset of second processing units.

Some embodiments include a non-transitory computer storage medium storing computer-executable instructions that, when executed by a processor, cause the processor to perform the following method: assigning at least a subset of first processing units of a first arrangement of a first systolic processing chip to a first layer of a neural network including at least the first layer and second and third layers; assigning at least a subset of second processing units of a second arrangement of the first systolic processing chip to the second layer of the neural network; assigning at least a subset of third processing units of a third arrangement of a second systolic processing chip to the third layer of the neural network; receiving input data of the neural network; processing the input data using the subset of the first processing units to generate first activation output values; systolically pulsing the first activation output values to the subset of the second processing units; processing the first activation outputs using the subset of the second processing units to generate second activation output values; and processing the second activation output values using the subset of the third processing units of the second systolic processing chip.

In the operation of any of the preceding paragraphs, the method can further comprise systolically pulsing the second activation output values through the second processing units of the second arrangement to a memory.

In the operation of any of the preceding paragraphs, processing the first activation output values can comprise, via one of the subset of second processing units, multiplying at least one of the first activation output values with a weight.

In the operation of any of the preceding paragraphs, the method can further comprise retrieving the weight from a local memory of the one of the subset of second processing units.

In the operation of any of the preceding paragraphs, the method can further comprise performing back propagation on the first processing chip and performing back propagation on the second processing chip.

In the operation of any of the preceding paragraphs, performing back propagation can begin on the second processing chip, and an output of the back propagation on the second processing chip is fed as input of the first processing chip for continuing the back propagation on the first processing chip.

In the operation of any of the preceding paragraphs, performing back propagation on the first processing chip can include saving a deviation from the output of the second processing chip to a deviation memory, and transmitting the deviation from the deviation memory as input to the second arrangement of the first processing chip. In general, this disclosure describes a special-purpose hardware processor that accelerates computation using neural networks, both during the training and inference stages of machine learning. Hardware acceleration is the use of computer hardware to perform some functions more efficiently than is possible in software running on a more general-purpose central processing unit ("CPU"). Due to the large volume of computations performed while training or using neural networks, such neural network computations can be problematic because they are computationally expensive in that they consume large amounts of processing resources. Further, another problem is that neural networks execute a piece at a time on different processing devices, with the computations later combined to get the end result.

For this reason, conventional CPUs are typically considered not to be most well suited for neural network processing. This can be due to the time required to complete neural network calculations using a CPU, as well as the high usage of CPU bandwidth while the CPU is still needed for managing other computer functions. Some existing approaches take advantage of the parallel processing capabilities of graphics processing units ("GPUs") for this purpose. However the power costs of using the GPU are much higher than those of the CPU. The tensor processing unit ("TPU") is a special-purpose machine learning processor. However the TPU is only usable for inference and does not support the types of computations that are required for training a new neural network.

The present disclosure addresses these problems, among others, using a special-purpose hardware accelerator and associated data processing techniques that can perform specialized machine learning tasks during both training and inference stages. The benefits of some embodiments of the present disclosure include more efficiently processing various aspects of the neural network than conventional processors (e.g., using less processing time and/or power costs). For example, this hardware accelerator (referred to herein as a "systolic neural network engine") uses a systolic array having a number of data processing units ("DPUs") that are each connected to a small number of other DPUs in a local region. Data from the many nodes of a neural network is pulsed through these DPUs with associated tags that identify where such data was originated or processed, such that each DPU has knowledge of where incoming data originated and thus is able to compute the data as specified by the architecture of the neural network. Further, these tags enable the systolic neural network engine to perform computations during backpropagation, such that the systolic neural network engine is able to support training. Further details of the systolic neural network engine are provided in the detailed description.

As described above, the present disclosure relates to an improved processor for use in machine learning training and inference, referred to herein as a systolic neural network engine. The systolic neural network engine defines reconfigurable building blocks and interconnect resources. A control processor can execute instructions based on user-facing software that enables users to specify particular deep neural network ("DNN") architectures and parameters to be used, where the instructions map these DNNs to the available hardware of the systolic neural network engine. This available hardware is referred to herein as a field-programmable fabric. Besides the field-programmable fabric, systolic neural network engine dies include the control processor for communicating and/or assigning identities to each worker and setting up the interconnects on die. As used herein, a worker refers to the processing component (e.g., specialized logic circuitry) of a single DPU of the systolic array.

The processor together with the programmable fabric and workers of the systolic neural network engine may be implemented in some embodiments as a system on chip ("SoC"). An SoC refers to an integrated circuit (also known as an "IC") that integrates or embeds the components of the system into a single substrate (or a bonded stack of substrates). The substrate of the SoC refers to a thin, planar wafer of material (e.g., a semiconductive material such as silicon) that serves as the foundation upon which electronic components of the SoC (e.g., transistors, diodes, electronic circuits) are deposited. Thus, the disclosed systolic neural network engine includes a substrate provided with electronic components that form the memory and processing components of the SoC as described in more detail below. As such, the memory and processing components of the SoC are referred to as "embedded" in the chip of the SoC.

As would be appreciated by one of skill in the art, the disclosed processing device (e.g., the systolic neural network engine) and associated processing techniques represent a significant technical advance over prior implementations. Specifically, the use of systolic pulses for layer-to-layer data transfer enables processing of an entire neural network to be performed on a single chip, in implementations where the neural network has less than or equal to the number of processing arrangements of the systolic neural network engine. This avoids or minimizes the latencies associated with generating activation outputs of a single layer at a time, and storing and fetching these activation outputs from an external memory. In addition, the configuration of systolic data transfer connections—both connections between adjacent processing units within an arrangement, and interconnections between certain processing units of adjacent arrangements—provides a number of benefits. These include, for example, significantly minimizing the number of wired connections that would result from directly connecting processing units according to the node-to-node connections of a given neural network. In addition, the number and placement of systolic data transfer connections and interconnections (and associated number of convolution engines within each processing unit) can speed up processing time by allowing processing units to receive and process multiple data packets during a given systolic clock cycle. Further, the systolic data transfer connections create a versatile chip that can be used with a wide variety of neural network models, because the hard wiring of the chip is not designed around a specific model. Additionally, the disclosed output tagging provides benefits that include enabling downstream processing units to receive and process data packets in different orders from one another, by providing information that can be used to identify an appropriate weighting for a given activation output. Another benefit of the tagging includes enabling the systolic neural network engine to be used for back propagation in addition to forward propagation, which can allow users to train new neural networks using the systolic neural network engine. As such, the embodiments described herein represent significant improvements in computer-related technology.

Some embodiments will now be described with reference to the figures. In the following description, numerous details are set forth to provide an understanding of various embodiments and/or features. It will be understood, however, by those skilled in the art that some embodiments may be practiced without many of these details and that numerous variations or modifications from the described embodiments are possible.

FIG. 1 is a schematic diagram of an artificial neural network 10. Such artificial neural networks are used to model complex relationships between inputs and outputs or to find patterns in data, where the dependency between the inputs and the outputs cannot be easily ascertained. The neural network 10 includes an input layer 11A, two intermediate ("hidden") layers 11B, 11C, and an output layer 11D, with each layer including a number of nodes 15. The number of nodes 15 can vary between layers. A neural network is considered "deep" when it includes two or more hidden layers. The nodes in each layer connect to some or all nodes in the subsequent layer and the weights of these connections 12, 14 are typically learnt from data during the training process, for example through backpropagation in which the network parameters are tuned to produce expected outputs given corresponding inputs in labeled training data. Thus, the artificial neural network 10 is an adaptive system that is configured to change its structure (e.g., the connection configuration and/or weights) based on information that flows through the network during training, and the weights of the hidden layers can be considered as an encoding of meaningful patterns in the data.

The example depicted neural network 10 is a fully connected neural network, that is, each node in the input layer 11A is connected to each node in the first hidden layer 11B, each node in the first hidden layer 11B is connected in turn to each node in the subsequent hidden layer 11C, and so on until each node in the final hidden layer is connected to each node in the output layer 11D.

Though the example neural network 10 is depicted with a particular number of nodes, layers, and connections, the disclosed systolic neural network processing engine can process calculations for a variety of neural network architectures. For example, the disclosed systolic neural network processing engine can process calculations for both fully connected neural networks and partially connected neural networks (e.g., where all nodes in adjacent layers are not connected). As another example, the disclosed systolic neural network processing engine can process calculations for convolutional neural networks ("CNNs").

A CNN is a type of artificial neural network that is commonly used for image analysis. Like the artificial neural network described above, a CNN is made up of nodes and has learnable weights. However, the nodes of a layer are only locally connected to a small region of the width and height layer before it (e.g., a 3×3 or 5×5 neighborhood of image pixels), called a receptive field. The hidden layer weights can take the form of a convolutional filter applied to the receptive field. In some implementations, the layers of a CNN can have nodes arranged in three dimensions: width, height, and depth. This corresponds to the array of pixel values in each image (e.g., the width and height) and to the number of channels processed (e.g., the depth). The nodes in each convolutional layer of a CNN can share weights such that the convolutional filter of a given layer is replicated across the entire width and height of the input volume (e.g., across an entire frame), reducing the overall number of trainable weights and increasing applicability of the CNN to data sets outside of the training data. Values of a layer may be pooled to reduce the number of computations in a subsequent layer (e.g., values representing certain pixels, such as the maximum value within the receptive field, may be passed forward while others are discarded). Further along the depth of the CNN pool masks may reintroduce any discarded values to return the number of data points to the previous size. A number of layers, optionally with some being fully connected, can be stacked to form the CNN architecture.

Such artificial neural networks pose a wire routing challenge to very large scale integration ("VLSI") system architectures. As shown by the connections 12 in FIG. 1, the nodes in the input layer 11A each output their signal to many other nodes in a large "fan out" configuration. Similarly, as shown by the connections 14 in FIG. 1, the nodes in the output layer 11D each receive input signals from many other nodes in a large "fan in" configuration. Physically connecting processing units in a manner corresponding to the fan in and fan out configuration creates a serious difficulty with respect to placing and routing a large number of wires. Moreover, as this would involve actual physical wires, once placed, such wiring would not be reconfigurable. Such a preconfigured design would not be able to be modified to accommodate different network structures, creating a very limited purpose processor specific to a particular neural network architecture. Assuming N neurons in one layer are fully connected to N neurons in a subsequent layer, the number of wires to physically effect such connections the nodes becomes a function of $N^2$. Some neural networks can involve millions of nodes, so it will be appreciated that the wiring problem is a significant challenge. There is therefore a need to find a better way to realize a hardware design for fully connected artificial neural networks, without necessarily limiting the design to processing according to a particular network architecture.

To overcome the wiring challenge of directly connecting processing nodes of a neural network, the disclosed systolic neural network engine implements a systolic array. The systolic array is a matrix-like network of data processing units ("DPUs") that are hard-wired to neighboring DPUs, where data are pulsed (e.g., transmitted in a pulsed fashion) through the network. The systolic array can be a rectangular arrangement of DPUs embedded in the SoC, where data flows across the array between neighbor DPUs, and where different data may flow in different directions. Each DPU is configured to independently compute a partial result as a function of the data received from an upstream DPU, store the result within itself, and pass the result downstream. Each DPU may be configured to perform the same type of calculation. One of the benefits of the disclosed systolic arrays is that they may perform calculations on a superior basis compared to other types of processors, as the repetitive nature of the calculations performed at the nodes of the neural network are efficiently performed by DPUs designed to perform such functions. Furthermore, in some implementations only DPUs at the border of the systolic array matrix are wired to access memory, and data retrieved from (or sent to) the memory is passed in systolic pulses to (or from) other DPUs. This can diminish the requirements on the memory or storage system to provide timely data, therefore avoiding a memory input/output bottleneck. In addition, the systolic array is adaptable for use with a variety of different neural network architectures, rather than being hard wired according to the connection structure of a particular network.

Figure 2:
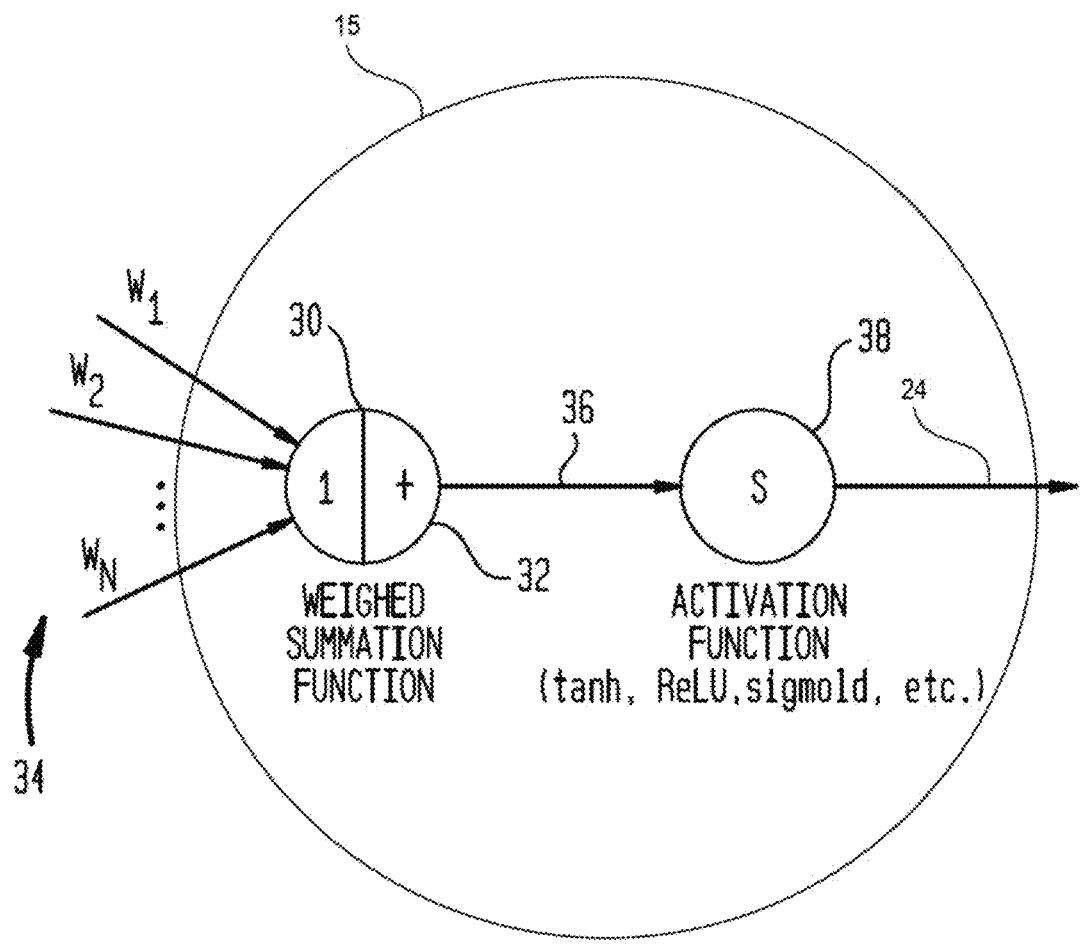
FIG. 2 depicts example computations performed by a node of the neural network of FIG. 1 according to some embodiments.

FIG. 2 depicts a diagram of computations during a forward pass of information through an example node 15 of the network 10, which may be performed by a DPU of the disclosed systolic neural network engine. The node 15 combines a number of inputs 34 and produces an output 24 which can be passed to nodes in subsequent layers of the network 10. In combining the inputs 34, weights W1 to WN are applied to respective ones of the N different inputs using a weighted summation function 30. Since the output is a weighted summation of inputs, the order in which the weighted sums are taken does not affect the resulting weighted summation 36 due to the commutative property of addition. As described below, according to the present disclosure this commutative property of the weighted summation function 30 is exploited to hardware architecture benefit. The weighted summation 36 is provided to an activation function 38, such as the sigmoid function, rectifier function (nodes implementing the rectifier function are also referred to as a rectified linear unit ("ReLU")), hyperbolic tangent function ("tan h"), softmax function, or other suitable linear or non-linear activation function. The activation function takes the weighted input and determines whether or not, and/or how, to pass the weighted input as a signal, for example by mapping it to values between 0 and 1 (e.g., the sigmoid function) or −1 to 1 (e.g., the tan h function).

Beneficially, the DPUs of the disclosed systolic neural network engine can process input data such that time of receipt of data is irrelevant to identify the appropriate weighting, where each input data packet is identified as having originated from a particular other DPU such that the appropriate weight for that input can be accessed from memory. The disclosed systolic neural network engine is also able to transmit data between DPUs such that results from the nodes of one layer of a neural network are pulsed directly to DPUs assigned to perform calculations for the nodes of another layer of the neural network. Unlike existing processors, which use the same processing hardware for the calculations in each layer and thus have to send results from a first layer to a memory or buffer to then fetch them back to perform computations for the next layer, the systolic pulsing of data between DPUs beneficially does not require this push/fetch with a memory or buffer for inter-layer processing. This can result in decreased processing time, for example providing for data processing and transmission from one layer to another within a specific number of clock cycles. The DPUs can also be dynamically configured according to the computational load of a particular neural network in order to optimize usage of the DPUs and at the same time avoid memory/storage bottlenecks. Certain embodiments of the disclosed systolic neural network engine overlap transmission of data between DPUs and calculations by DPUs.

The data provided to the DPUs may be accompanied with tags to allow for tracking and identification of data through the process. Such tags added to the data allow for identification of correct weights for inputs during forward propagation through the network, providing flexibility with respect to how data packets are pulsed between DPUs. The tags added to the data may not only inform DPUs of the originating processing DPU for a particular packet of data, but may also be used to inform the DPUs of the arrival of valid data. A check function, therefore, may be added to the DPU such that processing does not occur prior to a verification of the tag. These tags also enable a means of distributed control since their content can influence the operation on data at DPUs.

The disclosed systolic neural network engine can beneficially be used during both the inference and training stages of machine learning. The disclosed tags enable backpropagation of data through the DPUs and the modification of the weight values applied to inputs. Backpropagation, short for "backward propagation of errors," is an algorithm for supervised learning of artificial neural networks using gradient descent. Given an artificial neural network and an error function, backpropagation calculates the gradient of the error function with respect to the neural network's weights. Backpropagation inverts the flow of data relative to inference. That is, calculation of the gradient proceeds backwards through the network, with the gradient of the final layer of weights being calculated first and the gradient of the first layer of weights being calculated last.

Accordingly, in some embodiments, the direction of a pointer increment in each DPU is also inverted during training (e.g., backpropagation) relative to the direction of that pointer used during inference-stage processing (e.g., forward propagation). During backpropagation, the pointer points to the weights to be multiplied by the error/deviation propagating through the layers from the Deep Neural Network (DNN) output. In an example embodiment for supervised learning, data may be input into the neural network and forward propagated to the output layer. The values of nodes at the output layer may then be compared to expected correct output values. An amount of error from the calculated output and the correct output is backpropagated and used to calculate the corresponding amount of errors in each processing node of the deep neural network all the way towards the input layer.

Figure 3:
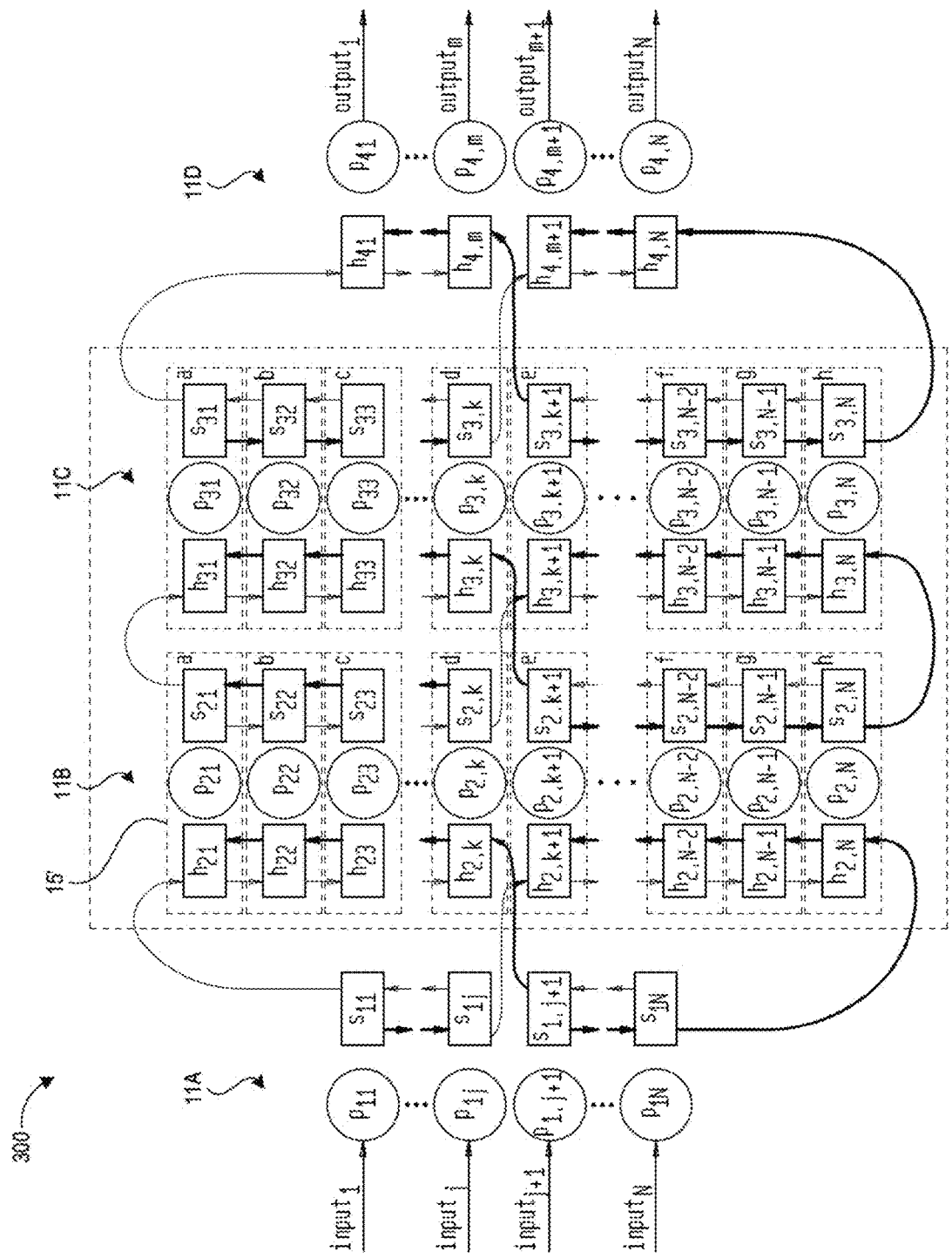
FIG. 3 is a block diagram of an embodiment of a systolic neural network engine as described herein according to some embodiments.

FIG. 3 illustrates an embodiment of the systolic neural network engine 300 including an array of DPUs 15'. A DPU 15' can perform the computations of one or more nodes 15 of the neural network 10. Similar to the network 10 of FIG. 1, the illustrated embodiment includes DPUs mapped to an input layer ($p_{11}$-$p_{1N}$), two hidden layers ($p_{21}$-$p_{2N}$ and $p_{31}$-$p_{3N}$), and an output layer ($p_{41}$-$p_{4N}$). Each DPU 15' can be assigned to perform computations of one or more nodes 15 in an individual layer. The weights of the neural network are programmable from an Advanced High-performance Bus, for example an AHB-Lite bus, into every DPU. In other embodiments the DPUs 15' of the systolic neural network engine 300 can be mapped to the nodes of other neural network architectures having greater or fewer layers. Further, the physical arrangement of DPUs 15' need not necessarily reflect the arrangement of nodes in the neural network, as the disclosed tagged systolic pulsing of data through the systolic neural network engine 300 enables sharing of node outputs among the DPUs. Variations of the systolic neural network engine 300 can have different numbers and arrangements of DPUs than illustrated in the embodiment of FIG. 3.

The DPUs 15' include a triplet "h-p-s" architecture. The "h" blocks represent destination systolic elements that receive and transmit input values (e.g., values to be processed at the DPU) with adjacent destination systolic elements. The "p" blocks represent the processing hardware of the DPU, example functions of which are discussed in more detail with respect to FIG. 5. The "s" blocks represent sourcing systolic elements that receive and transmit output values (e.g., values of the result of processing at a given DPU) with adjacent sourcing systolic elements. Each destination systolic element ("h") can be connected (e.g., via a hard wire connection) to one or more adjacent destination systolic elements, and similarly each sourcing systolic element ("s") can be connected (e.g., via a hard wire connection) to one or more adjacent sourcing systolic elements. This wiring configuration, in combination with the disclosed tagged systolic pulses, enable space-efficient wiring while still passing all needed values to each DPU, as well as enabling a flexible processing architecture that can be adapted to a variety of neural network architectures. The destination and sourcing systolic elements include shift registers, with the sourcing systolic element additionally including tagging circuitry for adding tags to output processed data packets. During forward propagation, the destination systolic elements shift data in a train one position at a time, for example using a linear shift register. The sourcing systolic element also shifts data in a similar manner, and additionally performs data tagging. During backpropagation, the destination and sourcing elements also perform such data shifting, and additionally assist with multiplying partial derivatives that come from downstream by the corresponding weights. This can be considered as a shift and accumulation function.

The systolic neural network engine 300 includes a number of arrangements of DPUs for performing the computations of various layers of the neural network. In some implementations these may be linear parallel arrangements, such as the depicted columns assigned to the hidden layers 11B and 11C. The processing units in an arrangement systolically pulse data to adjacent processing units in the arrangement via the sender and receiver blocks (destination ("h") and sourcing ("s") systolic elements), and adjacent arrangements are connected by one or more crossover connections. The transmission of packets between destination ("h") and sourcing ("s") systolic elements is illustrated by the arrows, which represent illustrative data flow along wired connections. Activation outputs from the first hidden layer 11B are transferred to the second hidden layer 11C systolically using flow in both upward and downward directions between destination and sourcing systolic elements, as depicted by the arrows in FIG. 3. A cross-over connection at the halfway point (based on the number of nodes in each hidden layer) can beneficially speed the transfer, as described in more detail with respect to FIG. 4C. Assuming N nodes in each of the hidden layers, in N systolic pulses, every one of the DPUs performing processing of nodes in the second hidden layer 11C will have seen the activation outputs from each one of the DPUs performing processing of nodes in the first hidden layer 11B.

Further, each DPU performing processing of nodes in the second hidden layer 11C can start the computation of its weighed sum of activation signals as soon as the first activation signal from the previous layer is received. Each DPU can also finish its weighted sum of activation signals in N systolic pulses. Therefore, the delay in transferring the activation signals from one layer to the next is hidden as this delay is overlapped by the computation in each receiving node. Moreover, additional cross-over paths can be added to beneficially speed up the transfer of activation outputs from one layer to the next.

The DPUs 15' transfer these data packets in intervals called systolic pulses. These pulses may be controlled through a clock (not illustrated), or may be controlled based on a determination of a maximum amount of time during which processing will occur during a given clockwise convolution or counterclockwise convolution. Each of the DPUs 15' provided in the systolic neural network engine 300 may process data packets (e.g., $input_1$-$input_N$ values and/or output results of other DPUs) that have been provided with tags (as previously described), for example in a manner similar to that described with respect to FIG. 2. Thus, the systolic neural network engine 300 allows for an overall pipelined operation of the processing of the data packets for computations within a neural network.

Contrary to the activation signals that need to be routed to all DPUs of the following layer, the weights used by the following layer are specific to each node in the preceding layer. Thus, systolic techniques are appropriately used in transferring activation signals, but weights are directly transferred (e.g., not by systolic means). For example, once a particular DPU is assigned to process data as a particular node by the control processor, the required weights can be stored in a memory of that particular DPU.

Figure 4A:
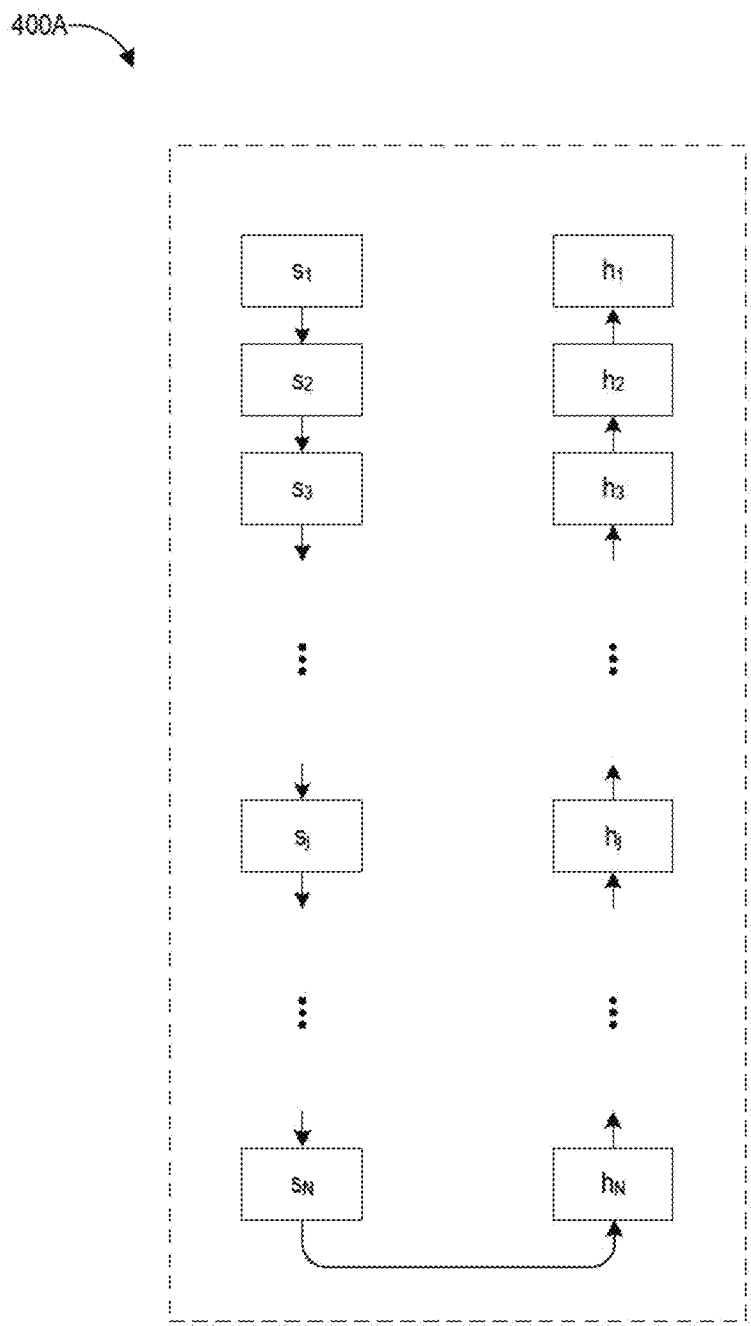
FIGS. 4A-4C depict embodiments of systolic pulses through the systolic neural network engine of FIG. 3, the systolic pulses corresponding to data passed through nodes of the hidden layers of the neural network of FIG. 1 according to some embodiments.
Figure 4B:
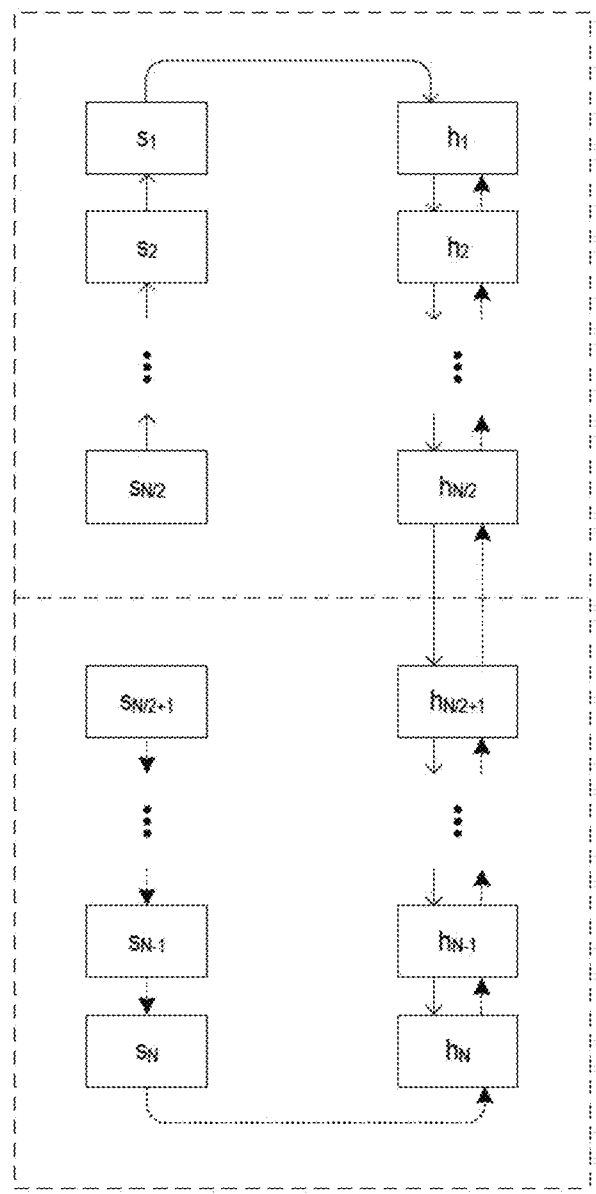
Figure 4C:
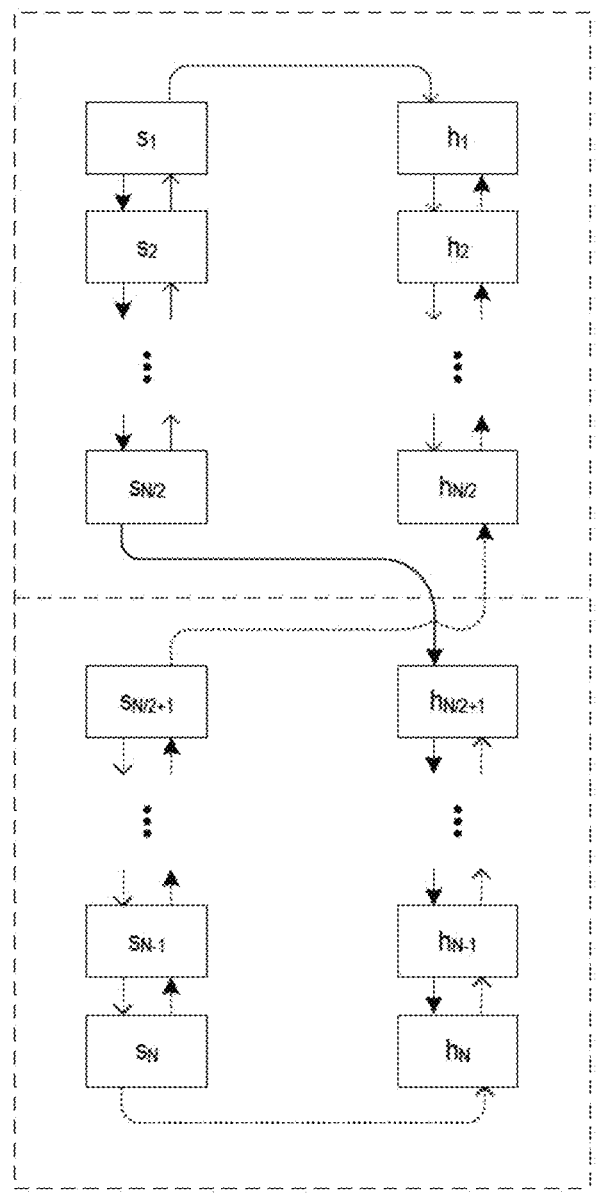

FIGS. 4A-4C depict embodiments of systolic pulses through a portion of the systolic neural network engine of FIG. 3, with the illustrated systolic pulses corresponding to data passed through nodes of the hidden layers of the neural network of FIG. 1 ($s_1$-$s_N$ and $h_1$-$h_N$). For purposes of this example, it is assumed that there are the same number N processing nodes in each of the first hidden layer 11B and second hidden layer 11C. In FIGS. 4A-4C, the s* blocks represent sourcing systolic elements of DPUs that have been assigned to perform processing of nodes in the first hidden layer 11B of the network 10, and the h* blocks represent destination systolic elements of DPUs that have been assigned to perform processing of nodes in the second hidden layer 11C of the network 10. The layout of the s* and h* blocks may or may not correspond to the actual physical layout of the corresponding DPUs in a SoC systolic neural network engine (e.g., DPUs performing the processing of the first hidden layer 11B may or may not necessarily be arranged in a single continuous arrangement, such as a column, as in the illustrative diagram, and likewise for the DPUs of the second hidden layer 11C). The outputs from s* blocks will reach the h* blocks with different delay and order depending on specific s* and h* block positions in the systolic array. The DPUs include special processing block structures to handle different delay and order of data with simple cells, as described in more detail below with respect to FIGS. 4A-4C.

FIG. 4A illustrates a first embodiment of the hidden layer systolic pulses 400A. In this embodiment, systolic pulses flow in a single direction through the s* blocks such that the value of the first s* block $s_1$ travels through subsequent s* blocks to the final s* block $s_N$. Thus, block $s_1$ will pass its value to block $s_2$, block $s_2$ will pass its value and the value received from block $s_1$ to block $s_3$, and so on. From the final s* block $s_N$, all s* block values are passed in systolic pulses to the final h* block $h_N$. Systolic pulses flow in a single direction through the h* blocks such that the values transmitted from the final h* block $h_N$ travels through the h* blocks to the first h* block $h_1$. Thus, all h* blocks will have seen all s* blocks' outputs in a number 2N of systolic pulses, where N corresponds to the number of nodes in each layer. Because of the path of systolic data flow, the final h* block $h_N$ will see all values the first h* block $h_1$. However, because of the data source tags and the commutative property of addition (e.g., for computing the weighted summation), there is no consequence in terms of the ability of these blocks to accurately process the required data.

FIG. 4B illustrates a second embodiment of the hidden layer systolic pulses 400B. In this embodiment, systolic pulses flow in a first direction through a first half of the s* blocks ($s_{N/2}$ through $s_1$) and in a second direction through a second half of the s* blocks ($s_{N/2+1}$ through $s_N$). In FIG. 4B, the data flowing in the first direction is illustrated by the line-tipped arrows, while data flowing in the second direction is illustrated by the triangle-tipped arrows. These arrows can represent a single multi-lane transmission along a single wire in some implementations. As illustrated by the arrows, the pulses flowing in the first direction are sent from the first s* block $s_1$ to the first h* block $h_1$, and from there travel through all h* blocks to the final h* block $h_N$. The pulses flowing in the second direction are sent from the final s* block $s_N$ to the final h* block $h_N$, and from there travel through all h* blocks to the first h* block $h_1$. Thus, all h* blocks will have seen all s* blocks' outputs in a number 3N/2 of systolic pulses.

FIG. 4C illustrates a third embodiment of the hidden layer systolic pulses 400C. In this embodiment, interconnections exist between the s* blocks and the H nodes at the S1, SN/2, SN/2+1, and SN nodes and their counterparts. In the third embodiment, systolic pulses flow in first and second directions through a first half of the s* blocks ($s_{N/2}$ through $s_1$) and in third and fourth directions through a second half of the s* blocks ($s_{N/2+1}$ through $s_N$). In FIG. 4C, the data flowing in the first direction are illustrated by the solid line-tipped arrows, data flowing the second direction are illustrated by the solid triangle-tipped arrows, data flowing in the third direction are illustrated by the dashed line-tipped arrows, and data flowing in the fourth direction are illustrated by the dashed triangle-tipped arrows. These arrows can represent a single multi-lane transmission along a single wire in some implementations.

In the third embodiment 400C, pulses flow in the first direction from the first s* block $s_1$ through the first half of the s* blocks to block $S_{N/2}$, and then from block $S_{N/2}$ to block $h_{N/2+1}$ along one of the interconnections. From block $h_{N/2+1}$, the data flows through the second half of the h* blocks to block $h_N$. Pulses also flow through the first half of the s* blocks from block $S_{N/2}$ to the first s* block $s_1$, and then from block $s_1$ to block $h_1$ along another one of the interconnections. From block $h_1$, the data flow through the first half of the h* blocks to block $h_{N/2}$. Pulses flow in the third direction through the second half of the s* blocks from block $S_{N/2+1}$ to block $S_N$, and then from block $S_N$ to block $h_N$ along another one of the interconnections. From block $h_N$, the data flow through the second half of the h* blocks to block $h_{N/2+1}$. Pulses also flow through the second half of the s* blocks from block $s_N$ to block $s_{N/2+1}$, and then from block $S_{N/2+1}$ to block $h_{N/2}$ along another one of the interconnections. From block $h_{N/2}$, the data flow through the first half of the h* blocks to block $h_1$. Thus, all h* blocks will have seen all s* blocks' outputs in a number N of systolic pulses. For this reason, the third embodiment 400C may be preferred in some implementations of the systolic neural network engine 300 due to transmitting all values in the fewest number of pulses. The systolic flow of the FIG. 4C configuration speeds up the data transfer process relative to that of FIG. 4A, but the order in which each h* block receives the data from the s* blocks is different. However, again because of the data source tags and the commutative property of addition, there is no consequence in terms of the ability of these blocks to accurately process the required data.

Figure 5:
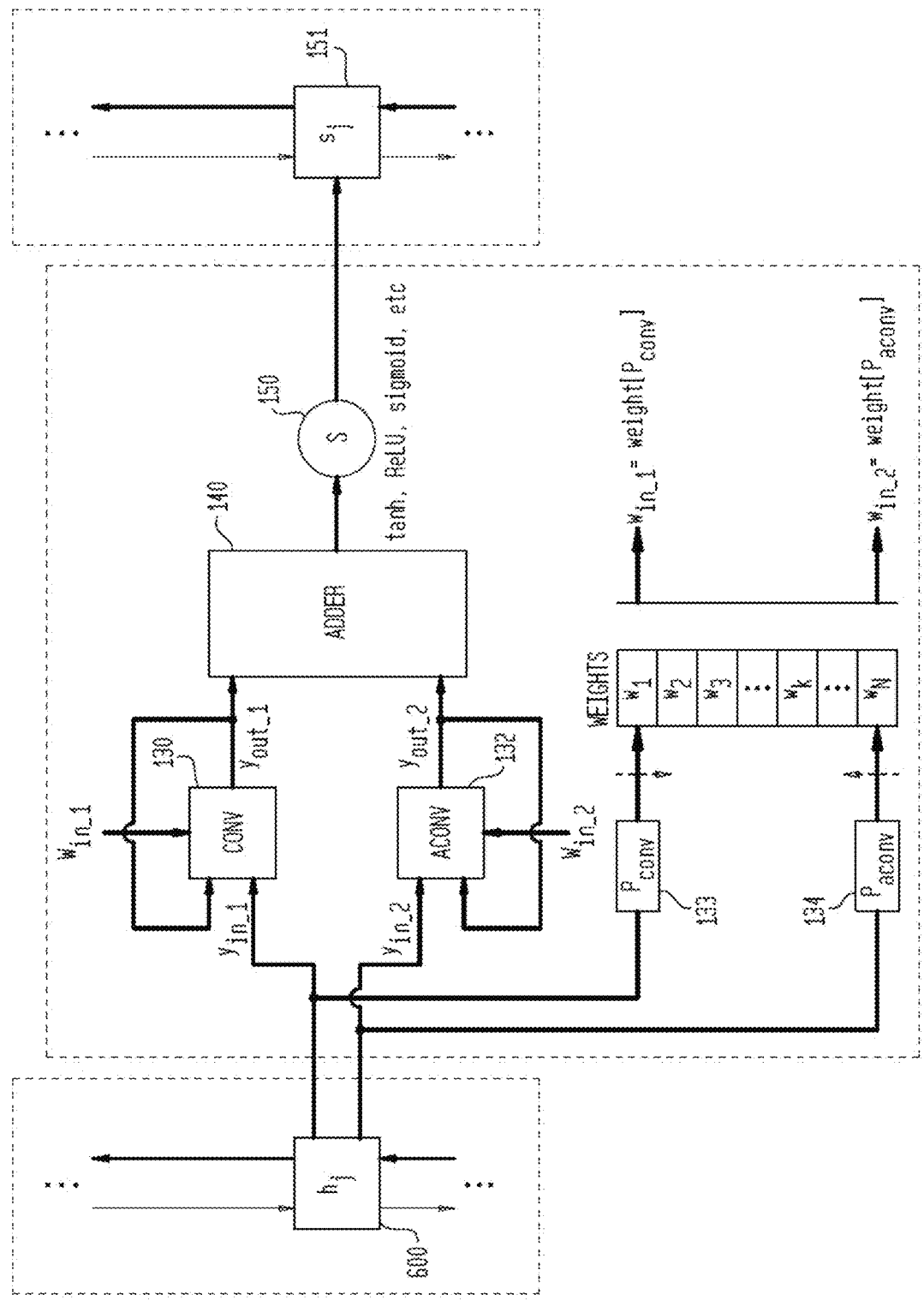
FIG. 5 is a diagram of DPUs of the systolic neural network engine of FIG. 3 configured for performing clockwise and counter clockwise convolutions according to some embodiments.

With reference now to FIG. 5, additional advantages of the neural network taught in the present disclosure include the ability to distribute information and control signals along with data throughout the neural network during systolic pulses of data packets. Systolic arrays can distribute data using cyclic systolic pulses (for example, based on a clock signal). The signals can be sent from one node to another using a shift register synchronously. In some embodiments, the pulse can be sent once per clock signal, a multiple of a clock signal (for example, every four clocks), a multiple of a frequency, and/or the like. The data can move from one portion of the neural network to another portion of the neural network via systolic transfer through the DPUs. Computation of node-specific functions can occur after moving the data from one portion of the neural network to another portion of the neural network. Such computations can include multiplication and/or addition functions.

The distribution of information and/or control signals throughout the neural network can be done during forward propagation and backpropagation. The placement of feedback-based convolutions (clockwise and anticlockwise) 130, 132 beneficially allows for simple circuitry and saving of hardware. In other embodiments, the hardware used in both convolutions 130 and 132 can be shared. In addition, as compared to conventional neural network processing where data are typically accessed from shared memory at each cycle when propagated among nodes, the disclosed systolic neural network engine eliminates and/or reduces that requirement by directly propagating inter-layer data between DPUs, and as such eliminates and/or reduces the wait time required for those memory accesses. As computing time continues to decrease due to advances in processor technology, the portion of time devoted to memory accesses becomes an increasingly noticeable processing delay. As such, the systolic neural network engine approach provides a significant benefit that enables scalability to larger neural networks.

Systolic arrays can be used to perform neural network computations. Some systolic arrays compute values for a single layer at time. The systolic array can perform parallel computation for nodes of the single layer. However, such systolic arrays require the output of this layer to be sent to a buffer and/or memory, and then fetched from the buffer and/or memory before sending the data back through the same systolic array to perform the computations of the next layer. Thus, between each layer, the data are stored and retrieved, incurring read and write delay, and increasing memory storage requirements. Furthermore, with more complex neural networks with a large number of layers, the delay can become quite substantive.

The disclosed systolic neural network engine mitigates these issues by using DPUs along a first arrangement, such as a column, of the engine to perform computations of a first layer of a neural network, DPUs along a second arrangement, such as a column, of the engine to perform computations of a second layer of the neural network, and so forth. In order to accommodate the computations of multiple layers while avoiding the wiring problem described above, the disclosed systolic neural network engine uses systolic pulses for layer-to-layer data packet communications. Specifically, the DPUs of a certain arrangement, such as a column, generate activation outputs for a particular layer, and then systolically pulse these activation outputs to DPUs assigned to the next layer. As such, each DPU includes both (1) an input systolic element (referred to herein as a "receiver block") that receives data packets representing outputs of a previous layer and systolically pulses those data packets through the other DPUs of the same layer, and (2) an output systolic element (referred to herein as a "sender block") that systolically pulses the activation output of that DPU to the receiver block of one or more DPUs of the next layer. The computations of the node occur in circuitry positioned to receive data from the receiver block and then output data to the sender block. For example, as described in more detail below, the computation of the DPU in FIG. 5 can occur in the processing block. The data can be sent from the receiver block 600 into the feedback-based convolution circuitry (clockwise and anticlockwise) 130, 132. The outputs of the convolutions 130, 132 can be incrementally fed back into the convolution blocks based on the systolic pulse, described in further detail below. The feedback-based convolutions 130, 132 can send the outputs to an adder 140, which is fed into a sigmoid function 150, and sent to the sender block 151.

FIG. 5 is a diagram of DPUs of the systolic neural network engine 300 of FIG. 3 configured for performing clockwise 130 and counter clockwise 132 convolutions (also referred to as an anticlockwise convolution, or "aconv") in an implementation of the systolic neural network engine 300 for processing convolutional neural networks. The DPU includes receiver block 600 and sender block 151, with the central dashed region corresponding to the processing block of the DPU. The processing block includes circuitry for performing the processing computations of the DPU, including convolutional circuitry 130, 132, summation circuitry 140, and activation function circuitry 150. Data tags may be placed on each of the data packets sent from the sender block 151, for example by the sender block 151 accessing an ID of the DPU from an associated hardware memory (not illustrated) and attaching the ID to the output data packets. Tag bits may be used to indicate point of origin and validity of data pulsed throughout the systolic neural network engine. As an indication of the end of data being processed, the sender block 151 may not place a data tag on the last data packet in a series as an indicator to the adder 140.

Two inputs, $y_{in\_1}$ and $y_{in2}$, are provided to convolution 130 and aconv 132, respectively. For example, the DPU of FIG. 5 can be used in the array structure of FIG. 4C, in which the crossover interconnections allow DPUs to receive two data packets from different sources in each systolic pulse. As such, in various implementations, the number of convolutional engines in the processing circuitry of a DPU can correspond to the number of data packets received during each systolic pulse, as determined by the crossover structure. Depending upon where the DPU is in the systolic array, there may be a number of data pulses required to obtain the information to perform these convolutions. To perform the convolution 130 and the aconv 132, the processing block can determine what weights should be applied to the respective inputs (e.g., as a convolutional filter). Weights are determined for each of $y_{in\_1}$ and $y_{in2}$ based upon the data pointed to by pointers $P_{conv}$ and $P_{aconv}$. These pointers may be part of a data tag pulsed with the inputs. On every systolic pulse, the appropriate weight for the convolution calculation occurring in 130 is $w_{in\_1}$=weight[$P_{conv}$]. Similarly, the appropriate weight for the aconv calculation occurring in 132 is $w_{in\_2}$=weight[$P_{aconv}$]. The pointers $P_{conv}$ 133 and $P_{aconv}$ 134 point to weight values in a table (e.g., a weights table stored in a memory incorporated into or accessible by the DPU). Pointers $P_{conv}$ and $P_{aconv}$ 133, 134 start pointing at weight values in the first and last position of the table, respectively, and move in different directions through the table. When there are valid data in $h_j$, in each systolic pulse, pointer $P_{conv}$ is updated to point to the next weight value in a table position of increasing address number, while pointer $P_{aconv}$ is updated to point to the next weight value in a table position of decreasing address number. The combined number of steps of $P_{conv}$ and $P_{aconv}$ values will be the value N. These pointers 133, 134 indicate the appropriate weights $w_1$ to $W_N$ in the table to apply to the respective input values yin i and $y_{in\_1}$ and $y_{in2}$ for processing. In some embodiments, each DPU can store a copy of the weights table (or a portion thereof that includes weights to be used by a particular DPU). This may result in faster reads from the weights table, but at the cost of increasing the area of silicon that each DPU occupies due to adding an internal memory. In some embodiments, the DPUs can fetch the weights from the weights table stored in an external memory. This results in a smaller and cheaper chip for the systolic neural network engine; however, this is at the cost of slower fetches of the weights from the external memory.

The output of the convolution 130 is labeled as $y_{out\_1}$ and the output of the aconv 132 is labeled as $y_{out\_2}$. The values of $y_{out\_1}$ and $y_{out\_2}$ are fed back into their respective convolution units so that their values accumulate with the next multiplication of inputs $y_{in\_1}$ and $y_{in\_2}$ (sent by the receiver block 610 after another systolic pulse) by their respective weights:

$$y_{out\_1}[k]=y_{out\_1}[k-1]+W_{in\_1}\cdot y_{in\_1}[k]$$

$$y_{out\_2}[k]=y_{out\_2}[k-1]+W_{in\_2}\cdot y_{in\_2}[k]$$

where the index [k] refers to the current output, and the index [k−1] refers to the previous output in the multiplication and accumulation operations realized in the convolution unit.

When no more tagged data are received from the receiver block $h_j$, the adder 140 is activated and adds the last values of $y_{in2}$. The adder 140 passes its output to the activation function 150. The output of the activation function 150 is provided to the receiving node $s_j$ 151 at the end of N systolic pulses. This final output from the sigmoid is therefore latched into the $s_j$ chain and will be ready to be sent to the DPUs assigned to nodes of the following layer in the neural network. The h* block (destination systolic element) is where data from the previous layer flow by a DPU, and the DPU pulls in needed data based on the source tags. The processing component of the DPU then performs the needed computations, and when the processing component is finished it latch the results of this processing onto the s* block. Data latched onto the s* block is ready to be transferred to next layer, for example when all processing of a DPU is complete and all results are latched into the s* block. The systolic neural network engine can implement handshakes between layers to determine when to send data from the s* blocks of DPUs of a layer to the h* blocks of DPUs of the next layer. Data can be kept in $s_j$ while all workers assigned to the same layer complete their jobs (e.g., as discussed with respect to FIG. 4C, some workers may receive data faster and thus finish their job sooner). Using the handshake protocol, a DPU tells DPUs of the next layer that it has all the data and checks whether the DPUs of the next layer would like to receive it. If the response is yes, then the DPU starts to systolically transfer its data.

Figure 6A:
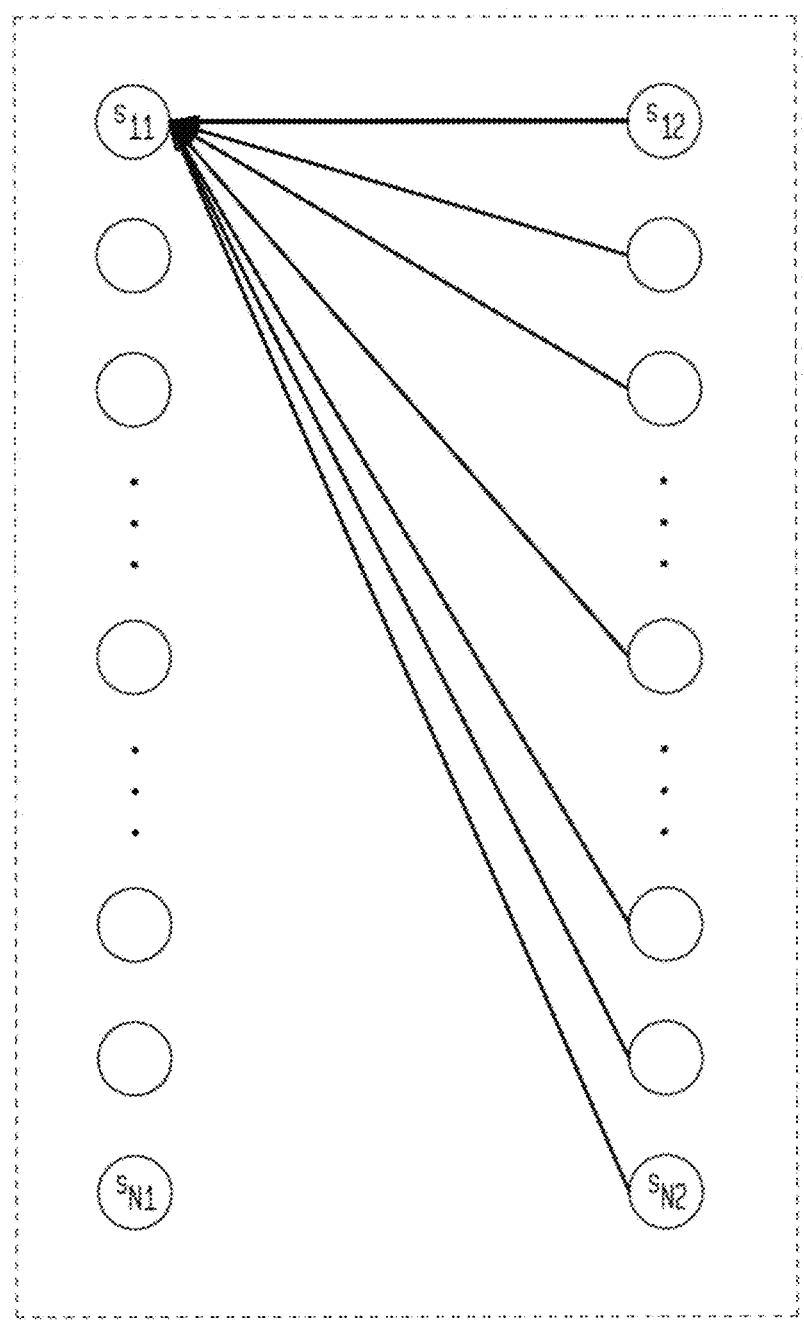
FIG. 6A depicts backpropagation through a neural network, according to some embodiments.

FIG. 6A is a schematic diagram of the direction of data flow during backpropagation from one layer of a neural network to a preceding layer of a neural network. As described above, backpropagation occurs during training to refine the weights of the neural network in order to beneficially minimize future errors of the neural network when further forward processing occurs. As illustrated in FIG. 7A, using weights from si2, i=1 . . . N, in layer 2, an error signal is sent to node siI, i=1 . . . N, in layer 1. In a processor wired to mirror this configuration, data origins could be identified during backpropagation based on the wire from which the data arrived. However, in the disclosed systolic neural network engine, data travel in pulses and thus another mechanism is needed for identifying DPUs from which different data originates.

Figure 6B:
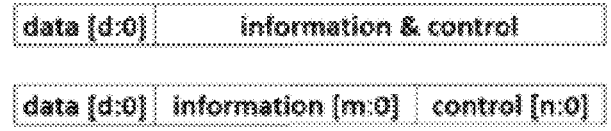
FIGS. 6B to 6E depict diagrams representing forward propagation and backpropagation as implemented by the systolic neural network engine of FIG. 3 according to some embodiments.
Figure 6C:
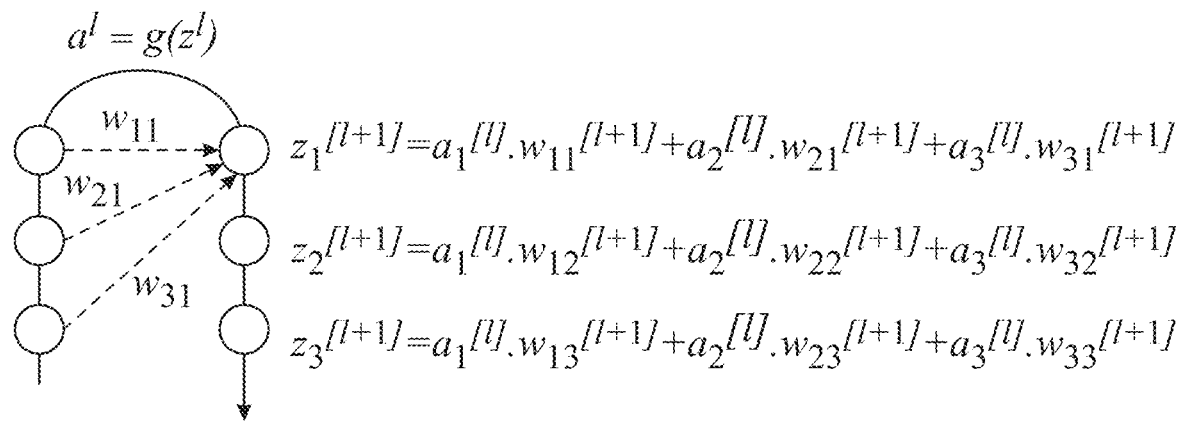
Figure 6D:
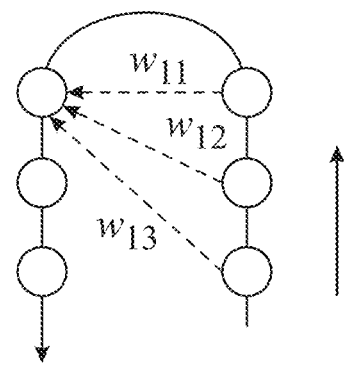

FIG. 6B illustrates two examples of tagged data used by the systolic neural network engine. FIGS. 6C and 6D illustrate the systolic transport of data plus information and processing control tags for forward and backpropagation as implemented by the disclosed systolic neural network engine. The circular features in FIGS. 6C and 6D represent nodes in two different layers of a neural network. The dashed arrows indicating which weights are associated with which nodes are provided for reference, and do not necessarily depict physical connections between the DPUs performing the processing of these nodes. It will be appreciated that data can flow through the nodes in the direction of, and along the path of, the solid arrow in systolic pulses as described above.

FIG. 6C illustrates a diagram of forward propagation of data from nodes of a first of the two layers to nodes of the second of the two layers. In forward propagation, the nodes of the second layer use the tags to identify activation outputs from the previous layer and determine whether or how it needs to process such outputs. The values of the three nodes in the subsequent layer may be calculated through the formulae illustrated adjacent to each node, which include the weights of the individual processing nodes of the input layer, depicted as w11, w21, and w31. During forward propagation, the identification of a node producing an activation signal is inserted in the tag for that activation signal. Because of the systolic transfer the activation signals reach each receiving node in a different order. Each node however pairs (and records) weights and activation signals received for the computation of its weighted sum of activation signals.

FIG. 6D illustrates backpropagation from the nodes of the second layer to the nodes of the first layer. In backpropagation, the systolic flow of data and tagged information is reversed towards the input. The partial derivatives of loss with respect to activation are backpropagated and accumulated along layer [I+1] as the accumulated results systolically move back to the nodes in layer [I]. The formulae illustrated adjacent to each node are used for calculation of updated weight values during the backpropagation process. During backpropagation, when the systolic flow is inverted, the recorded pairing of weights and activation sources allows each node to properly pair its calculated partial derivative of loss with respect to weights ($\delta_r^{I,J}$) and the proper weight. Different from the forward propagation, during backpropagation the weighted sum of partial derivatives is accumulated as the data are propagated backwards. The tags inform the destination source in each node that passes through and each node adds its calculated partial derivatives and weights when destination addresses match. Backpropagation uses a transpose matrix of the weights used in forward propagation.

Figure 6E:
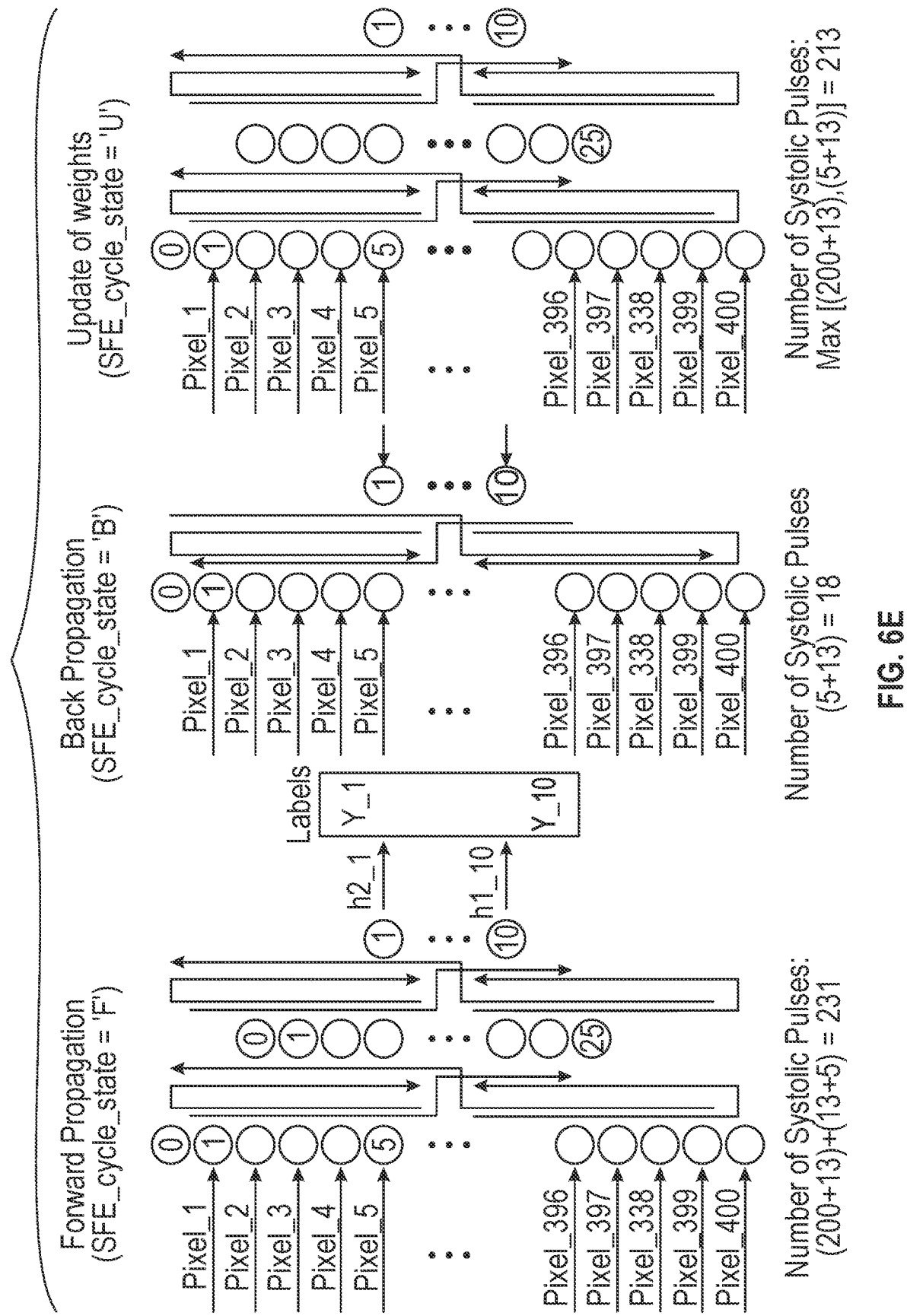

FIG. 6E illustrates examples of forward propagation, backpropagation, and updates in an example neural network. The depicted example is a two-layer fully-connected DNN with 400 input nodes, 25 hidden nodes and 10 output nodes for handwritten digit recognition. The total number of systolic pulses involved in each state is calculated from the number of nodes involved as 231, 18 and 213 systolic pulses, respectively. All delays can be calculated from the number of systolic pulses. The network can be trained in Gradient Descent ("DC"), mini-batch GD, or stochastic GD. In training mode, the network will be sequentially in 3 states: "F"orward, "B"ackpropagation, and "U"pdate of weights. Additional control signals not shown in this illustration are used to place the network in each of those states. Those signals also control the state of propagation along the pipelined structure. Control signals are also used to indicate when activation signals are latched and ready for propagation to the next layer, other signals to indicate when all activation signals were transferred to the next layer, etc.

In some embodiments, the system can determine how long it takes to train the neural network by tracking the number of systolic pulses used during the various phases of training. In the example training scenario of FIG. 6E forward propagation was performed with 231 systolic pulses, back propagation was performed with 18 systolic pulses, and updating of the weights was performed with 213 systolic pulses. Accordingly, training the neural network can be estimated to take 462 systolic pulses.

Pixel values of an image can be used as inputs to begin a forward pass through the systolic network. Then, the system can backpropagate through the systolic network and adjust the weights of one or more nodes, for example by comparing the output of the forward pass to an expected output and backpropagating deviations. In some embodiments, the backpropagation can occur after forward passing values of one image through the systolic network. For example, values of an image can be propagated forward through the systolic network, the backpropagation can occur for that same image, and weights adjusted based on the backpropagation. In alternative embodiments, the backpropagation can occur after passing a group of images through the systolic network. The system can determine a batch size for adjusting the weight using backpropagation.

Figure 6F:
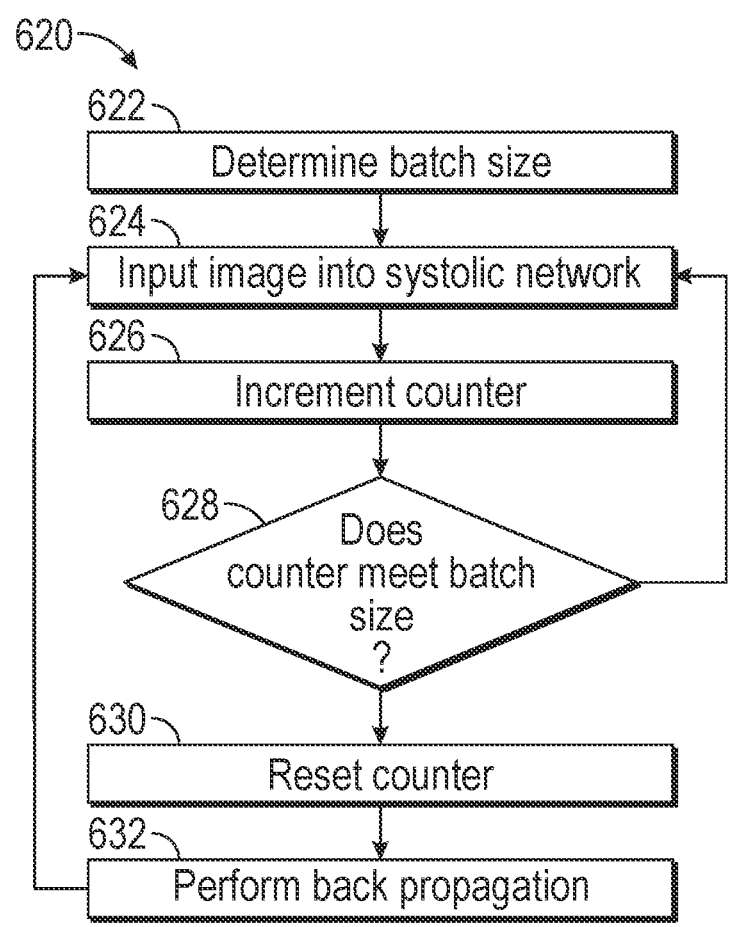
FIG. 6F illustrates a diagram of the backpropagation based on batches.

FIG. 6F illustrates a flowchart of a process 620 for backpropagation based on batches. At block 622, a batch size can be determined. A batch size can include a number of images and/or other input sources that will be forward passed through the systolic neural network engine before backpropagation is performed. At block 624, an image can be input into the systolic network (e.g., its pixel values are provided as inputs to a DPUs corresponding to nodes of the first layer of the neural network). At block 626, a counter can be incremented. At block 628, the system can determine whether the counter meets the batch size. If not, then another image can be input into the systolic network. If so, then at block 630, the counter can be reset, and back propagation performed at block 632. For example, the batch size can be determined to be 10 images at block 622. A first image can be input at block 624, and the counter incremented to 1 at block 626. The counter (1) does not meet the batch size (10) at block 628, and thus the process continues to block 624 where the second image is input at block 624. Blocks 624, 626, and 628 are repeated until 10 images are input into the systolic network. Then, at block 628, the counter (10) meets the batch size (10). Then, the counter is reset to 0 at block 630, and backpropagation is performed at block 632. Although various steps of the process 620 are described as being performed by the systolic network, in alternate embodiments these steps can be performed by another suitable control processor for the systolic neural network engine.

Figure 7:
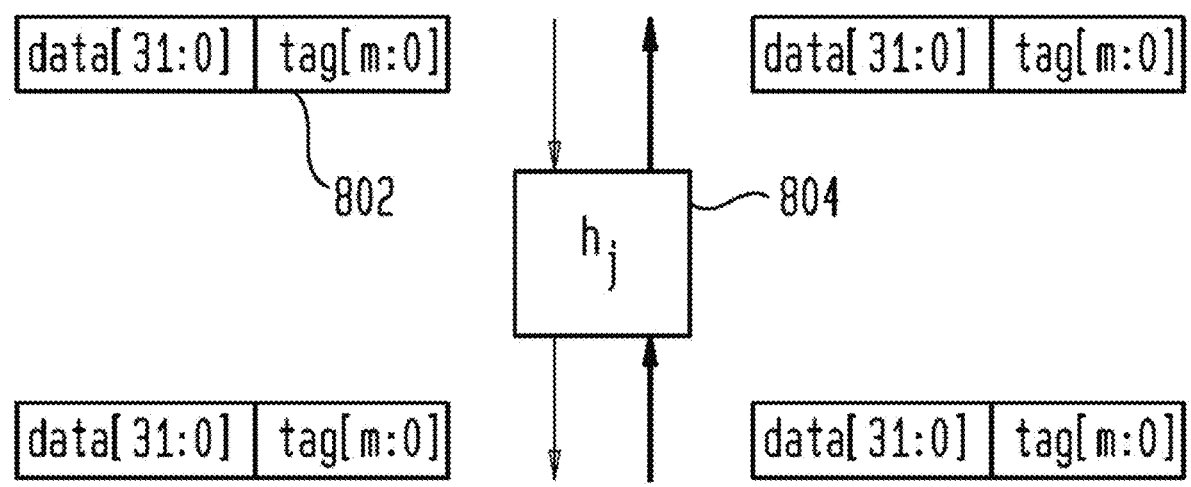
FIG. 7 is a diagram of tags used during backpropagation through the systolic neural network engine of FIG. 3 according to some embodiments.

FIG. 7 illustrates a diagram of the tags 802 associated with data and used during backpropagation. For a destination systolic element $h_j$, backpropagation requires sending data back to specific sourcing systolic elements of DPUs performing processing of nodes in a previous layer. As illustrated in FIG. 7, data entering and exiting the destination systolic element $h_j$ 804 have tags associated with the data. The tags allow for the system to properly send and receive data to specific areas of the network, as necessary.

Figure 8A:
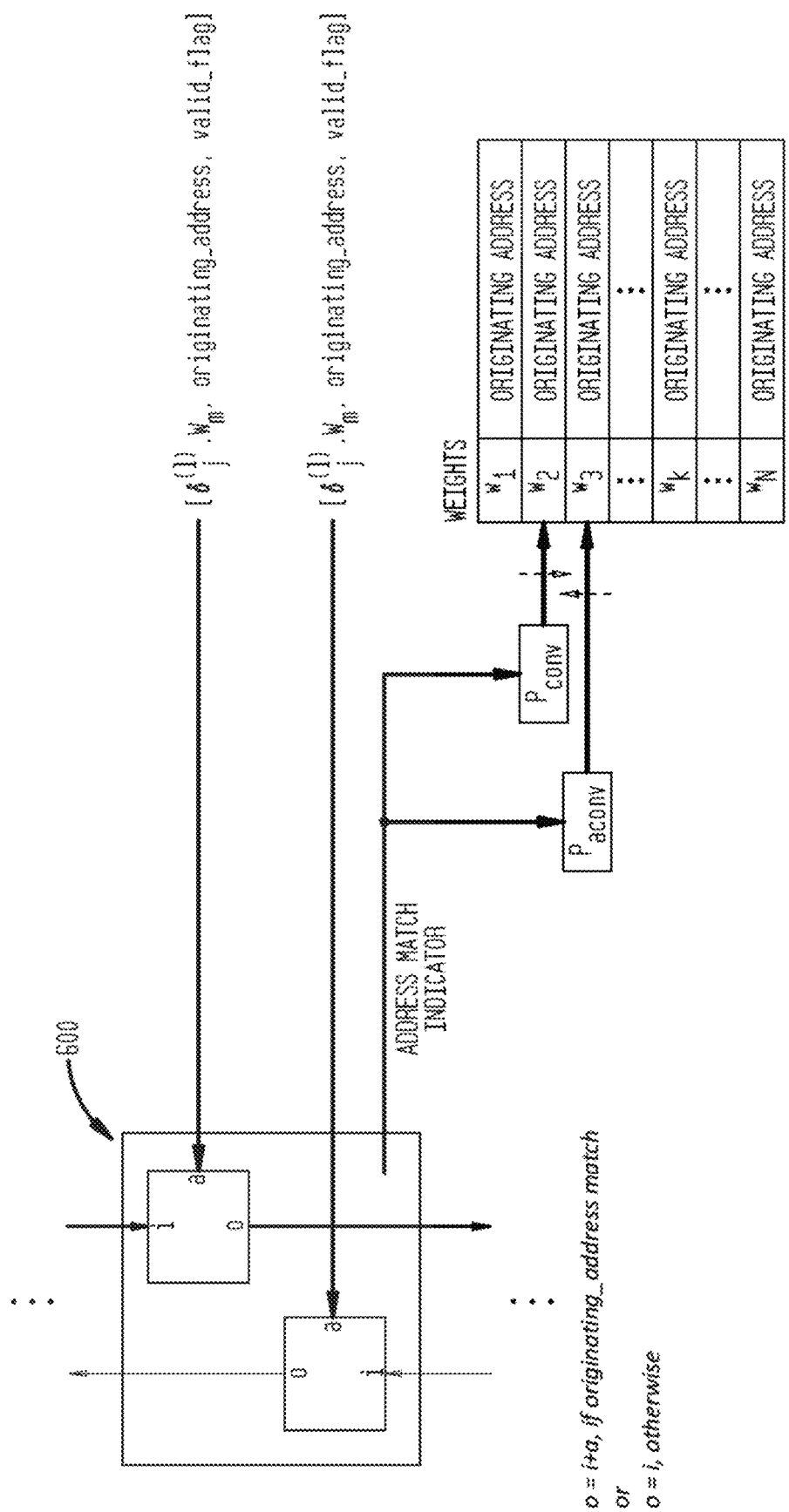
FIG. 8A is another diagram of backpropagation through the systolic neural network engine of FIG. 3 according to some embodiments.

FIG. 8A is another diagram of backpropagation through the systolic neural network engine of FIG. 3. As illustrated, tags of "originating address" were paired to weights $w_1 \ldots w_N$ during the forward propagation phase. During backpropagation, node 600 and the other nodes in the same layer will use those weights and multiply the amount of error, $\delta$, they have received from the next layer toward the output. The weights may also be tagged with an originating address to aid in the backpropagation of the data through the processing node 600. The pointer Pconv and Paconv may be incremented in the reverse direction they were incremented in the forward propagation direction. For the use of the weights, an address match indicator may be used to determine the originating address of the weights w1 to wN. For calculation purposes the value o=i+a if an originating address matches or else o=i.

Figure 8B:
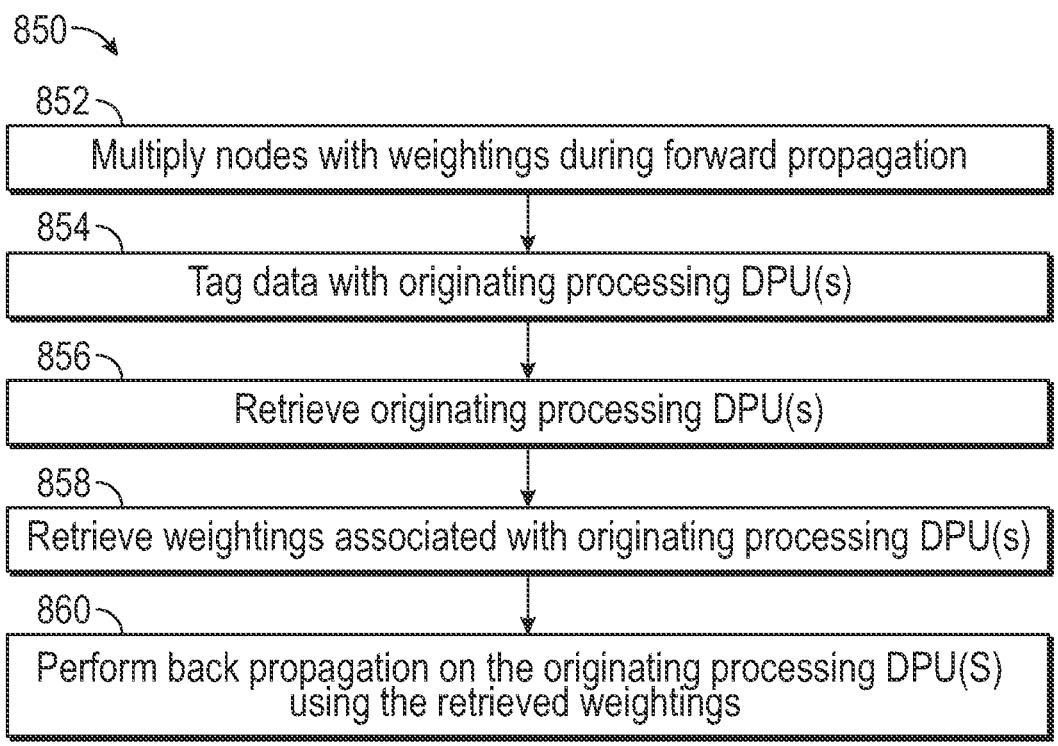
FIG. 8B illustrates a flow diagram of forward and backpropagation through the systolic neural network engine of FIG. 3 according to some embodiments.

FIG. 8B illustrates a flow diagram of forward and backpropagation through the systolic neural network engine of FIG. 3. At block 852, the systolic neural network engine can perform forward propagation. During forward propagation, the data can be passed to each DPU via the sender block 600 of FIG. 5. The data can be sent from the sender block 600 to the convolution engines $P_{conv}$ and $P_{aconv}$. The data can then be multiplied with weights corresponding to the source of the data, such as W1, W2, . . . Wn of FIG. 5.

At block 854, the data can be tagged with the originating address and the weight. As shown in FIG. 8, the weights and/or the originating address can be saved into memory. In some embodiments, the weights and/or the originating address can be tagged onto the data. The weights that are stored locally can be paired with the originating address in the memory. Then, the nodes can identify where the data came from for accumulation in the convolution engine. The outputs of the sigmoid can be saved into memory. Then, the weights and the output of the sigmoid can be used to compute the partial derivative.

At block 856, the addresses for the originating processing DPU(s) can be retrieved for back propagation. The addresses can be retrieved from the table with the weights and the originating addresses. The addresses can be used to identify the direction of the backpropagation.

At block 858, the weights can be retrieved. The weights can be retrieved based on the originating processing DPU(s). For example, for particular DPU(s) that are to be backpropagated to, associated weights can be retrieved.

At block 860, back propagation can be performed to the originating processing DPU(s) using the retrieved weights. For example, for a sigmoid, one partial derivative can be saved locally. The partial derivative can be determined for a particular weight, and then systolically pulsed to a next DPU along the arrangement, such as a column, for computation of a next partial derivative. This identifies how sensitive the output of the node is to the weight, such as how much the weight affects the output of the network. During back propagation, based on the identified sensitivities of the nodes and weights to the output, the weights can be adjusted. Although various steps of the process 850 are described as being performed by the systolic neural network engine, in alternate embodiments these steps can be performed by another suitable control processor for the systolic neural network engine.

Figure 9:
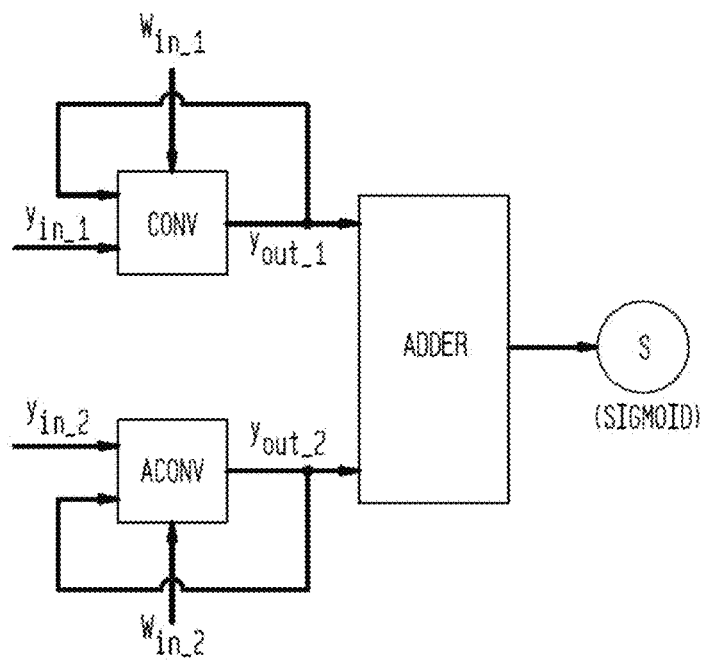
FIG. 9 is a schematic diagram of the computations performed by a DPU of the systolic neural network engine of FIG. 3 during forward propagation for clockwise and counter clockwise convolutions according to some embodiments.
Figure 10:
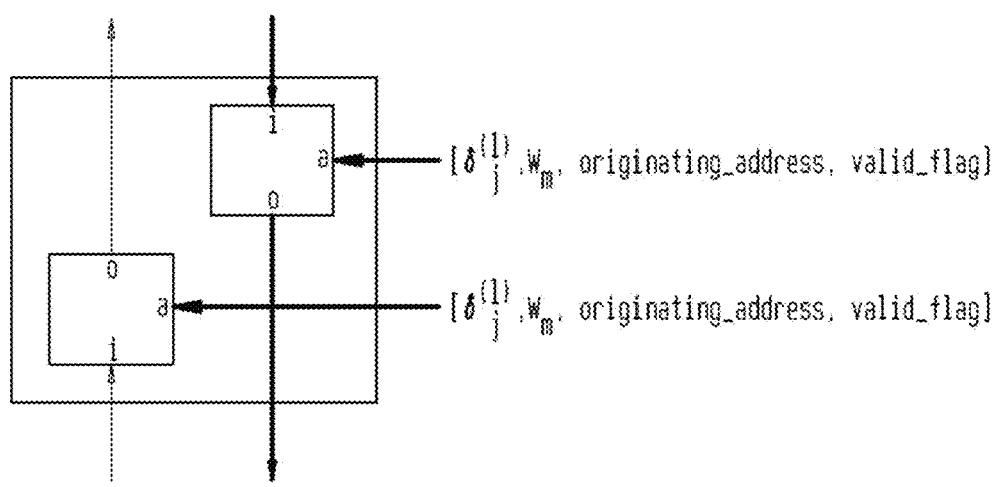
FIG. 10 is a diagram of cumulative summation in backpropagation for a DPU of the systolic neural network engine of FIG. 3 according to some embodiments.

FIGS. 9 and 10 depict propagation of information through the systolic neural network engine during training. FIG. 9 is a schematic diagram of the computations performed by a DPU of the systolic neural network engine during forward propagation for clockwise and counter clockwise convolutions, and FIG. 10 is a diagram of the cumulative summation in backpropagation in the immediately following backpropagation. In every processing node, a local value of $\Delta_{ij}^l=0$ is made for all i, j, l. During training, each forward propagation of an example pair (x(i), y(i)), allows the calculation of g'(z(i)), the derivative of the sigmoid function, or a(i) (1−a(i)) in each DPU, where a(i) is the output of the sigmoid function unit or other similar activation function, such as a tan h, ReLU, sigmoid, etc. This value is stored in the DPU. The skilled in the art will recognize that if a different non-linear function were used, a different derivative function would be used.

Referring now to FIG. 10, in the immediately following backpropagation, starting from the output, and using weighted summation for backpropagation and the saved locally a(i)*(1−a(i)) in each DPU, each DPU calculates its σ(l) for the next layer in the backward direction—which is the weighted sum of all $\sigma_j^{(l)}$ of the subsequent layer times the derivative of the current cell sigmoid. In each DPU, an update may be performed:

$$\Delta_{ij}^l = \Delta_{ij}^l + \alpha_j^l \sigma_i^{l+1}$$

The above may be repeated for all pairs (x(i), y(i)) and have an average of $\Delta_{ij}^l = \Delta_{ij}^l + \alpha_j^l \sigma_i^{l+1}$.

By dividing the accumulated value by m, the total number of training pairs, the procedure also adjusts the weights by the average $\Delta_{ij}^l$ in case it is the first layer or this average plus $\lambda w_{ij}^l$, a modulated value of the current weight. Each of the DPUs receives data during the backpropagation process wherein $$[\sigma_j^{(l)} \cdot w_m, \text{originating\_address}, \text{valid\_flag}].$$

Figure 11A:
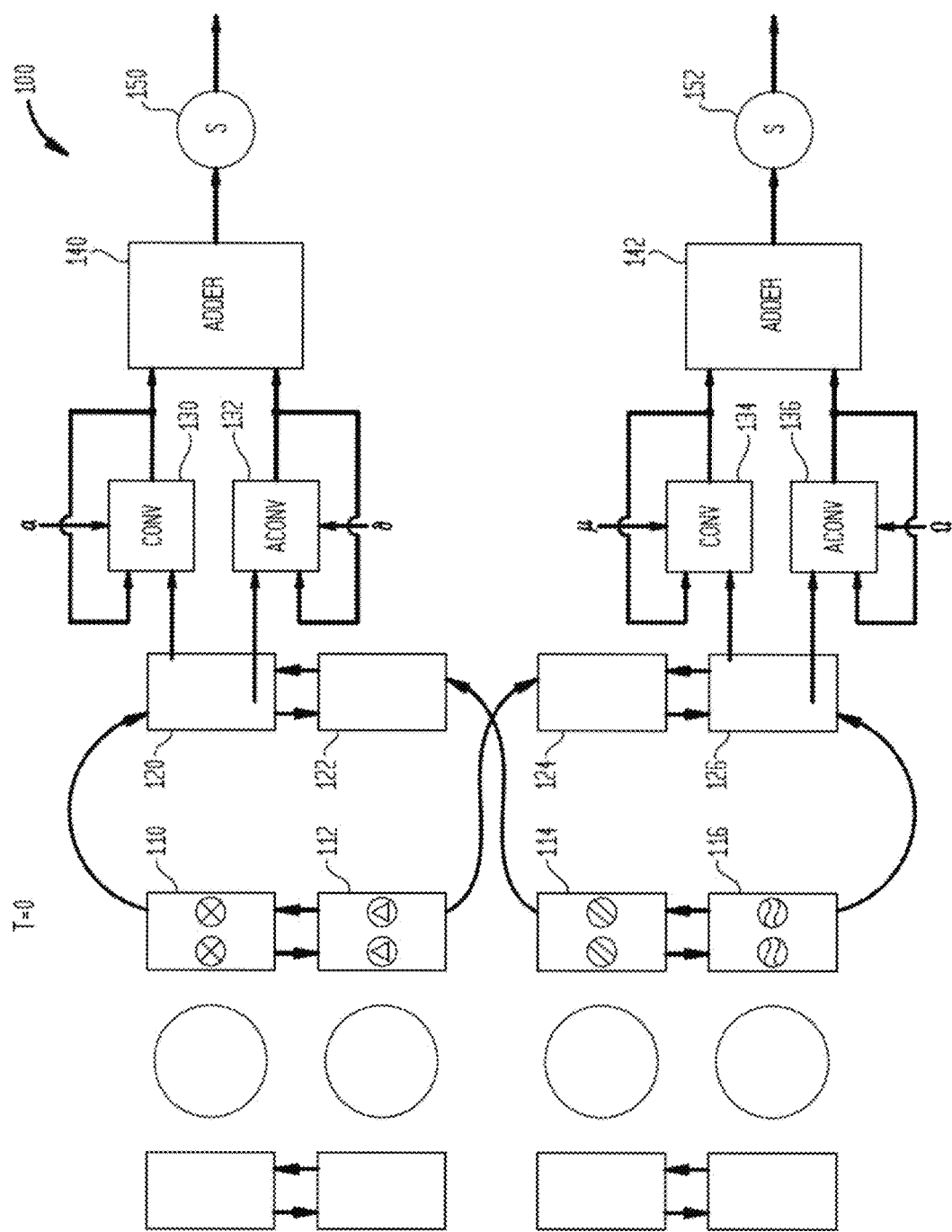
FIG. 11A is a diagram of data packet processing by a portion of the systolic neural network engine of FIG. 3 for forward propagation, according to an example embodiment, at Time=0 according to some embodiments.

FIG. 11A depicts a portion 100 of the systolic neural network engine for processing data packets in a systolic nature according to an example embodiment. In some embodiments, the systolic neural network engine includes a systolic processor chip that includes processing nodes embedded within the systolic processor chip. Illustratively, only four processing nodes are depicted in a first layer and four processing nodes in a second layer. However in alternative embodiments, the systolic chip can include more or fewer processing nodes assigned to each layer of the neural network. The portion 100 of the systolic neural network engine includes DPUs 110, 112, 114 and 116 that perform computations of nodes in a first layer of the neural network, and DPUs 120, 122, 124 and 126 that perform computations of nodes in a second layer of the network. Arrows coming from the processing nodes indicate the direction which the data packets travel. As an example embodiment, interconnections exist between DPUs 110, 112, 114 and 116 and DPUs 120, 122, 124 and 126. The convolution operations are highlighted only for two of the DPUs of the second layer for illustrative purposes.

In some implementations, such interconnects are provided as two-way systolic transfers. These interconnects provide an output from DPU 110 to DPU 120, output from DPU 112 to DPU to 124 and output from DPU 116 to DPU 126. Interconnections between the DPUs 110, 112, 114 and 116 include an output from DPU 110 to DPU 112, and output from DPU 112 to DPU 110. Additionally, DPU 114 has an output to DPU 116 and DPU 116 has an output to DPU 114.

Proceeding to the second level of the neural network, DPU 120 is connected to an arrangement to perform clockwise convolution 130 and counter-clockwise convolution 132. Clockwise and counter-clockwise convolution (or deconvolution) refer to the two convolution engines in each DPU as described herein. In a similar fashion, one output from DPU 126 proceeds to convolution engine 134 and one output from DPU 126 proceeds to counter-clockwise convolution (Aconv) engine 136. Interconnections within the second level of the neural network include an output from DPU 120 to DPU 122 and an output from DPU 122 to DPU 120. Additionally, DPU 124 has an output to DPU 126 and DPU 126 has an output to DPU 124.

Convolution engine 130 has an output to adder 140. A feedback loop is also provided to the input of the convolution engine 130, as discussed with respect to FIG. 5. The deconvolution engine 132 has an output to the adder 140. A feedback loop is also provided to the input of the deconvolution engine 132. In a similar configuration to that described above, a convolution engine 134 has an output to adder 142. A feedback line is also provided back to the input of the convolution engine 134. The deconvolution 136 engine has an output to adder 142. A feedback loop is also provided back to the input of the deconvolution engine 136. The adders 140, 142 are connected to elements 150, 152 which, although illustrated as sigmoid functions, may be tanh, ReLU, sigmoid or other suitable activation functions.

A time step description will now be described so that the reader can follow a progression of data packets from originating nodes to the activation function processing. For ease of description, data packets are described related to series 1 ⊗, series 2 ⊚, series 3 ⊘, or series 4 ⊖ (with the corresponding symbol used to illustrate flow of these data packets through the portion 100 of the systolic neural network engine). At the initial time step=0, two series 1 data packets ⊗ are located within DPU 110, two series ⊚ data packets are located within DPU 112, two series 3 data packets ⊘ are located in DPU 114, and two series 4 data packets are located in DPU 116.

Figure 11B:
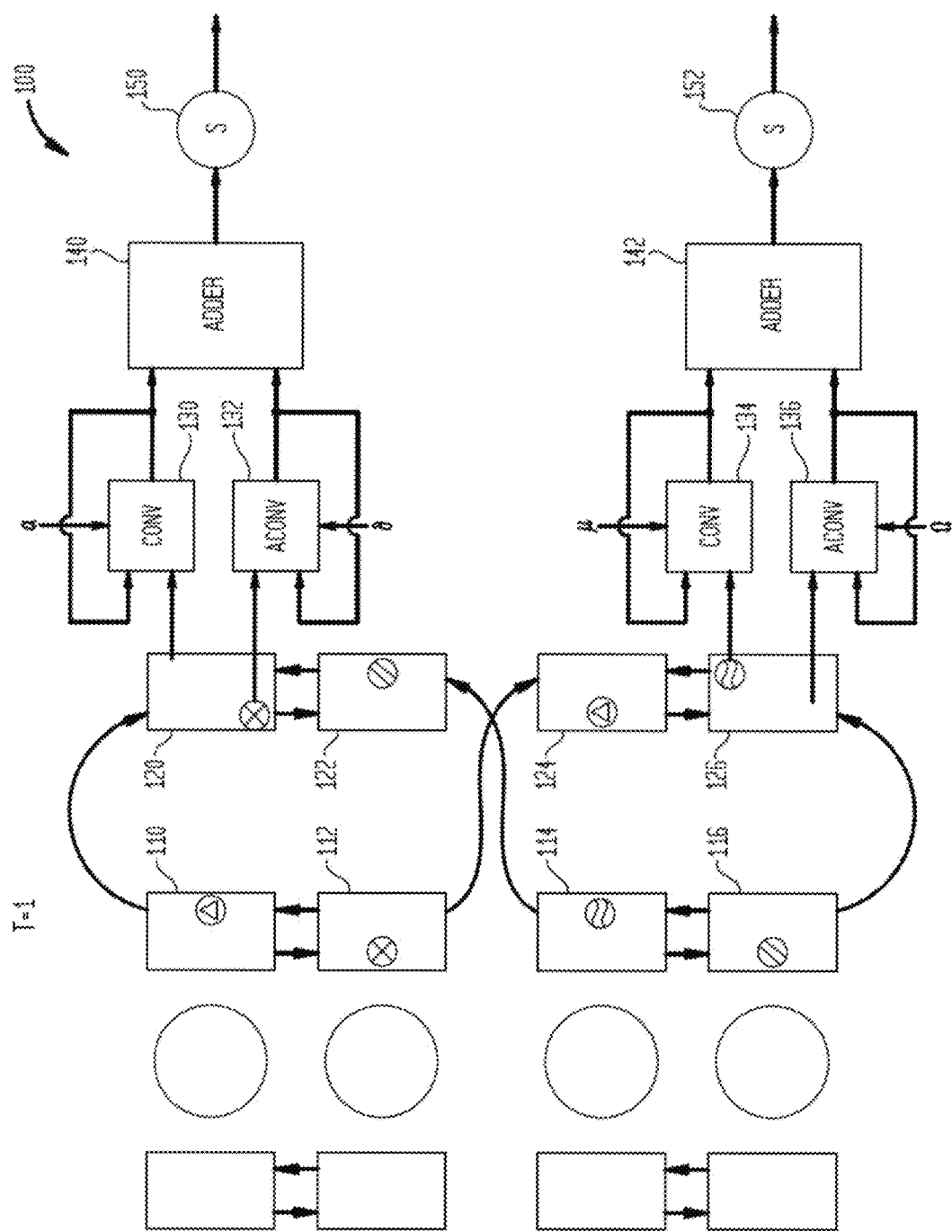
FIG. 11B is a diagram of the data packet processing at Time=1 according to some embodiments.

As shown in FIG. 11B, which represents time step=1, the first of the series 1 data packets ⊗ is systolically conveyed to DPU 120 of the second neural network layer, and the second of the series 1 data packets ⊗ is systolically conveyed to DPU 112 of the first neural network layer. For the series 2 data packets ⊗, the first data packet ⊚ is systolically conveyed to DPU 124 of the second neural network layer and the second data packet ⊗ is systolically conveyed to DPU 110 of the first neural network layer. For the series 3 data packets ⊘, the first series 3 data packet ⊘ is systolically conveyed to DPU 122 of the second neural network layer, and the second series 3 data packet ⊘ is systolically conveyed to DPU 116 of the first neural network layer. For the series 4 data packets ⊖, the first series 4 data packet ⊖ is systolically conveyed to DPU 126 of the second neural network layer and the second series 4 data packet ⊖ is systolically conveyed to DPU 114 of the first neural network layer.

Figure 11C:
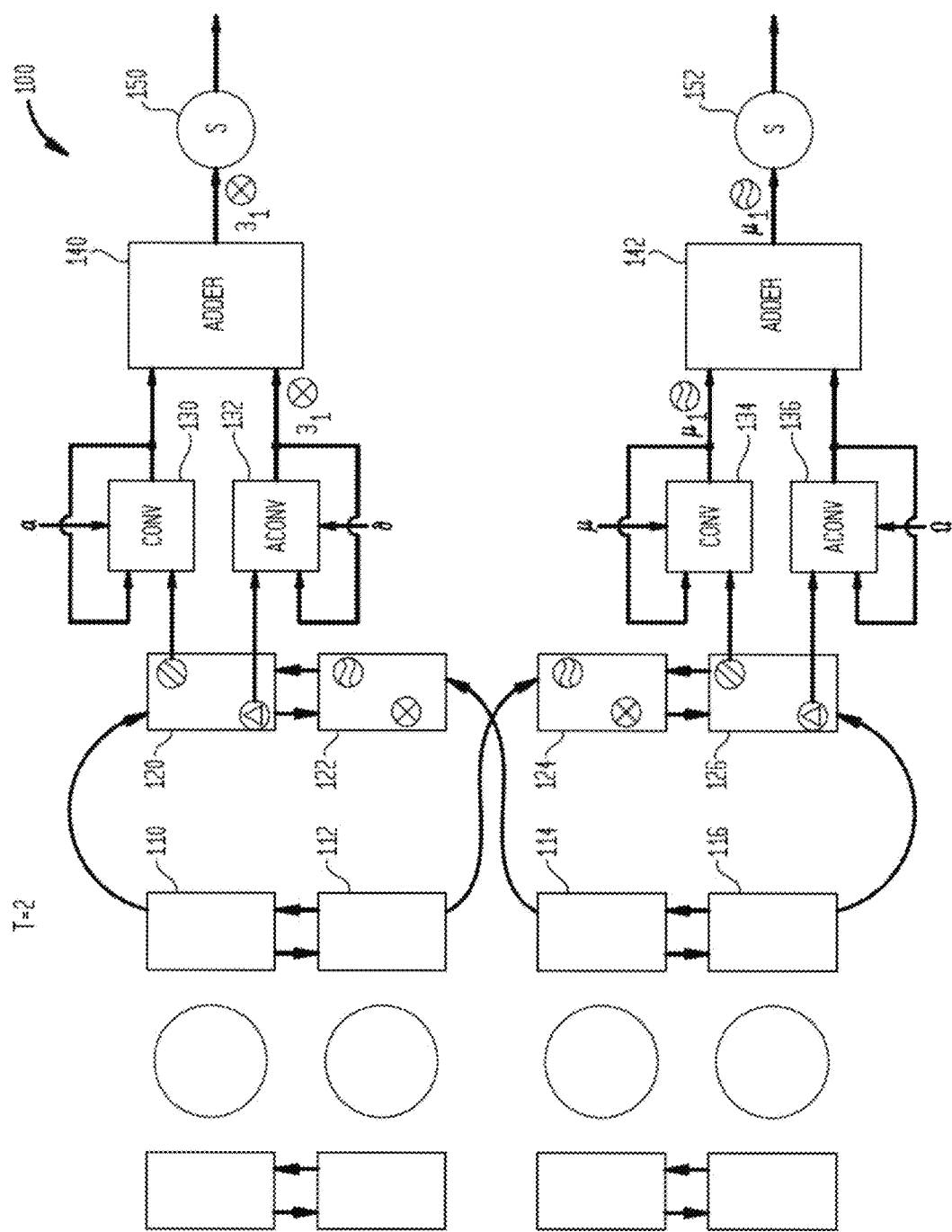
FIG. 11C is a diagram of data packet processing in forward propagation, according to an example embodiment, at Time=2 according to some embodiments.
Figure 11D:
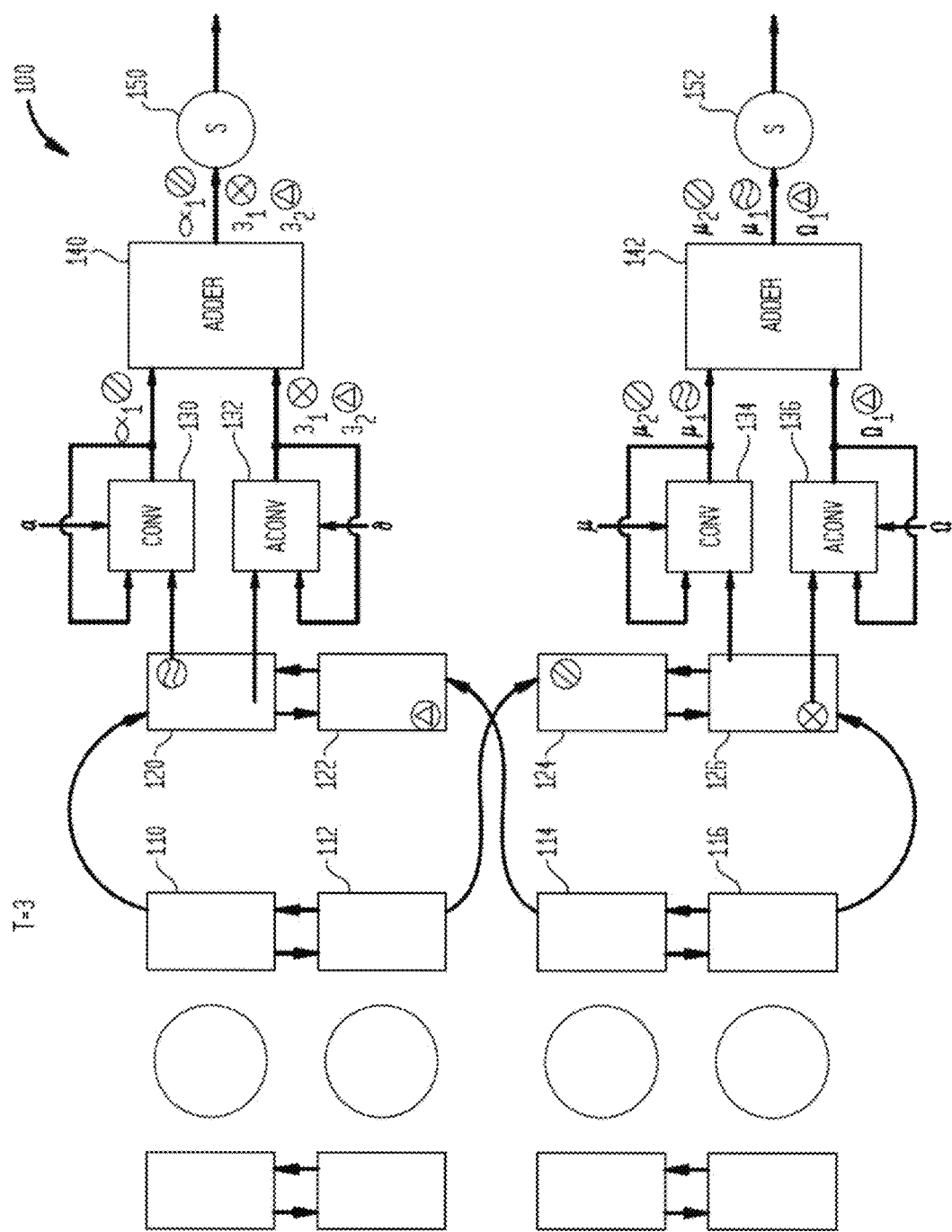
FIG. 11D is a diagram of data packet processing in forward propagation, according to an example embodiment, at Time=3 according to some embodiments.

Referring to FIG. 11C, which represents time step=2, each of the data packets for all of the series have entered the DPUs of the second neural network layer. DPU 120 has a series 3 data packet ⊘ and a series 2 data packet ⊚. DPU 122 has a series 1 data packet ⊗ and a series 4 data packet ⊖. DPU 124 has a series 1 data packet ⊗ and a series 4 data packet ⊖. DPU 126 has a series 2 data packet ⊚ and a series 3 data packet ⊖.

Referring to FIG. 1D, which represents time step=3, the series 1 ⊗, series 2 ⊚, series 3 ⊘ and series 4 ⊖ data packets have been further processed by the DPUs illustrated as storing these data packets at time step=2. In DPU 120, a series 4 data packet ⊖ is to be processed and sent to a DPU assigned to the next layer of the neural network. In DPU 122, a series 2 data packet ⊚ is to be processed and sent to DPU 120 in the next time step. In DPU 124, a series 3 data packet ⊖ is to be processed and sent to DPU 126 in the next time step. In DPU 126, a series 1 data packet ⊗ is to be processed and conveyed to a DPU assigned to the next neural network layer.

Figure 11E:
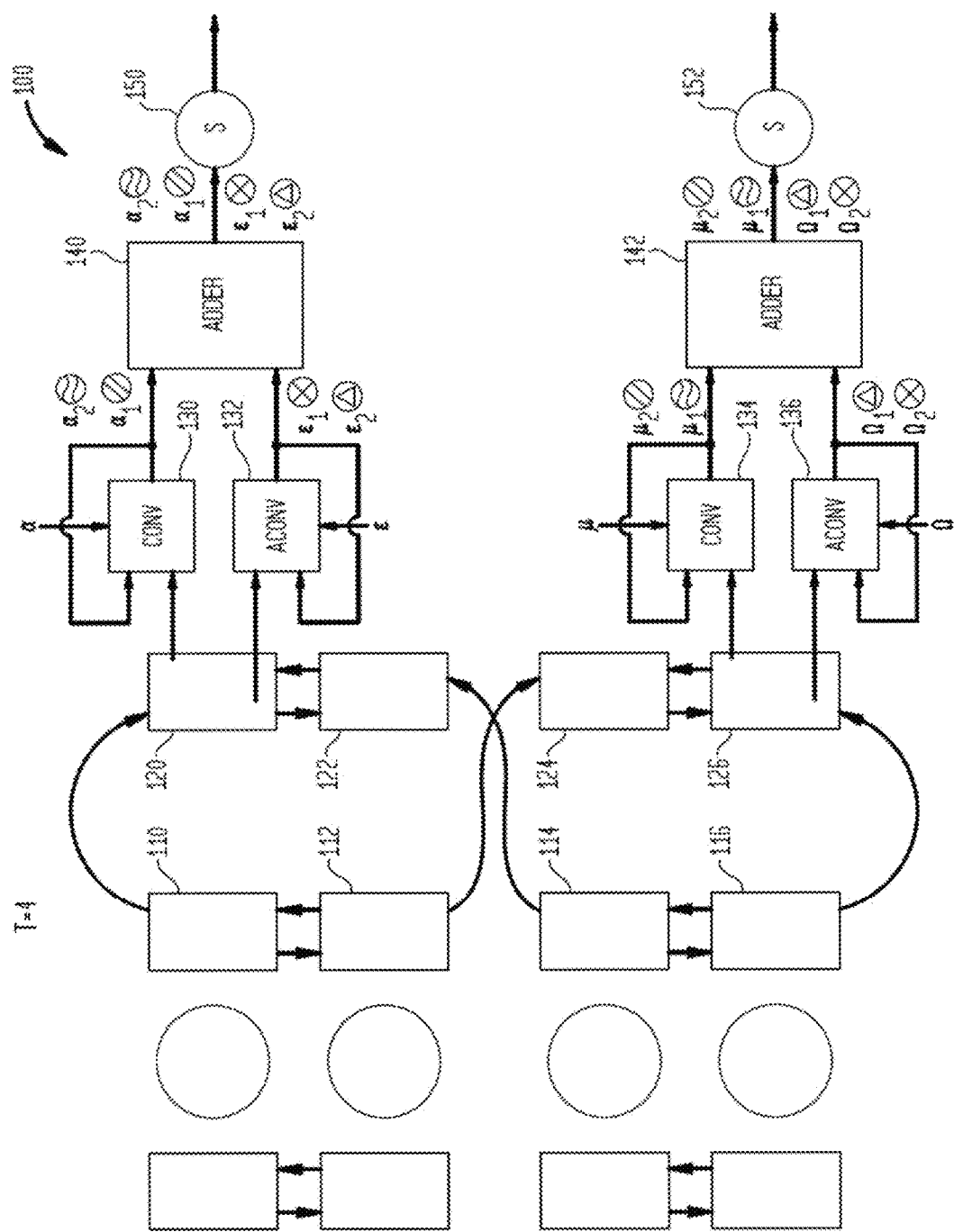
FIG. 11E is a diagram of data packet processing in forward propagation, according to an example embodiment, at Time=4 according to some embodiments.

Referring to FIG. 11E, which represents time step=4, processing has been completed with processed data packets α1 series 3 ⊘, α2 series 4 ⊖, ε1 series 1 ⊗, ε2 series 2 ⊚, μ1 series 4 ⊖, α2 series 3 ⊘, Ω1 series 2 ⊚, and Ω2 series 1 ⊗. The processed data packets are distinguished by the usage of the Greek characters preceding their packet symbols. The data processed data packets are added by the adder 140 and then sent to the activation function 150.

Figure 11F:
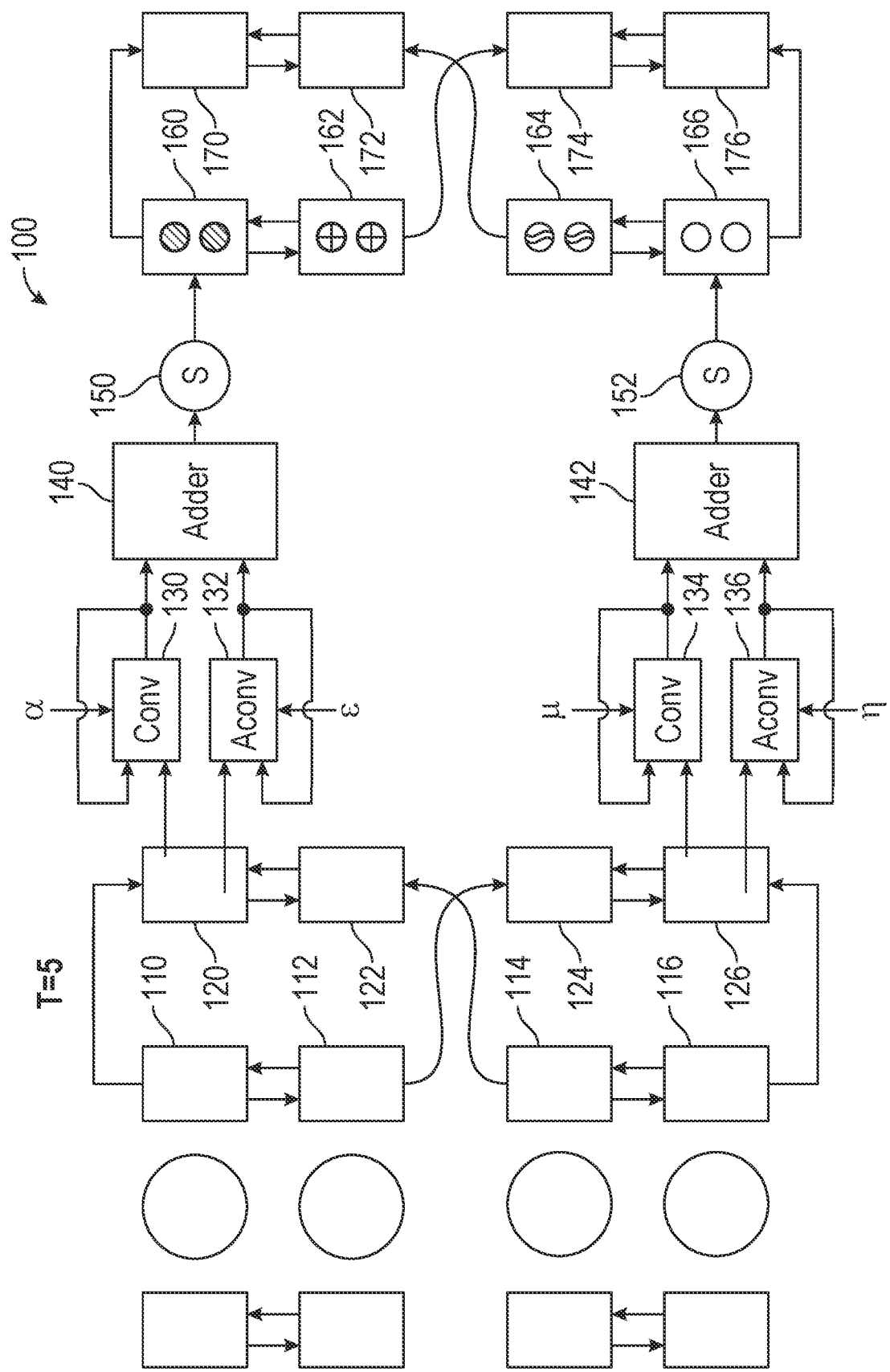
FIG. 11F is a diagram of data packet processing in forward propagation, according to an example embodiment, at Time=5 according to some embodiments.

Referring to FIG. 11F, which represents time step=5, the data packets α1 series 3 ⊘, α2 series 4 ⊖, ε1 series 1 ⊗, ε2 series 2 ⊚, μ1 series 4 ⊖, μ2 series 3 ⊘, Ω1 series 2 ⊚, and Ω2 series 1 ⊗, after processing by the adder 140, are input into the sigmoid function 150, 152. The output of the sigmoid functions 150, 152 can then be sent to the corresponding one of sender blocks 160, 162, 164, 166. As shown, the sigmoid function 150 outputs to sender block 160, and the sigmoid function 152 outputs to sender block 166. The sigmoid functions (and associated convolutional and adder circuitry) are not illustrated for sender blocks 162 and 164. The sender blocks 160, 162, 164, 166 can then send the data to certain connected ones of the receiver blocks of the next layer 170, 172, 174, 176, through which the data are systolically pulsed as described herein. The address can be read from a memory after the output of the sigmoid before arriving at the sender blocks 160, 162, 164, 166.

The systolic neural network engine described herein has many advantages compared with conventional neural network processing. A systolic neural network engine may be programmed such that all weights for use in processing are programmable from a bus into the DPUs, giving flexibility to the chip architecture for processing a wide variety of neural network architectures. As a non-limiting embodiment, an advanced microcontroller bus may be used for sending weights to each DPU. The systolic design illustrated and described may allow for pipelined operation of a whole neural network, that is, continuous computation of node processes without the need to push activation values into a memory after completing processing of nodes of a first layer, before fetching such values back into the same workers for processing of nodes of the next layer, as is done in existing processors. The systolic neural network engine may be scalable, therefore additions may be made to the number of nodes per layer or the number of layers in a neural network without having to re-create a corresponding specialized new chip architecture. The systolic neural network engine, as illustrated and described herein, allows data packet transmission wherein processing of different packets occurs at different times, however processing may be properly timed due to the configuration of the DPUs.

Figure 11G:
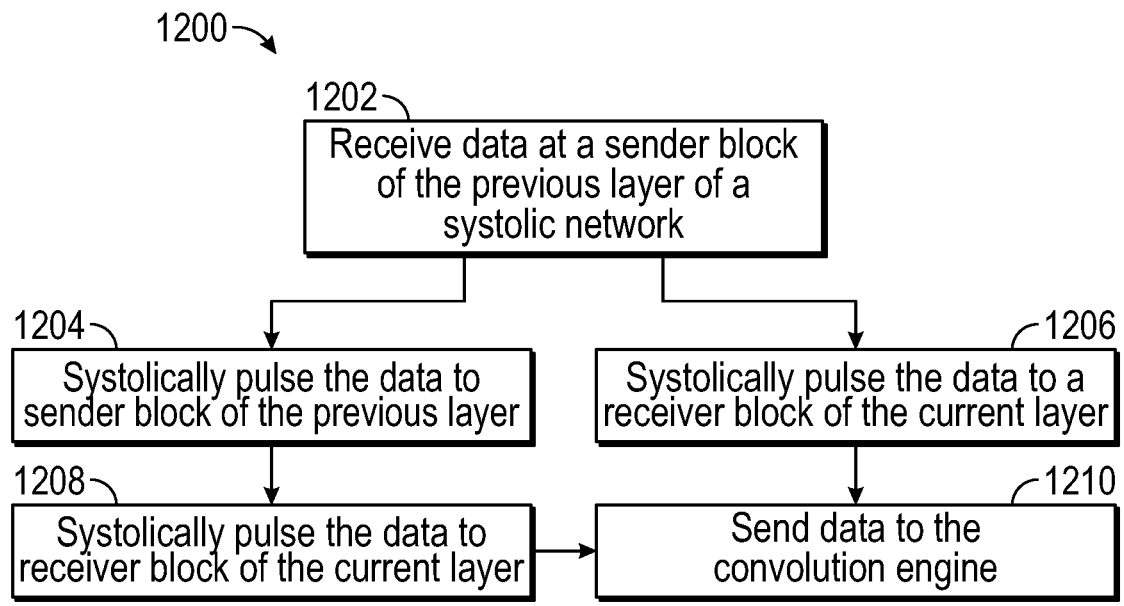
FIG. 11G depicts a flow diagram of the systolic neural network engine for processing data packets in a systolic nature according to some embodiments.

FIG. 11G depicts a flow diagram of a process 1200 for processing data packets in a systolic nature using the disclosed the systolic neural network engine, according to an example embodiment. At block 1202, data (e.g., the output of the convolutional processing circuitry, including any activation function, or systolically pulsed from an adjacent sender block) can be received at a sender block of a DPU assigned to a first layer of a neural network. An example of this step is shown at time=0 in FIG. 11A, where the sender blocks 110, 112, 114, 116 receive data from their respective processing blocks. From block 1202, the process 1200 proceeds to block 1204 for connections between adjacent DPUs of the same arrangement, such as a column, on the systolic neural network engine die, and the process 1200 proceeds to block 1206 for inter-layer connections between DPUs of adjacent arrangements, such as columns.

At block 1204, the data can be systolically pulsed to at least one other sender block of the first layer. An example of this step is shown at time=1 of FIG. 11B, where the data from the sender blocks 110, 112, 114, 116 are distributed to other blocks among sender blocks 110, 112, 114, 116. For example, the data from sender block 110 is sent to another sender block of the first layer, such as sender block 112. In some embodiments, the transfer of data is accomplished over wires between sender blocks, between receiver blocks, and between a sender block and a receiver block. The data sent from the sender block of the first layer can include a tag of its address. For example, data transmitted from sender block 110 can include an address tag associated with the sender block 110. This allows the second layer that receives the data from the first layer to identify where the data came from. Such tagging beneficially allows the DPUs to identify whether they need to process a given incoming data packet, identify the appropriate weights for different data packets that they need to process, and perform the designated processing of the data packets regardless of the order in which they are received. The receiver blocks of the second layer read the origin addresses embedded in the data that are received from the sender blocks of the first layer. Although described as a first layer and a second layer, it will be appreciated that this terminology does not limit the described techniques to the actual first and second layers of a neural network, but rather to any two successive layers.

The data can be crossed over from a first sender block of a first layer to a first receiver block of a second layer. In some embodiments (e.g., FIG. 4C), the data can pass between the first and second layers via an additional connection, for example using a second sender block of the first layer to a second receiver block of the second layer. An example of this step is shown at time=1 of FIG. 11B, where the data from the sender block 112 are sent to receiver block 124, and data from sender block 114 are sent to receiver block 122. In some embodiments, more or fewer cross over data transfers can be implemented to transmit data from one layer to another. The number of cross overs can be varied in different implementations (see, e.g., FIGS. 4A-4C), as desired to balance the competing interests of increasing processing speed (e.g., greater numbers of crossovers allow greater numbers of data packets to be transmitted with each systolic pulse) and increasing computational complexity (e.g., greater numbers of data packets transmitted with each systolic pulse can require additional computational circuitry in each DPU). For example, more cross overs can be used to move data from layer to layer beneficially faster but may take more space on the die. In some embodiments, the data transfer from layer to layer can include a combination of cross overs, beneficially saving output to a memory, buffer, and/or the like. In some embodiments, the number of nodes is not even. Tag information can include an invalid indication to indicate that one of the nodes is not to be used in order to derive an even number of nodes from the cross overs.

At block 1206, the data can be distributed to a receiver block of the second layer. An example of this step is shown at time=1 of FIG. 11B, where the data from the sender blocks 110, 112, 114, 116 are distributed to the receiver blocks 120, 122, 124, 126. For example, the data from sender block 110 are sent to a receiver block of the second layer, such as receiver block 120. In some embodiments, the data transmitted from sender block 110 to the receiver block of the current layer at block 1206 and transmitted to another sender block of the previous layer at block 1204 are the same. It will be appreciated that, depending upon their positioning relative to the crossover connections, some DPUs may send both data packets of a single systolic pulse to adjacent DPUs of the same layer (e.g., same arrangement, such as a column, of the systolic array), while other DPUs may send one data packet to an adjacent DPU of the same layer and one data packet to a connected DPU of the next layer. For example, the DPUs in an arrangement can systolically pulse data to adjacent processing units in the arrangement via the sender and receiver blocks, and the adjacent arrangements can be connected by one or more crossover connections.

At block 1208, the data from the other sender block of the first layer can be sent to a receiver block of the second layer. An example of this step is shown at time=2 of FIG. 11C, where the data from the sender blocks 110, 112, 114, 116 are distributed to the receiver blocks 120, 122, 124, 126. For example, the data from sender block 110 are sent to the receiver block 120.

From either block 1208 or 1206, the process 1200 can move to block 1210. At block 1210, the data from the receiver block of the second layer can be sent to the processing circuitry of that DPU, for example the feedback convolutional circuitry described above with respect to FIG. 5. An example of this step is shown at time=2 of FIG. 11C, where the two packets of data received at the receiver block 120 are input into the feedback convolutional engines 130, 132, and the two packets of data received at the receiver block 126 are input into the feedback convolutional engines 134, 136. As described herein, the systolic neural network engine transfers data between DPUs using systolic pulses. Thus, the convolutional processing of data at block 1210 for the data received at block 1206 can be at a different time than the convolutional processing of data at block 1210 for the data received at block 1208. Moreover, advantageously, data can be transferred from one layer to another without writing to and reading from a buffer, memory, and/or the like. Thus, data transfer from one layer to another layer can be performed with reduced transfer time. Although various steps of the process 1200 are described as being performed by the systolic neural network engine, in alternate embodiments these steps can be performed by another suitable control processor for the systolic neural network engine.

Figure 11H:
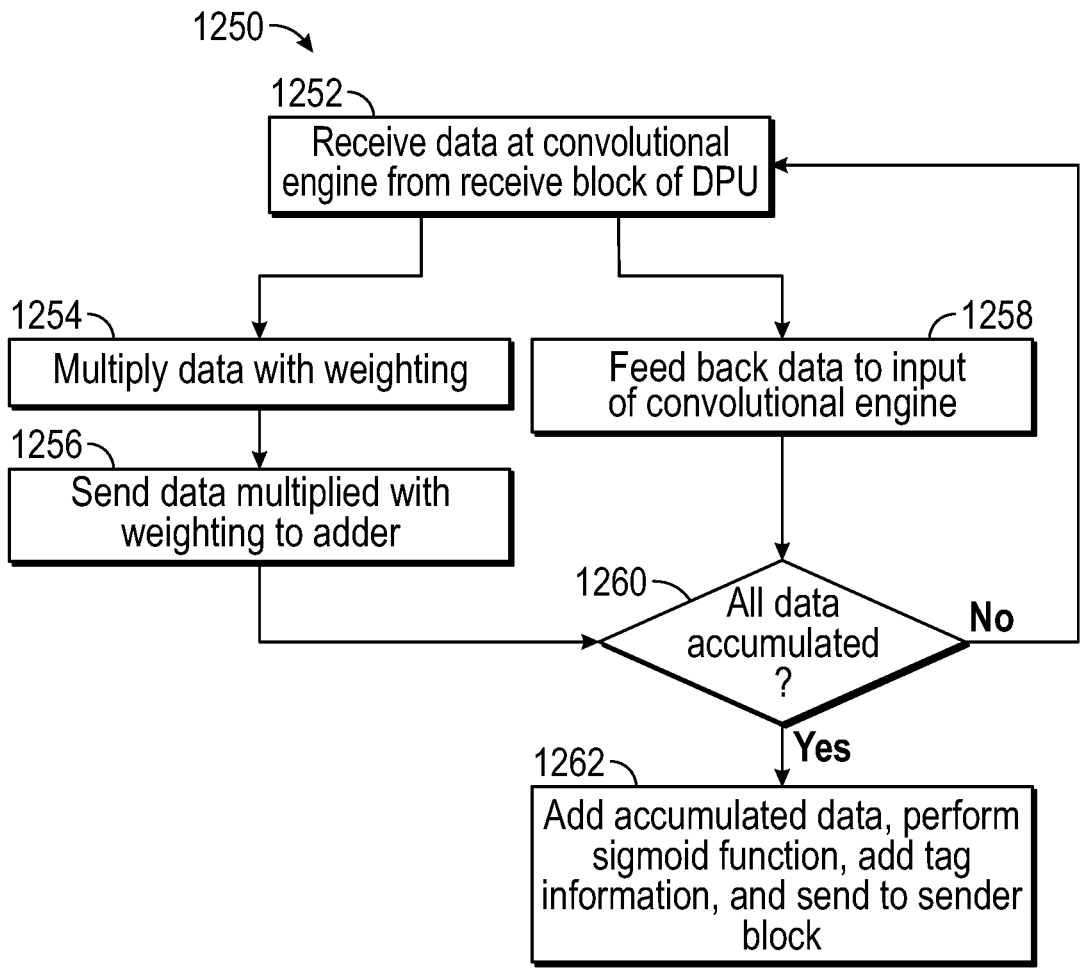
FIG. 11H depicts a flow diagram of the systolic neural network engine for performing the feedback based convolution engine according to some embodiments.

FIG. 11H depicts a flow diagram of a process 1250 for performing feedback based convolution processing in the disclosed systolic neural network engine according to an example embodiment. The process 1250 can begin after block 1210 of the process 1200. Due to the use of the data origin tags, the process 1250 can advantageously apply weights that were identified by training another neural network, potentially on different hardware than the systolic neural network engine. For example, optimized weights for another neural network can be applied to the current neural network using the tag information that identifies where data originated. The weights can be determined while training the other neural network and imported to the neural network being processed by the systolic neural network engine. When the weights are imported, the weights can be applied based on a pairing based on the data address where the data came from and the corresponding weight for the data. The tag information can be included with the data as the data are transmitted from layer to layer. The DPUs on the die of the systolic neural network engine can have information regarding its position on the die (e.g., the memory storing its ID). Thus, nodes of a neural network can be assigned to different DPUs on the die while still maintaining the ability to process data according to their original configuration.

At block 1252, first data can be received at the convolutional engine from the receiver block of the DPU. An example of this step is shown at time=2 in FIG. 11C, where data from receiver block GPU 120 are sent to the convolutional engine 130. From block 1252, the process 1250 transitions to block 1254 for the data just received, and transitions to block 1258 for any previously-processed data that will be fed back into the convolutional engine.

At block 1254, the received data can be multiplied by a weight, which can be identified using the origin tag of the data. An example of this step is shown at time=2 in FIG. 11C, where data ⊗ from the receiver block 122 are sent to the convolutional engine 130. The data ⊗ are multiplied by a weight ε1.

At block 1256, the data multiplied by the weights are sent to the adder. An example of this step is shown at time=2 in FIG. 11C, where data ⊗ multiplied by a weight ε1 are sent to the adder 140. In some embodiments, the weight can be stored locally and/or retrieved from an external memory.

At block 1258, the received data ⊗ are fed back to the convolutional engine 130. For example, in a convolutional neural network used for analyzing an image, different filters can be applied to input values in order to identify different types of features in the image. These filters typically span an array of multiple adjacent values, for example 3×3 or 5×5 regions. As such, the values output from multiple DPUs of a previous layer may be needed to perform a given convolution. For this reason, received data may be beneficially fed back into the convolutional engine for further convolutional processing.

The process 1250 can proceed to block 1260 from either or both of blocks 1256 and 1258. At block 1260, the adder 140 determines whether all data designated for processing at that particular DPU have been accumulated at the adder 140, for example by comparing tags of data accumulated at the adder to a list of designated tags. If so, then, at block 1262, the accumulated data at the adder 140 are added, the output of the adder 140 is sent to the sigmoid function 150 to perform the sigmoid computations (or another suitable activation function). The activation output is sent to the sender block at which the tag information is added before the data are systolically pulsed to other DPUs. Although various steps of the process 1250 are described as being performed by the systolic neural network engine, in alternate embodiments these steps can be performed by another suitable control processor for the systolic neural network engine.

The systolic flow engine systems described may be added to data storage devices and/or memory devices such as hard disk drives, solid state drives, solid state non-volatile memory, volatile memory and storage class memory, as necessary to allow the systolic flow engine to access data from the attached memory. The connections provided between the systolic flow engine and the memory may be created to allow the needed amount of data to be provided to the systolic flow engine.

Figure 12:
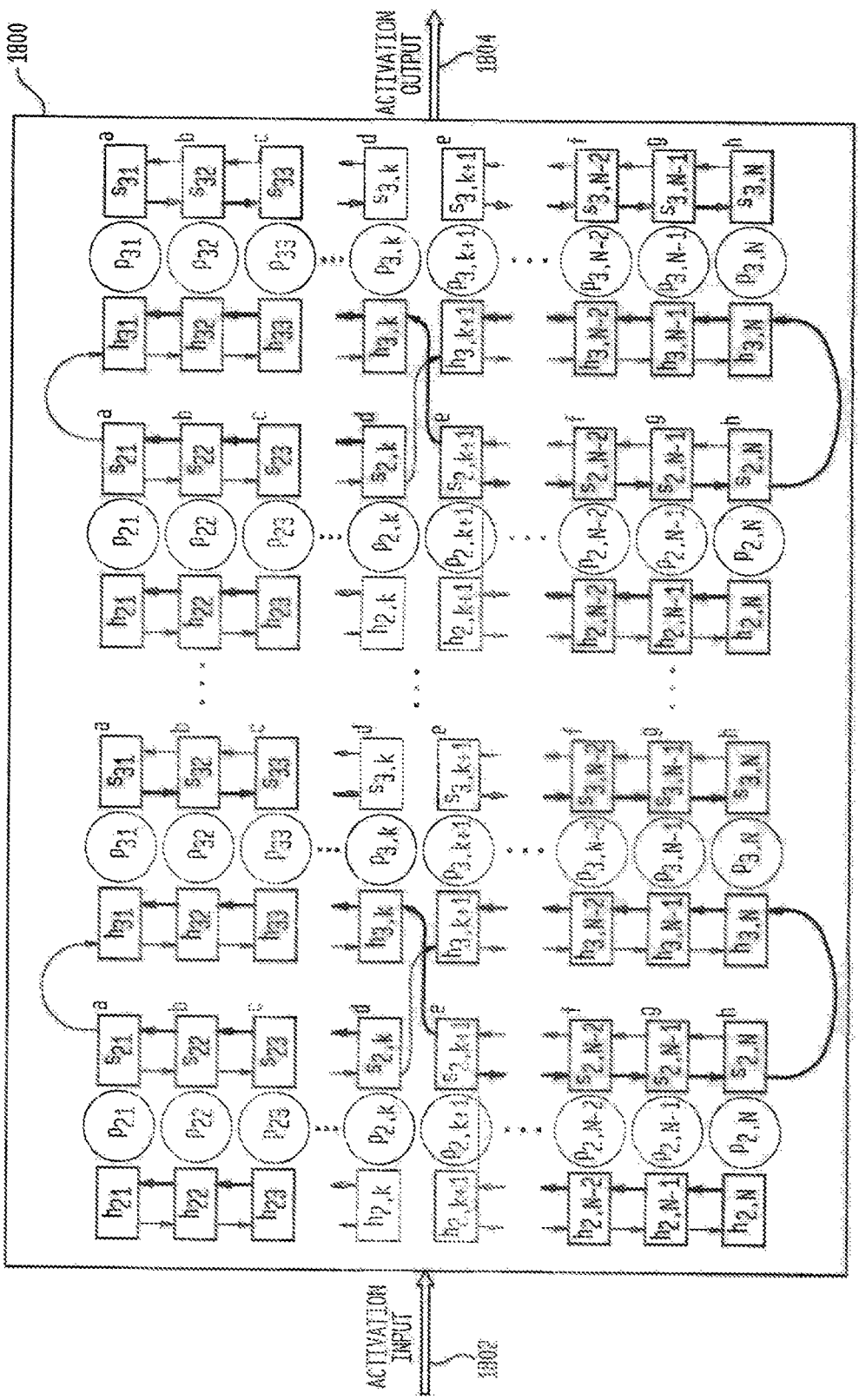
FIG. 12 is a diagram of a systolic flow engine core with activation input and activation output according to some embodiments.

Referring to FIG. 12, a systolic flow engine ("SFE") core 1800 is illustrated. The SFE core 1800 is provided with an activation input 1802 and the input 1802 is processed to provide an activation output 1804. The core 1800 includes one or more systolic neural network engines as described above. The core 1800, for example, may be made of silicon and additional circuits may be provided for supporting and extending core capabilities to larger N numbers of processing nodes.

As indicated by the arrows representing interconnects between DPUs of the core 1800, the wiring layout follows a serpentine configuration for effective use of the silicon area. Activation inputs may enter specific access points and be systolically systolic pulsed to other destination systolic elements for scalability on resolution and number of processing nodes. Activation outputs may exit specific processing nodes by systolic pulses for scalability on resolution and number of processing nodes. Weight inputs can be provided from a pre-trained network since they might be specific to each processing node—i.e. not shared among processing nodes. Multiply and add circuits may be shared among neighboring DPUs depending on the implementation.

Figure 13:
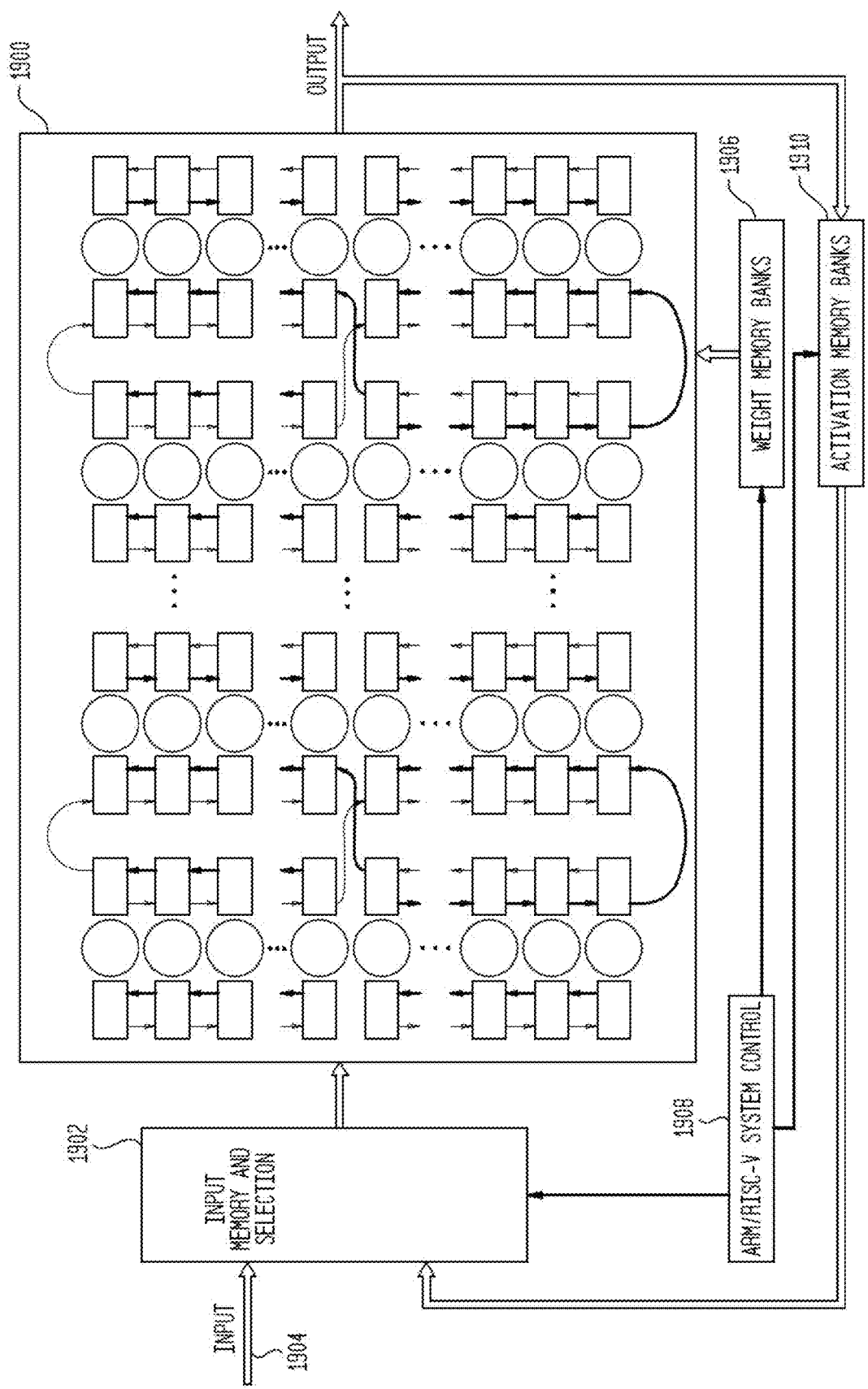
FIG. 13 is a diagram of a systolic flow engine interface system with single input arrangement according to some embodiments.

FIG. 13 depicts a systolic flow engine in inference operation mode. A systolic flow engine core 1900 including one or more systolic neural network engines is connected to an input memory arrangement 1902. The input memory arrangement 1902 may receive an input 1904 (e.g., input image data or other input data) from a connected processor and/or networked remote computing device. A weight memory bank(s) 1906 may provide weights to individual DPUs within the systolic flow engine core 1900, for example by providing such weights to local memories within the DPUs, or by being accessed by the DPUs as needed during computation. A system control 1908 provides input to both the input memory 1902 and the weight memory bank(s) 1906 as well as activation memory banks 1910. The activation memory banks 1910 are also connected to the input memory 1902.

The system control 1908 can be a finite state machine or a processor, for example, an ARM processor, RISC-V processor, or another controller suitable for instruction set architecture ("ISA"). An ARM processor is one of a family of CPUs based on the reduced instruction set computing ("RISC") architecture developed by Advanced RISC Machines (hence, "ARM"). RISC-V (pronounced "risk-five") is an open ISA based on established RISC principles.

Figure 14:
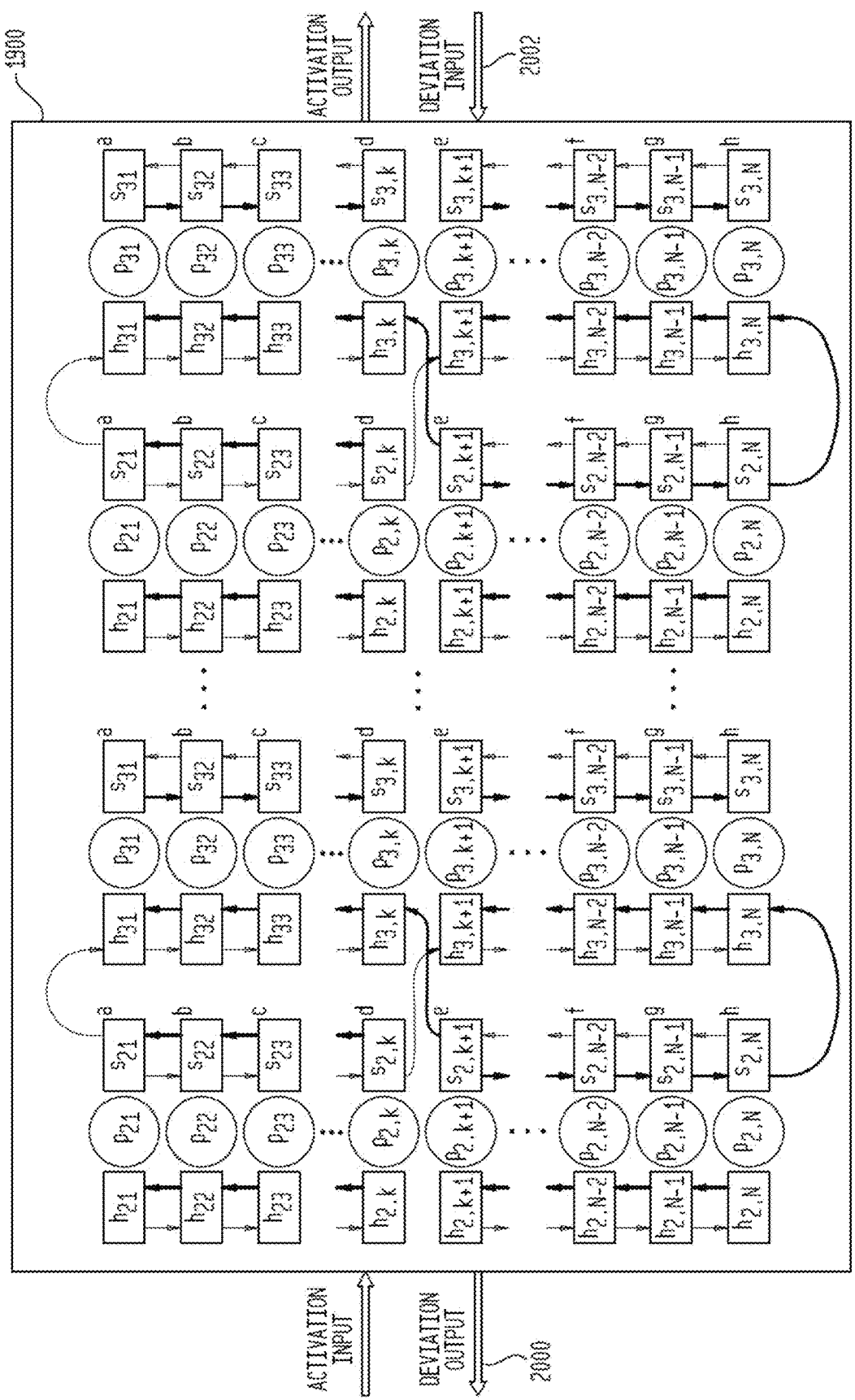
FIG. 14 is a diagram of a systolic flow engine with activation input, activation output, deviation input and deviation output according to some embodiments.

Further referring to FIG. 14, the input memory 1902 allows a host processor (not illustrated) to provide inputs into the deep neural network, as well as to provide weights of the network (e.g., weights previously set during training). The host processor sends commands and data to be handled by the system control processor. The weight memory banks 1906 and the activation memory banks 1910 extend the ability of the SFE core 1900 to model deep neural networks having larger numbers of processing nodes and larger numbers of layers. The system control 1908 enables the SFE core 1900 to perform the calculation of activation signals through a large number of neural network layers. Through the correct selection of weights and activation memory bands, the system control 1908 can extend deep neural network calculations to a large number of processing nodes per layer beyond the physically available DPUs in the systolic flow engine core 1900.

Referring to FIG. 14, the core 1900 is provided with an additional set of connections, one for deviation output 2000 and deviation input 2002. These connections allow for deviations to be processed through the core 1900. The deviation output 2000 and deviation input 2002 can support backpropagation for training of neural network weights using the core 1900.

Figure 15:
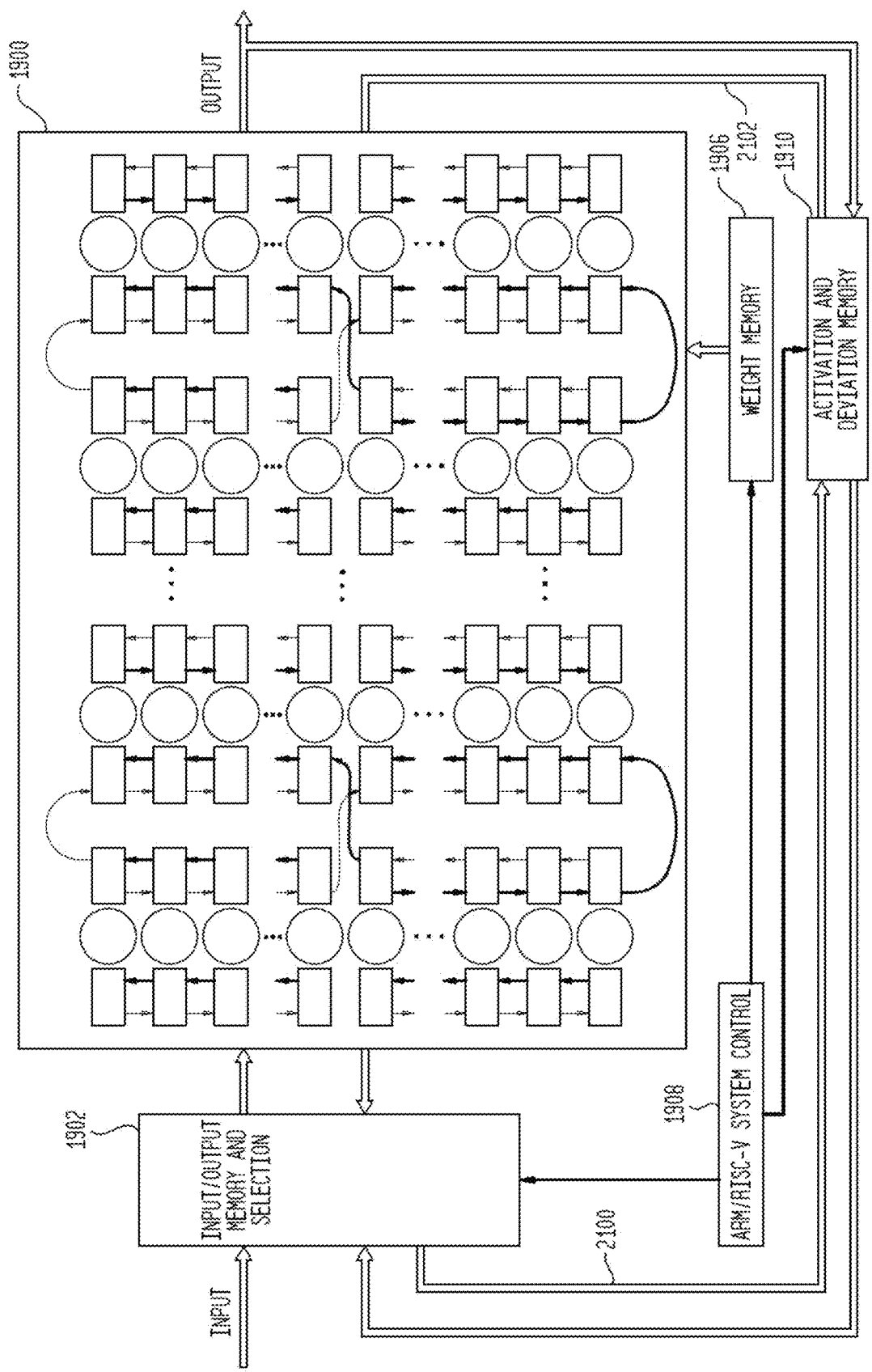
FIG. 15 is a diagram of a systolic flow engine and interface system with multiple connections according to some embodiments.
Figure 16:
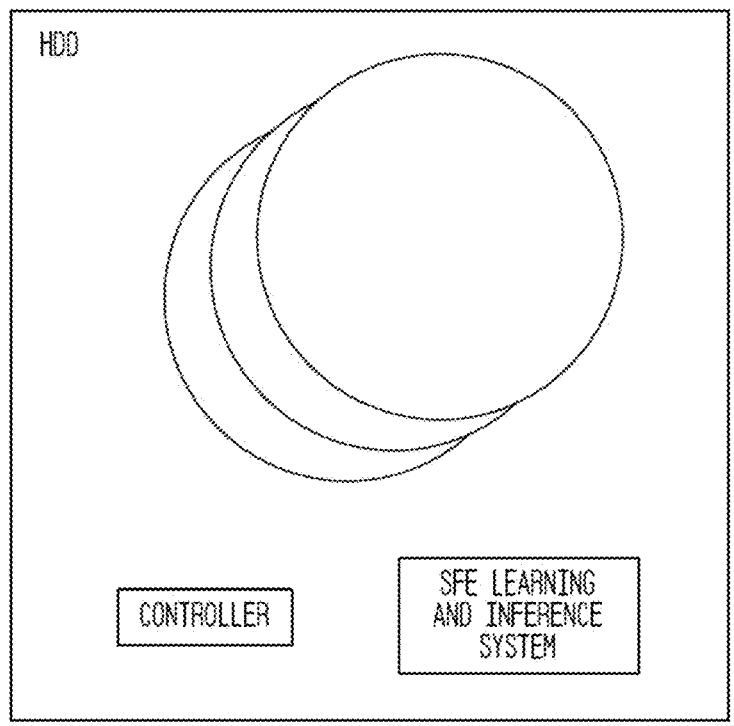
FIG. 16 is a diagram of a systolic flow engine used in a hard disk drive according to some embodiments.

Referring to FIG. 15, an additional set of connections is provided between the input memory 1902 and, for example, the activation memory banks 1910. An additional connection is provided between the activation and deactivation memory 1910 and the systolic flow engine core 1900. Another connection is provided between the systolic flow engine core 1900 and the input memory 1902. These connections allow for processing of data to and from the various components to allow deviations to be propagated through the entire system, for example during backpropagation.

The input memory 1902 allows a host processor to inform inputs and weights for convolution in each layer of the deep neural network. The host processor may retrieve weights and distribute those among the DPUs of the systolic flow engine. The system control 1908, in a non-limiting embodiment, can be a finite state machine (FSM) or a suitable processor, such as an ARM or RISC-V processor. The host processor may send commands and data handled by the system control processor.

Figure 17:
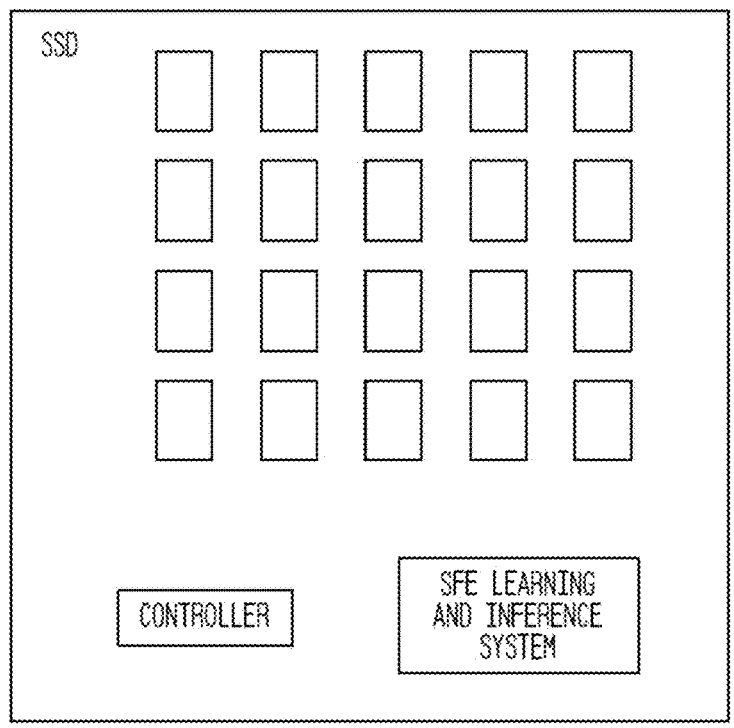
FIG. 17 is a diagram of a systolic flow engine used in a solid state drive according to some embodiments.
Figure 18:
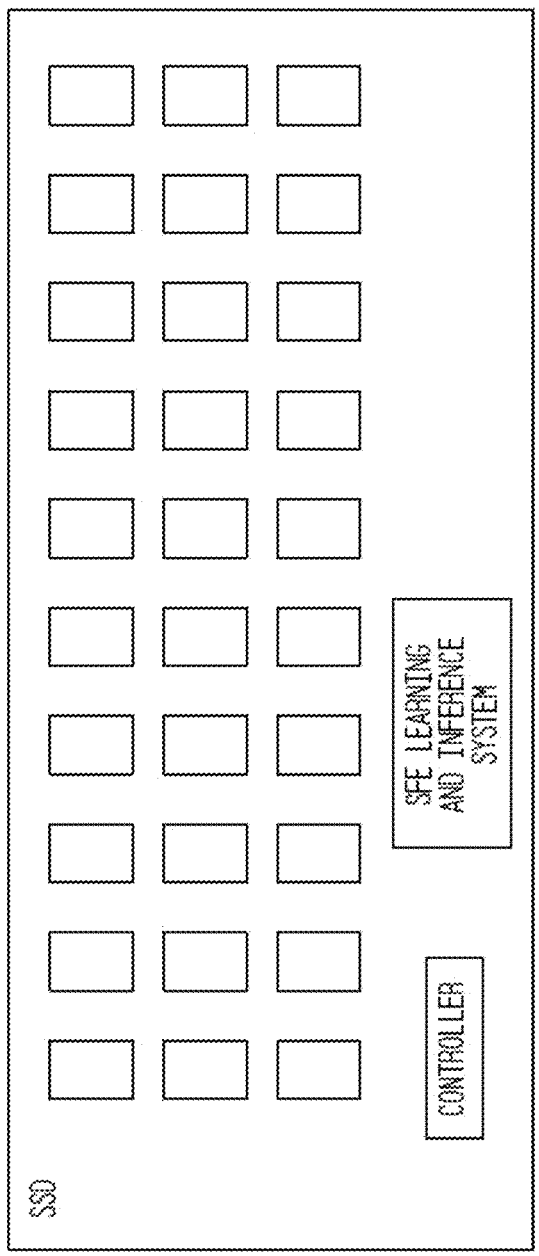
FIG. 18 is a diagram of a systolic flow engine used in a solid state drive with a card interface according to some embodiments.
Figure 19:
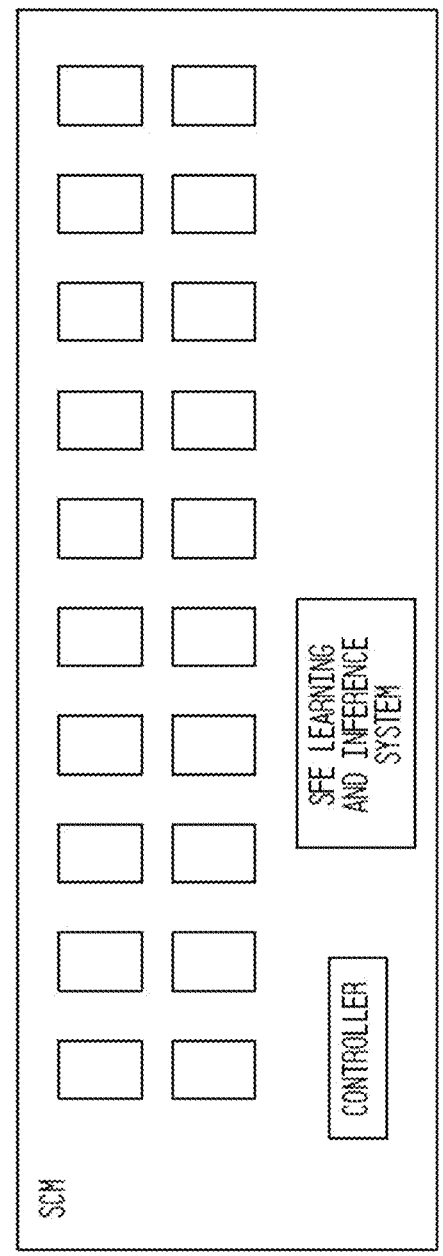
FIG. 19 is a diagram of a systolic flow engine used in a storage class memory according to some embodiments.

Systolic flow engine systems may be provided in a single core arrangement, or may be placed in other configurations. These systems may also be used in different arrangements such as, in FIG. 17, in a disk arrangement, in FIG. 18, in a standalone solid state drive, in FIG. 24, a solid state drive that may be connected, for example, through a card interface, or, as provided in FIG. 19, in a storage class memory arrangement.

Figure 20:
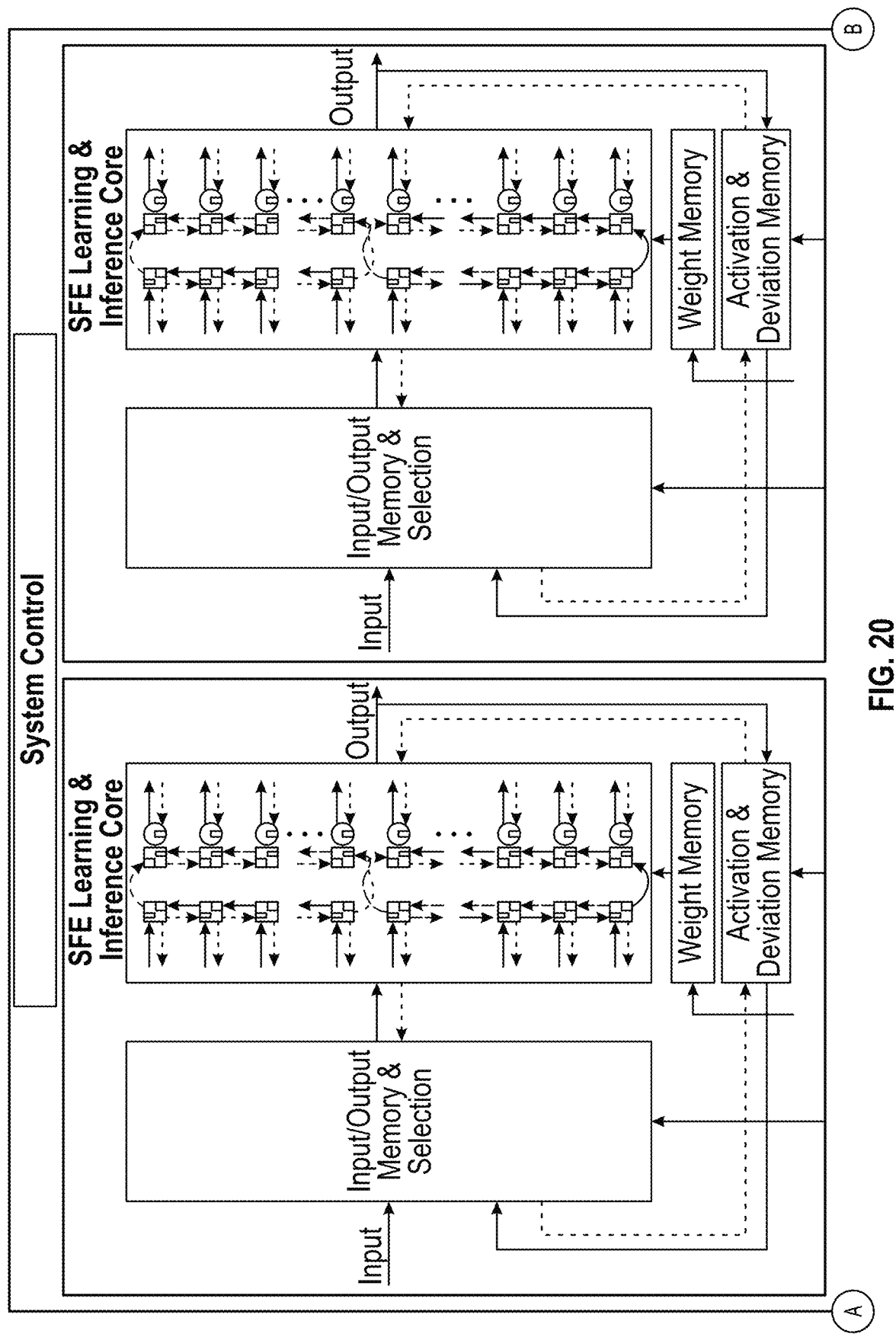
FIG. 20 depicts an embodiment of a multi-core systolic flow engine according to some embodiments.
Figure 20:
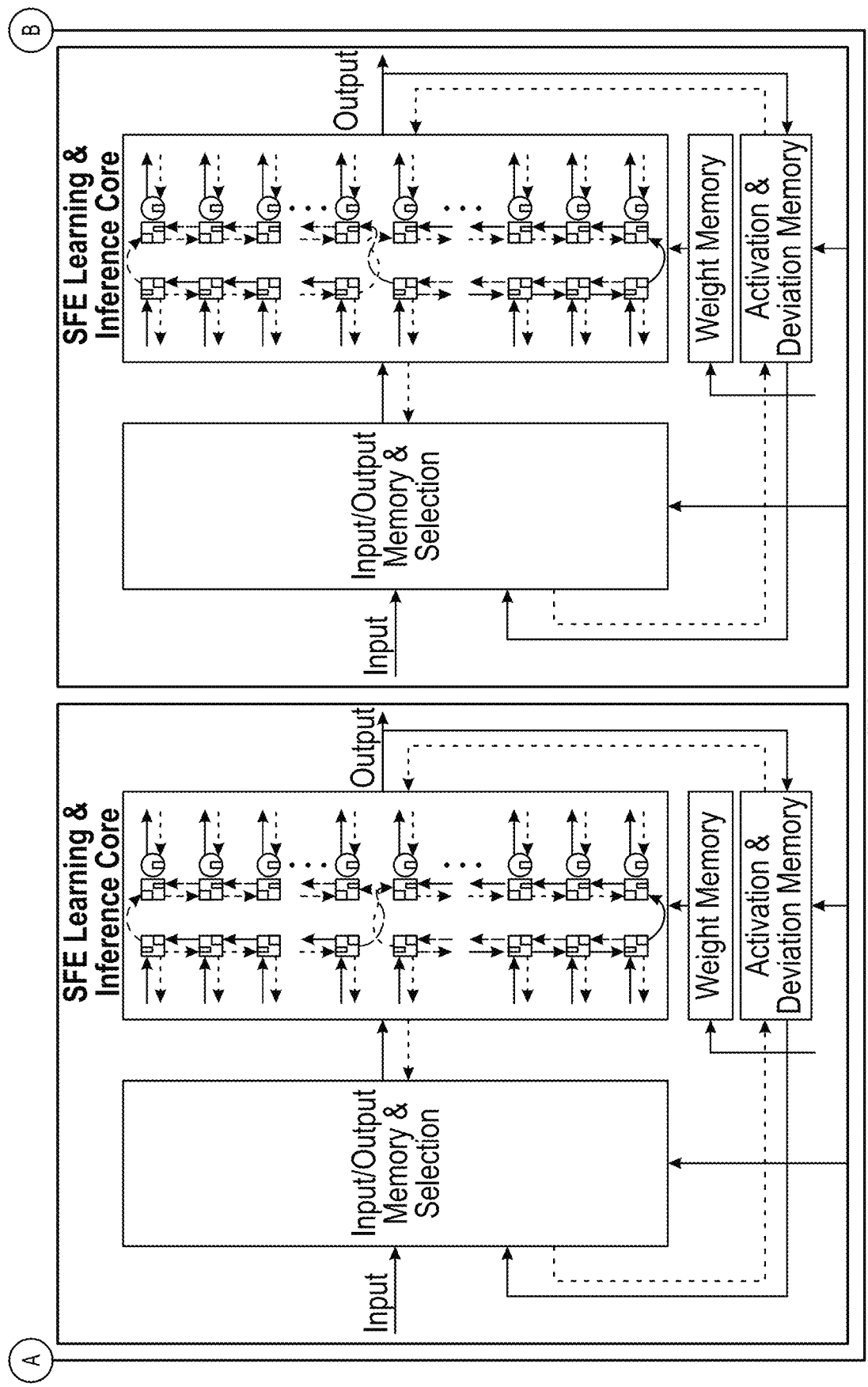

FIG. 20 depicts a multi-core SFE. In the embodiment of FIG. 20, a single system control manages four SFE cores. Other embodiments can have greater or fewer numbers of cores. The system control can manage the SFE cores such that different learning and inference systems are run in parallel.

In some embodiments, there may be too many layers in a given neural network for all of the computations of that network to be performed in one pass on a single systolic neural network engine die. For example, some neural networks can include 1,000 layers or more. As described herein, the DPUs can be arranged in arrangements, such as columns, and rows on the die, with DPUs along a certain column all assigned to perform computations of nodes of the same neural network layer. As such, when the number of neural network layers exceeds the number of columns of the die, then the neural network can be considered as being too big for processing on the die. In some embodiments, a feedback loop can be utilized to repurpose the layers on a die in order to overcome this challenge.

Figure 21:
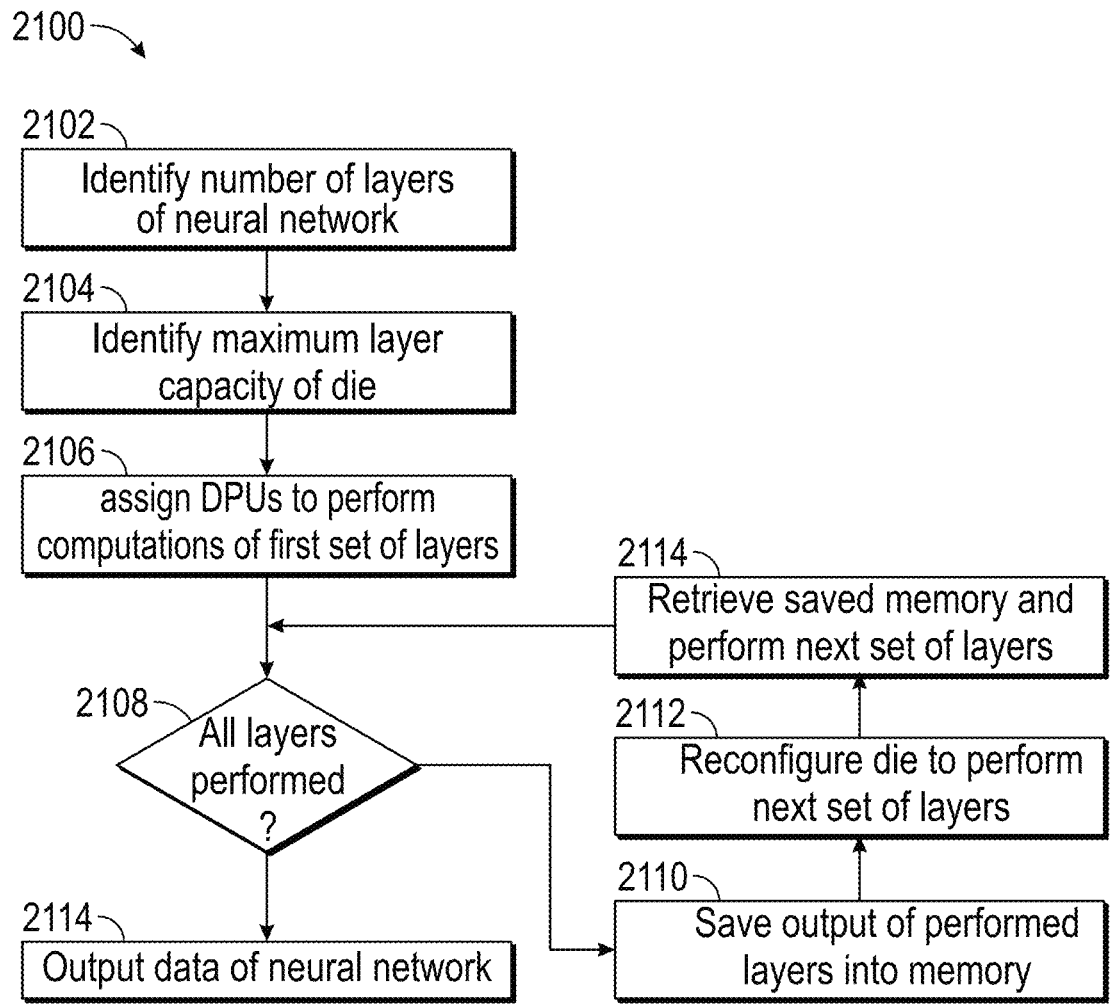
FIG. 21 illustrates a flow diagram of the repurposing of the layers in a die according to some embodiments.

FIG. 21 illustrates a flow diagram of a process 2100 for repurposing the DPU arrangements of processing units, such as arranged in linear parallel columns of processing units, of a die to accommodate large neural networks that have a number of layers exceeding the number of columns of the die. At block 2102, the input/output memory and selection module 1902 (referred to as "module 1902") can identify a number of layers of a neural network. For example, the neural network can have 1,000 layers of nodes. Although various steps of the process 2100 are described as being performed by the module 1902, in alternate embodiments these steps can be performed by another suitable control processor for the systolic neural network engine.

At block 2104, the module 1902 can identify the maximum number of layers that can be processed in one pass through the columns of a die. For example, the die can include 100 columns of DPUs, which provides enough resources to perform the computations of 100 layers.

At block 2106, the module 1902 can configure the die to perform the computations of a first set of the layers of the neural network, the number of layers in the first set corresponding to the number of columns of DPUs on the die. For example, the module 1902 can assign the DPUs identities of nodes of the first 100 layers of the neural network, where DPUs of the first column are assigned to perform computations of nodes of the first layer, DPUs of the second column are assigned to perform computations of nodes of the second layer, and so on up to DPUs of the $100^{th}$ column being assigned to perform computation of nodes of the $100^{th}$ layer.

At block 2108, the module 1902 can determine whether the computations of all of the layers of the neural network have been performed. Once decision block 2108 determines that the computations of all layers of the neural network have been performed, the process 2100 transitions to block 2114 where the final output of the neural network is saved to a memory. However, if the module 1902 determines that not all layer computations have been performed, the process 2100 transitions to block 2110.

At block 2110, the activation output of the last processed layer can be saved into a memory (e.g., activation memory bank 1910). At block 2112, the module 1902 can reconfigure the die to perform the computations of the next set of layers. Continuing the above example, the 100 columns of DPUs on the example die would be reconfigured such that DPUs of the first column are reassigned to perform computations of nodes of the $101^{st}$ layer, DPUs of the second column are reassigned to perform computations of nodes of the $102^{nd}$ layer, and so on up to DPUs of the $100^{th}$ column being reassigned to perform computation of nodes of the $200^{th}$ layer.

Next, at block 2114, module 1902 can retrieve the saved activation output data from the memory 1910 and input these activation outputs into the DPUs of the first column. These values will propagate through the DPUs so that the computation of the next set of layers 101-200 is performed. Blocks 2108-2110 are repeated until all 1,000 layers are performed. Then at block 2114, the die outputs the final activation outputs of the $1,000^{th}$ layer as the output of the neural network. Advantageously, by using the disclosed feedback loop with a controller and external memory, a die can perform computations of neural networks having large numbers of layers that exceed the capacity of the resources of the die.

In some embodiments, for example in the multi-die implementation of FIG. 20, such large neural networks can be implemented across multiple dies. For example, a first die can be used for the computations of a first subset of the number of layers, and a second die can be used for the computations of a second subset of number of layers. This can be done with two, three, four, or more dies (as available and as needed). The activation outputs of the final column of DPUs on the first die can be saved to memory and provided to the DPUS of the first column on the second die, so that the second die can perform the computations of the second subset of layers. If the number of layers of the neural network exceeds the combined capacity of the dies, the multi-die distributed processing can be combined with the feedback loop of FIG. 21.

Figure 22:
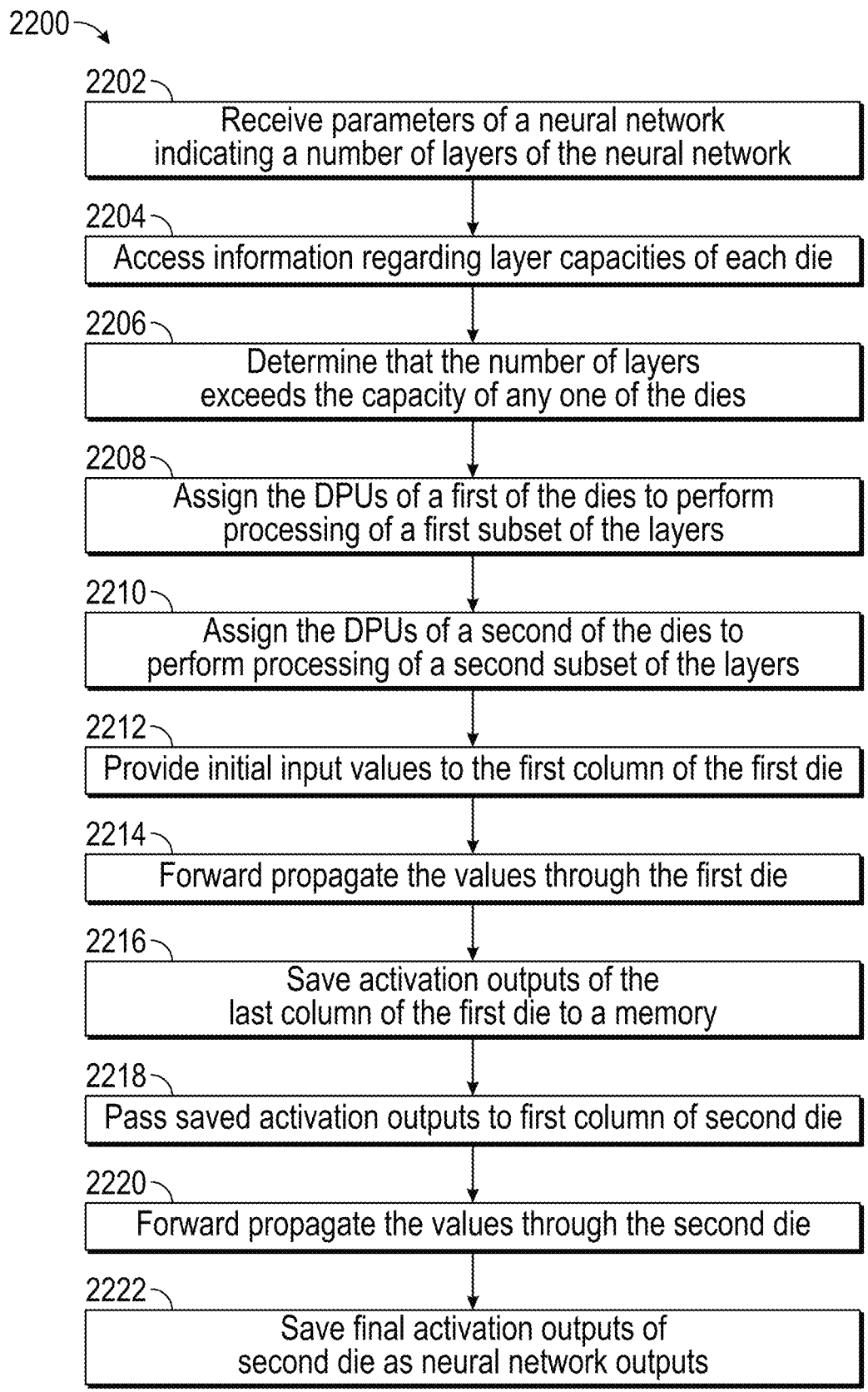
FIG. 22 illustrates a flow diagram of implementing multiple dies for the systolic neural network engine according to some embodiments.

FIG. 22 illustrates a flow diagram of implementing multiple dies for the systolic neural network engine. The process 2200 can begin at block 2202 where the systolic neural network engine can receive parameters of a neural network to be processed using the multi-die systolic neural network processing engine system, the parameters indicating a number of layers of the neural network. At block 2204, the systolic neural network engine can access information regarding layer capacities of each die. At block 2206, the systolic neural network engine can determine that the number of layers exceeds the capacity of any one of the dies. In some embodiments, this step is optional. For example, the systolic neural network engine can use multiple dies regardless of whether the number of layers exceeds the capability of any and/or one or more of the dies.

At block 2208, the systolic neural network engine can assign the DPUs of a first die to perform processing of a first subset of the layers, and at block 2210, the systolic neural network engine can assign the DPUs of a second die to perform processing of a second subset of the layers. At block

2212, the systolic neural network engine can provide initial input values to the first arrangement, such as a column, of the first die. At block 2214, the systolic neural network engine can forward propagate the values through the first die.

At block 2216, the systolic neural network engine can save activation outputs of the last arrangement, such as a column, of the first die to a memory, and at block 2218, the systolic neural network engine can pass saved activation outputs to first column of second die. In some embodiments, the systolic neural network engine can pass the activation outputs directly from the last column of the first die to the first column of the second die. In some embodiments, the systolic neural network engine can store and/or process the data in between the dies.

At block 2220, the systolic neural network engine can forward propagate the values through the second die. At block 2222, the systolic neural network engine can save the final activation outputs of second die as neural network outputs. Although various steps of the process 1250 are described as being performed by the systolic neural network engine, in alternate embodiments these steps can be performed by another suitable control processor for the systolic neural network engine.

Figure 23:
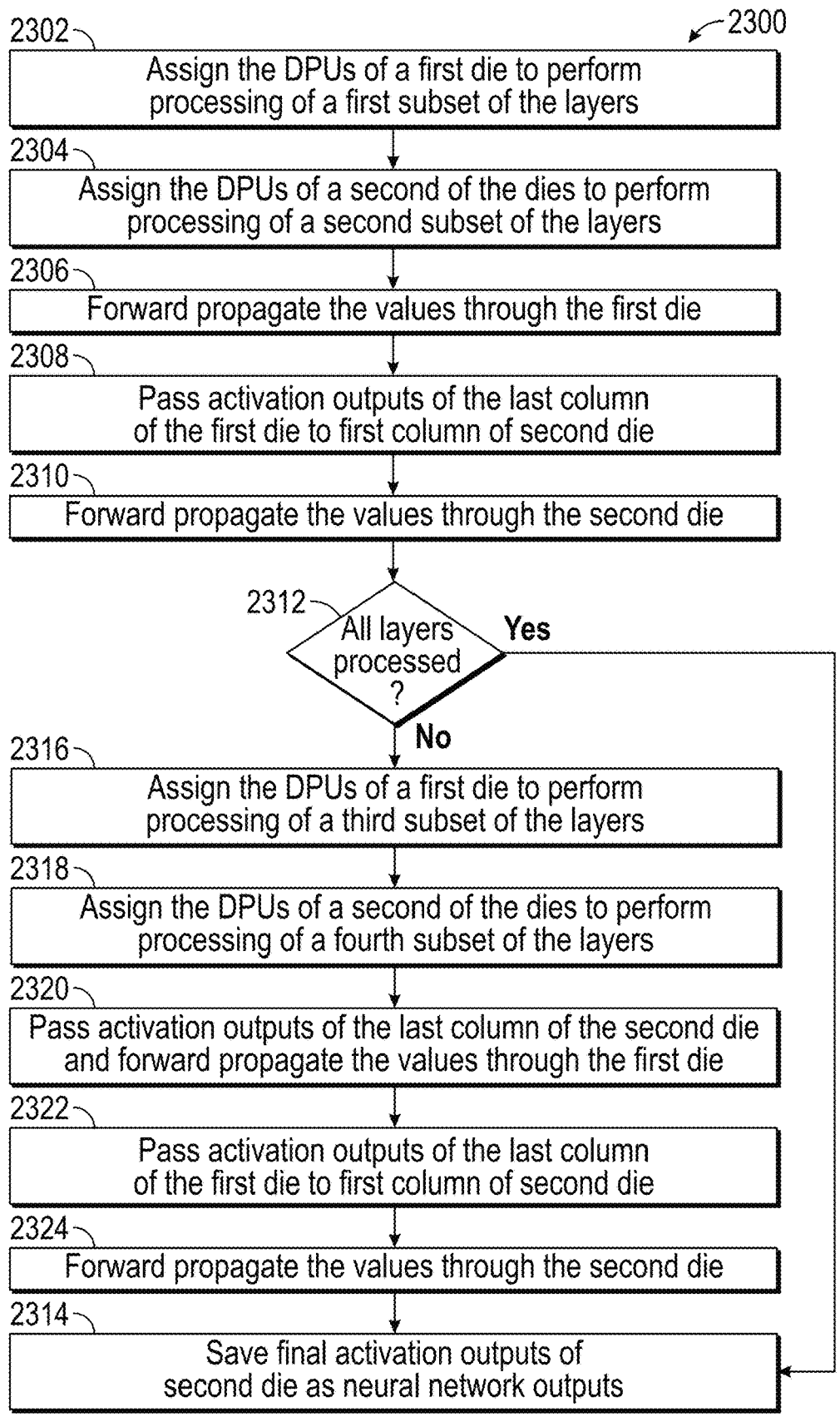
FIG. 23 illustrates a flow diagram of implementing multiple dies for the systolic neural network engine with a feedback loop according to some embodiments.

FIG. 23 illustrates a flow diagram of implementing multiple dies for the systolic neural network engine. The process 2300 can begin at block 2302 where the systolic neural network engine can assign the DPUs of a first die to perform processing of a first subset of the layers, and at block 2304, the systolic neural network engine can assign the DPUs of a second die to perform processing of a second subset of the layers.

At block 2306, the systolic neural network engine can provide initial input values to the first column of the first die and can forward propagate the values through the first die.

At block 2308, the systolic neural network engine can pass activation outputs of the last column of the first die to first column of second die, and at block 2310, the systolic neural network engine can forward propagate the values through the second die. In some embodiments, the systolic neural network engine can pass the activation outputs directly from the last column of the first die to the first column of the second die and/or perform functions in between, such as storing and/or processing the data.

At block 2312, if all of the layers of the neural network are processed, then at block 2314, the systolic neural network engine can save the final activation outputs of second die as neural network outputs.

At block 2312, if all of the layers of the neural network are not processed, then a feedback loop can be implemented to repurpose the first and second dies. For example, at block 2316, the systolic neural network engine can assign the DPUs of a first die to perform processing of a third subset of the layers, and at block 2318, the systolic neural network engine can assign the DPUs of a second die to perform processing of a fourth subset of the layers. Thus, a feedback can be used to repurpose the first and second dies to perform additional layers of the neural network.

At block 2320, the systolic neural network engine can pass activation outputs of the last column of the second die to first column of first die and can forward propagate the values through the first die. In some embodiments, the first and second die are reconfigured to peform the third and fourth subset of layers for the neural network. The systolic neural network engine can save the activation outputs into memory and pass them back to the first die when the first die is reconfigured.

At block 2322, the systolic neural network engine can pass activation outputs of the last column of the first die to first column of second die and at block 2324, the systolic neural network engine can forward propagate the values through the second die.

At block 2314, the systolic neural network engine can save the final activation outputs of second die as neural network outputs.

In one non-limiting embodiment, an arrangement to process data is disclosed. In this non-limiting embodiment, a systolic flow engine comprises a network with a plurality of nodes, the plurality of nodes configured to accept a data packet, process the data packet in a forward propagation and provide an output, wherein the plurality of nodes are configured in at least two layers and wherein the network sends the data packets along the network in a systolic process. At least one input memory arrangement is configured to send the data packet to the network with the plurality of nodes, and at least one weight memory bank is connected to the systolic flow engine. An activation memory bank is connected to the input memory arrangement and a system control is connected to the input memory arrangement, the activation memory band and at least one weight memory bank. The system control is configured to send data to each of the input memory, the weight memory bank and the activation memory bank.

In another non-limiting embodiment, the arrangement is disclosed wherein each node further comprises an adder arrangement and an arrangement configured to produce a function for activation of an artificial neuron.

In another non-limiting embodiment, the arrangement is provided wherein the function is a sigmoid function.

In another non-limiting embodiment, the arrangement is provided wherein each node is further configured to compute a weighted summation for use in a convolution calculation.

In another non-limiting embodiment, the arrangement is provided wherein the plurality of nodes are configured to perform both calculations within each node and transmission in between nodes.

In another non-limiting embodiment, the arrangement further comprises an arrangement for each of the nodes in the plurality of nodes to create a tag for the data packet.

In another non-limiting embodiment, the arrangement is provided wherein each of the nodes is configured to perform a clockwise and a counter-clockwise convolution of the data packet.

In another non-limiting embodiment, the arrangement is provided wherein each of the nodes is configured with at least two pointers, wherein the at least two pointers are configured to choose a weight to apply in calculations for the node.

In another non-limiting embodiment, the arrangement is provided wherein the systolic process includes transmission of a data packet from a first node to a second node during a pulse, and where weights used in each processing node are brought to the node by non-systolic circuits.

In another non-limiting embodiment, the arrangement is provided wherein the pulse is defined by a computer clock pulse.

In another non-limiting embodiment, the arrangement is described wherein the input memory is connected to the activation memory and the activation memory bank is connected to a back propagation input into the systolic flow engine.

In another non-limiting embodiment, a method of computer processing is described comprising receiving an input at an input memory arrangement, sending at least one data packet from the input memory arrangement to a systolic flow engine, receiving a data packet at a processing node of a neural network in the systolic flow engine, performing a calculation of the data packet at the processing node to create a processed data packet, attaching a tag to the processed data packet, the tag indicating information on the data packet (as identification of a source processing node) and control bits (for indicating what a processing node needs to do with the data packet and/or if data are valid or non-valid) at the processing node of the neural network, transmitting the processed data packet from the processing node to a receiving node during a systolic pulse of the neural network, receiving the processed data packet at the receiving node, performing a clockwise convolution on the processed data packet and a counter clockwise convolution on the processed data packet and performing an adding function on results of the clockwise convolution and the counter clockwise convolution of the processed data packet.

In another non-limiting embodiment, the method may further comprise performing a non-linear function as one of tan h, ReLU and sigmoid of the results of the clockwise convolution and the counter clockwise convolution.

In another non-limiting embodiment, the method may be performed wherein the clockwise convolution and the counterclockwise convolution are performed using at least two weight pointers applied to the processed data packet.

In another non-limiting embodiment, the method may be performed wherein at least two weights are applied to the clockwise convolution and the counterclockwise convolution.

In another embodiment, the method may be performed wherein upon reaching a defined value, the performed sigmoid function reflects a status of an artificial neuron in the neural network.

In another embodiment, the method may further comprise locally saving the calculation of the data packet at the processing node.

In another non-limiting embodiment, the method may be performed wherein each step of the method is performed in a systolic pulse.

In another non-limiting embodiment, the method may be performed wherein a systolic pulse is measured by a longest calculation time of one of a clockwise and a counter clockwise convolution.

In another non-limiting embodiment, an arrangement for computer processing is disclosed comprising means for receiving an input at a memory, means for sending at least one data packet from an input memory arrangement to a systolic flow engine, means for receiving a data packet and performing a calculation of the data packet at the processing node to create a processed data packet, means for attaching a tag to the processed data packet, the tag indicating processing at the processing node of the neural network, means for transmitting the processed data packet during a systolic pulse of the neural network, means for receiving the processed data packet at a receiving node, means for performing a clockwise convolution on the processed data packet and a counter clockwise convolution on the processed data packet and means for performing an adding function on results of the clockwise convolution and the counter clockwise convolution of the processed data packet.

In another non-limiting embodiment, the arrangement may further comprise means for performing a sigmoid function of the results of the clockwise convolution and the counter clockwise convolution.

In another non-limiting embodiment, an arrangement is disclosed comprising a systolic flow engine including a network with a plurality of nodes, the plurality of nodes configured to accept a data packet, process the data packet in a forward propagation and provide an output, wherein the plurality of nodes are configured in at least two layers and wherein the network sends the data packets along the network in a systolic process, at least one input memory arrangement, configured to send the data packet to the network with the plurality of nodes, at least one weight memory bank connected to the systolic flow engine, an activation memory bank connected to the input memory arrangement, a system control connected to the input memory arrangement, the activation memory band and at least one weight memory bank, the system control configured to send data to each of the input memory, the weight memory bank and the activation memory bank and a memory device connected to the systolic flow engine.

In another non-limiting embodiment, the arrangement is disclosed wherein the memory device is a hard disk drive.

In another non-limiting embodiment, the arrangement is disclosed wherein the memory device is a solid state disk.

In another non-limiting embodiment, the arrangement is disclosed wherein the memory device is a storage class memory.

In another non-limiting embodiment, an arrangement is disclosed comprising a systolic flow engine including a network with a plurality of nodes and at least one memory arrangement attached to the systolic flow engine.

In another non-limiting embodiment, the arrangement is disclosed wherein the at least one memory arrangement is one of a hard disk drive, a storage class memory, and a solid state drive.

While embodiments have been described herein, those skilled in the art having benefit of this disclosure will appreciate that other embodiments are envisioned that do not depart from the inventive scope of the present application. Accordingly, the scope of the present claims or any subsequent related claims shall not be unduly limited by the description of the embodiments described herein.

What is claimed is:

1. A device for performing training of a neural network via backward propagation, the device comprising:
 a memory configured to store input values and corresponding expected output values;
 at least one additional memory configured to store weights corresponding to connections between nodes of the neural network; and
 a plurality of processing nodes that performs computations according to particular nodes of the neural network, wherein each processing node of the plurality of processing nodes includes a separate circuit;
 wherein each processing node of the plurality of processing nodes is configured to perform computations for forward propagation of the input values through layers of the neural network to generate predicted output values by at least:
  receiving input data;
  processing the input data using one or more of the weights to generate an activation output;
  generating, by the processing node, output data including the activation output and a tag identifying the processing node that computed the activation output; and sending the output data to multiple processing nodes, wherein the multiple processing nodes determine whether to process the activation output based on the tag; and wherein the plurality of processing nodes is configured to perform computations for backward propagation of differences between the expected output values and corresponding ones of the predicted outputs at least partly based on the tags of the particular processing nodes, wherein the backward propagation updates the weights.

2. The device of claim 1, wherein the device includes a systolic processor chip, and wherein the plurality of processing nodes comprises circuitry embedded in the systolic processor chip.

3. The device of claim 2, wherein particular subsets of the plurality of processing nodes form particular arrangements of a systolic array, wherein particular arrangements of the systolic array are assigned to particular layers of the neural network.

4. The device of claim 3, wherein a first arrangement of first processing nodes of the systolic array is configured to systolically pulse values output by the first processing nodes to a second arrangement of the systolic array during the forward propagation.

5. The device of claim 4, wherein the first processing nodes are configured to accumulate partial derivatives based on values received from the second arrangement during the backward propagation.

6. The device of claim 2, wherein the systolic processor chip is configured to:

systolically pulse data in a first direction through the plurality of processing nodes during the forward propagation, and systolically pulse data in a second direction through the plurality of processing nodes during the backward propagation, wherein the second direction is opposite the first direction.

7. The device of claim 1, wherein the at least one additional memory storing weights comprises a plurality of local memories within corresponding processing nodes.

8. The device of claim 1, wherein the at least one additional memory storing weights is disposed external to the plurality of processing nodes, and wherein the plurality of processing nodes is configured to fetch identified ones of the weights from the at least one additional memory.

9. The device of claim 1, wherein a particular processing node of the plurality of processing nodes includes an input systolic element configured to receive the input data, processing circuitry configured to perform processing on the received input data to generate the activation output, and an output systolic element configured to systolically output the activation output.

10. The device of claim 1, wherein the plurality of processing nodes is arranged in a plurality of arrangements, wherein each of the plurality of arrangements is configured to perform computations of a corresponding layer of the neural network.

11. The device of claim 10, wherein a particular arrangement of the plurality of arrangements includes a first subset of the plurality of processing nodes, wherein, during the backward propagation, the first subset of the plurality of processing nodes is configured to compute partial derivatives based at least partly on the tags, wherein a weighted sum of the partial derivatives is accumulated as the data are propagated backwards through the particular arrangement.

12. A method for training of a neural network via an array of systolic processing units, the method comprising:

accessing input values and corresponding expected output values for the neural network;

computing, by the array of systolic processing units, a forward propagation of the input values through layers of the neural network to generate predicted output values, wherein performing the forward propagation includes:

computing particular activation output values using particular systolic processing units using at least some weights of the neural network; and generating, by each of the particular systolic processing units, tagging information representing which of the systolic processing units computed which particular activation output value, wherein a subsequent processing unit identifies one or more weights from among a plurality of weights to use for processing an activation output value based on tagging information received from a prior processing unit;

computing, by the array of systolic processing units, a backward propagation of differences between the expected output values and corresponding ones of the predicted output values, wherein computing the backward propagation is based at least partly on the tagging information; and updating the weights based on the backward propagation.

13. The method of claim 12, wherein the systolic processing units are arranged in arrangements, the method further comprising assigning particular arrangements to particular layers of the neural network.

14. The method of claim 13, wherein computing the forward propagation further comprises systolically pulsing activation outputs of a first arrangement of the arrangements to a second arrangement of the arrangements.

15. The method of claim 14, wherein computing the backward propagation further comprises systolically pulsing deviation outputs of the second arrangement to the first arrangement.

16. The method of claim 15, wherein computing the backward propagation further comprises, by particular systolic processing units of the first arrangement, computing partial derivatives based at least partly on the tagging information.

17. The method of claim 16, further comprising accumulating a weighted sum of the partial derivatives as data are propagated backwards through the first arrangement.

18. The method of claim 12, wherein generating the tagging information comprises, by the prior a first processing unit of the systolic processing units, tagging the activation output value output from the prior processing unit with an address of the prior processing unit.

19. The method of claim 18, wherein performing the forward propagation comprises, by the subsequent processing unit of the systolic processing units, identifying the one or more of the weights to use for processing the activation value based on the address of the prior processing unit.

20. The method of claim 12, wherein performing the backward propagation comprises updating at least one of the one or more weights based on the tagging information of the prior processing unit.

* * * * *